(12) United States Patent
Sakshaug et al.

(10) Patent No.: US 10,454,103 B2
(45) Date of Patent: Oct. 22, 2019

(54) COMPOSITE CARBON MATERIALS COMPRISING LITHIUM ALLOYING ELECTROCHEMICAL MODIFIERS

(71) Applicant: Group14 Technologies, Inc., Seattle, WA (US)

(72) Inventors: Avery J. Sakshaug, Everett, WA (US); Leah A. Thompkins, Seattle, WA (US); Henry R. Costantino, Woodinville, WA (US); Aaron M. Feaver, Seattle, WA (US)

(73) Assignee: Group14 Technologies, Inc., Woodinville, WA (US)

( * ) Notice: Subject to any disclaimer, the term of this patent is extended or adjusted under 35 U.S.C. 154(b) by 0 days.

(21) Appl. No.: 15/675,462

(22) Filed: Aug. 11, 2017

(65) Prior Publication Data
US 2017/0346084 A1 Nov. 30, 2017

Related U.S. Application Data

(63) Continuation of application No. 14/084,469, filed on Nov. 19, 2013.
(Continued)

(51) Int. Cl.
*H01M 4/36* (2006.01)
*H01M 4/04* (2006.01)
(Continued)

(52) U.S. Cl.
CPC ............ *H01M 4/366* (2013.01); *H01G 11/06* (2013.01); *H01G 11/32* (2013.01); *H01G 11/50* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/362* (2013.01); *H01M 4/364* (2013.01);
(Continued)

(58) Field of Classification Search
None
See application file for complete search history.

(56) References Cited

U.S. PATENT DOCUMENTS

| | | | |
|---|---|---|---|
| 3,518,123 A | 6/1970 | Katsoulis et al. | |
| 3,619,428 A | 11/1971 | David | |

(Continued)

FOREIGN PATENT DOCUMENTS

| | | |
|---|---|---|
| CA | 2176452 A1 | 11/1997 |
| CN | 1554102 A | 12/2004 |

(Continued)

OTHER PUBLICATIONS

Abraham et al., "A Polymer Electrolyte-Based Rechargeable Lithium/Oxygen Battery," *J. Electrochem. Soc.* 143(1):1, Jan. 1996.
(Continued)

*Primary Examiner* — Barbara L Gilliam
*Assistant Examiner* — Nathanael T Zemui
(74) *Attorney, Agent, or Firm* — Seed IP Law Group LLP

(57) ABSTRACT

The present application is generally directed to composites comprising a hard carbon material and an electrochemical modifier. The composite materials find utility in any number of electrical devices, for example, in lithium ion batteries. Methods for making the disclosed composite materials are also disclosed.

18 Claims, 32 Drawing Sheets

Related U.S. Application Data

(60) Provisional application No. 61/834,258, filed on Jun. 12, 2013, provisional application No. 61/786,165, filed on Mar. 14, 2013.

(51) Int. Cl.
| | |
|---|---|
| H01M 4/133 | (2010.01) |
| H01M 4/134 | (2010.01) |
| H01M 4/1393 | (2010.01) |
| H01M 4/1395 | (2010.01) |
| H01M 4/38 | (2006.01) |
| H01M 4/587 | (2010.01) |
| H01M 4/62 | (2006.01) |
| H01M 10/0525 | (2010.01) |
| H01G 11/06 | (2013.01) |
| H01G 11/32 | (2013.01) |
| H01G 11/50 | (2013.01) |
| H01M 4/48 | (2010.01) |

(52) U.S. Cl.
CPC ......... *H01M 4/386* (2013.01); *H01M 4/587* (2013.01); *H01M 4/625* (2013.01); *H01M 10/0525* (2013.01); *H01M 4/387* (2013.01); *H01M 4/483* (2013.01); *Y02E 60/13* (2013.01); *Y02T 10/7011* (2013.01); *Y02T 10/7022* (2013.01)

(56) References Cited

U.S. PATENT DOCUMENTS

| | | |
|---|---|---|
| 3,876,505 A | 4/1975 | Stoneburner |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Makarov et al. |
| 8,361,659 B2 | 1/2013 | Richard |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,680,159 B2 | 6/2017 | Feaver et al. |
| 9,985,289 B2 | 5/2018 | Costantino et al. |
| 10,147,950 B2 | 12/2018 | Sakshaug et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0064565 A1 | 4/2003 | Maletin et al. |
| 2003/0108785 A1 | 6/2003 | Wu et al. |
| 2003/0170548 A1 | 9/2003 | Otsuki et al. |
| 2004/0132845 A1 | 7/2004 | Rhine et al. |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |

(56) References Cited

U.S. PATENT DOCUMENTS

| | | |
|---|---|---|
| 2005/0041370 A1 | 2/2005 | Wilk et al. |
| 2005/0058589 A1 | 3/2005 | Lundquist et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0113735 A1 | 5/2007 | Feaver et al. |
| 2007/0142222 A1 | 6/2007 | Erkey et al. |
| 2007/0166602 A1 | 7/2007 | Burchardt |
| 2007/0292732 A1 | 12/2007 | Feaver et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0180881 A1 | 7/2008 | Feaver et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2010/0331179 A1 | 12/2010 | Feaver et al. |
| 2011/0002086 A1 | 1/2011 | Feaver et al. |
| 2011/0028599 A1 | 2/2011 | Costantino et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0199716 A1 | 8/2011 | Feaver et al. |
| 2011/0200848 A1 | 8/2011 | Chiang et al. |
| 2011/0223494 A1 | 9/2011 | Feaver et al. |
| 2011/0281180 A1 | 11/2011 | Kim et al. |
| 2012/0045685 A1 | 2/2012 | Seki et al. |
| 2012/0081838 A1 | 4/2012 | Costantino et al. |
| 2012/0129049 A1 | 5/2012 | Rayner |
| 2012/0156567 A1 | 6/2012 | Ayme-Perrot et al. |
| 2012/0183856 A1 | 7/2012 | Cui et al. |
| 2012/0202033 A1 | 8/2012 | Chang et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1* | 10/2012 | Burton .............. B82Y 30/00 429/231.8 |
| 2012/0305651 A1 | 12/2012 | Anderson et al. |
| 2013/0004841 A1 | 1/2013 | Thompkins et al. |
| 2013/0020349 A1 | 1/2013 | Feaver et al. |
| 2013/0157151 A1 | 6/2013 | Feaver et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0252082 A1 | 9/2013 | Thompkins et al. |
| 2013/0280601 A1 | 10/2013 | Geramita et al. |
| 2013/0295462 A1 | 11/2013 | Atanassova et al. |
| 2013/0321982 A1 | 12/2013 | Feaver et al. |
| 2013/0337334 A1 | 12/2013 | Tao et al. |
| 2013/0344391 A1* | 12/2013 | Yushin .............. H01M 4/366 429/231.8 |
| 2014/0038042 A1 | 2/2014 | Rios et al. |
| 2014/0045685 A1 | 2/2014 | Iguchi et al. |
| 2014/0094572 A1 | 4/2014 | Costantino et al. |
| 2014/0170482 A1 | 6/2014 | Park et al. |
| 2014/0220456 A1 | 8/2014 | Costantino et al. |
| 2014/0272592 A1 | 9/2014 | Thompkins et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0062781 A1 | 3/2015 | Feaver et al. |
| 2015/0162603 A1 | 6/2015 | Yushin et al. |
| 2015/0255800 A1 | 9/2015 | Feaver et al. |
| 2015/0283534 A1 | 10/2015 | Costantino et al. |
| 2016/0039970 A1 | 2/2016 | Kron et al. |
| 2016/0104882 A1 | 4/2016 | Yushin et al. |
| 2016/0122185 A1 | 5/2016 | Feaver et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0155148 A1 | 6/2017 | Costantino et al. |
| 2017/0170477 A1 | 6/2017 | Sakshaug et al. |
| 2018/0097240 A1 | 4/2018 | Feaver et al. |
| 2018/0130609 A1 | 5/2018 | Feaver et al. |
| 2018/0294484 A1 | 10/2018 | Fredrick et al. |
| 2018/0331356 A1 | 11/2018 | Feaver et al. |

FOREIGN PATENT DOCUMENTS

| | | |
|---|---|---|
| CN | 1762900 A | 4/2006 |
| CN | 1986401 A | 6/2007 |
| CN | 101194384 A | 6/2008 |
| CN | 101318648 A | 12/2008 |
| CN | 101604743 A | 12/2009 |
| CN | 101969120 A | 2/2011 |
| CN | 102482095 A | 5/2012 |
| CN | 102820455 A | 12/2012 |
| CN | 102834955 A | 12/2012 |
| CN | 103094528 A | 5/2013 |
| CN | 104108698 A | 10/2014 |
| CN | 102509781 B | 11/2015 |
| DE | 10 210 049 249 A1 | 4/2012 |
| EP | 0 649 815 A1 | 4/1995 |
| EP | 0 861 804 A1 | 9/1998 |
| EP | 1 049 116 A1 | 11/2000 |
| EP | 1 052 716 A2 | 11/2000 |
| EP | 1 248 307 A1 | 10/2002 |
| EP | 1 541 859 A2 | 3/2005 |
| EP | 2 117 068 A1 | 11/2009 |
| EP | 1 115 130 A1 | 7/2011 |
| EP | 2 983 186 A1 | 2/2016 |
| JP | 4-59806 A | 2/1992 |
| JP | 5-320955 A | 12/1993 |
| JP | 8-112539 A | 5/1996 |
| JP | 9-63905 A | 3/1997 |
| JP | 9-275042 A | 10/1997 |
| JP | 9-328308 A | 12/1997 |
| JP | 7-232908 A | 4/1998 |

(56) References Cited

FOREIGN PATENT DOCUMENTS

| | | |
|---|---|---|
| JP | 10-297912 A | 11/1998 |
| JP | 2001-89119 A | 4/2001 |
| JP | 2001-278609 A | 10/2001 |
| JP | 2002-532869 A | 10/2002 |
| JP | 2004-67498 A | 3/2004 |
| JP | 2004-514637 A | 5/2004 |
| JP | 2004/203715 A | 7/2004 |
| JP | 2004-221332 A | 8/2004 |
| JP | 2004-315283 A | 11/2004 |
| JP | 2005-93984 A | 4/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2007-115749 A | 5/2007 |
| JP | 2008-7387 A | 1/2008 |
| JP | 2008-94925 A | 4/2008 |
| JP | 2009/259803 A | 11/2009 |
| WO | 95/01165 A1 | 1/1995 |
| WO | 98/30496 A1 | 7/1998 |
| WO | 98/55238 A1 | 12/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2005/103490 A1 | 11/2005 |
| WO | 2007/061761 A1 | 5/2007 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120011 A1 | 8/2013 |
| WO | 2014/201275 A2 | 12/2014 |

OTHER PUBLICATIONS

Alcañiz-Monge et al., "Methane Storage in Activated Carbon Fibres," *Carbon* 35(2):291-297, 1997.

Anderegg, "Grading Aggregates: II—The Application of Mathematical Formulas to Mortars," *Industrial and Engineering Chemistry* 23(9):1058-1064, 1931.

Andreasen et al., "Ueber die Beziehung zwischen Komabstufung und Zwischenraum in Produkten aus losen Körnern (mit einigen Experimenten)," *Kolloid-Zeitschrift* 50(3):217-228, Mar. 1930 (with translation of summary).

Babić et al., "Carbon cryogel as support of platinum nano-sized electrocatalyst for the hydrogen oxidation reaction," *Electrochemica Acta* 51:3820-3826, 2006.

Babić et al., "Characterization of carbon cryogel synthesized by sol-gel polycondensation and freeze-drying," *Carbon* 42:2617-2624, 2004.

Babić et al., "Characterization of carbon cryogels synthesized by sol-gel polycondensation," *J Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Beattie et al., "High-Capacity Lithium-Air Cathodes," *J. Electrochem. Soc.* 156(1):A44-A47, 2009.

Besenhard, "Handbook of battery materials," *Weinheim, Wiley—VCH, Weinheim*, New York, 389-401, Dec. 31, 1999.

Bock et al., "Structural Investigation of Resorcinol Formaldehyde and Carbon Aerogels Using SAXS and BET," *Journal of Porous Materials* 4:287-294, 1997.

Buiel, et al., "Li-insertion in hard carbon anode materials for Li-ion batteries," *Electrochimica Acta* 45:121-130, 1999.

Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.

Butler et al., "Braking Performance Test Procedure for the Hybrid Vehicle Energy Storage Systems: Capacitor Test Results," *Joint International Meeting of the Electrochemical Society*, Abstract 684, Honolulu, HI, Oct. 3-8, 2004, 5 pages Cao et al., "Li-ion capacitors with carbon cathode and hard carbon/stabilized lithium metal powder anode electrodes," *Journal of Power Sources* 213:180-185, Apr. 2012.

Chang et al., "Carbon Materials Comprising Enhanced Electrochemical Properties," U.S. Appl. No. 14/988,625, filed Jan. 5, 2016, 112 pages.

Chmiola et al., "Anomalous Increase in Carbon Capacitance at Pore Sizes Less Than 1 Nanometer," *Science* 313:1760-1763, Sep. 22, 2006.

Conway et al., "Partial Molal Volumes of Tetraalkylammonium Halides and Assignment of Individual Ionic Contributions," *Trans. Faraday Soc.* 62:2738-2749, 1966.

Costantino et al., "Manufacturing Methods for the Production of Carbon Materials," U.S. Appl. No. 14/047,935, filed Oct. 7, 2013, 72 pages.

Costantino et al., "Enhanced Packing of Energy Storage Particles," U.S. Appl. No. 14/150,547, filed Jan. 8, 2014, 96 pages.

Costantino et al., "Carbon-Based Compositions with Highly Efficient Volumeric Gas Sorption," U.S. Appl. No. 14/533,956, filed Nov. 5, 2014, 90 pages.

Czakkel et al., "Influence of drying on the morphology of resorcinol-formaldehyde-based carbon gels," *Microporous and Mesoporous Materials* 86:124-133, 2005.

Débart et al., "α-$MnO_2$ Nanowires: A Catalyst for the $O_2$ Electrode in Rechargeable Lithium Batteries," *Agnew. Chem. Int. Ed.* 47:4521-4524, 2008.

Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.

Dinger et al., "Particle Packing III—Discrete versus Continuous Particle Sizes," *Interceram* 41(5):332-334, 1992.

Dinger et al., "Particle Packing IV—Computer Modelling of Particle Packing Phenomena," *Interceram* 42(3):150-152, 1993.

Edward, "Molecular Volumes and the Stokes-Einstein Equation," *Journal of Chemical Education* 47(4):261-270, Apr. 1970.

Eikerling et al., "Optimized Structure of Nanoporous Carbon-Based Double-Layer Capacitors," *Journal of the Electrochemical Society* 152(1):E24-E33, 2005.

Endo et al., "Morphology and organic EDLC applications of chemically activated AR-resin-based carbons," *Carbon* 40:2613-2626, 2002.

Feaver et al., "Mesoporous Carbon Materials Comprising Bifunctional Catalysts," U.S. Appl. No. 14/543,587, filed Nov. 17, 2014, 102 pages.

Feaver et al., "Electric Double Layer Capacitance Device," U.S. Appl. No. 14/448,853, filed Jul. 31, 2014, 75 pages.

Feaver et al., "Activated carbon cryogels for low pressure methane storage," *Carbon* 44:590-593, 2006.

Furnas, "Grading Aggregates I—Mathematical Relations for Beds of Broken Solids of Maximum Density," *Industrial and Engineering Chemistry* 23(9): 1052-1058, 1931.

Gao et al., "Nitrogen-rich graphene from small molecules as high performance anode material," *Nanotechnology* 25:415402, 2014, 8 pages.

Geramita et al., "Preparation of Polymeric Resins and Carbon Materials," U.S. Appl. No. 15/199,318, filed Jun. 30, 2016, 134 pages.

Gouérec et al., "Preparation and Modification of Polyacrylonitrile Microcellular Foam Films for Use as Electrodes in Supercapacitors," *Journal of the Electrochemical Society* 148(1):A94-A101, 2001.

(56) References Cited

OTHER PUBLICATIONS

Hahn et al., "A dilatometric study of the voltage limitation of carbonaceous electrodes in aprotic EDLC type electrolytes by charge-induced strain," *Carbon* 44:2523-2533, 2006.

Hasegawa et al., "Preparation of carbon gel microspheres containing silicon powder for lithium ion battery anodes," *Carbon* 42:2573-2579, 2004.

Hirscher et al., "Are carbon nanostructures an efficient hydrogen storage medium?" *Journal of Alloys and Compounds* 356-357:433-437, 2003.

Hong et al., "Hydrogen evolution inhibition with diethylenetriamine modification of activated carbon for a lead-acid battery," *RSC Adv.* 4:33574-33577, 2014.

Hsieh et al., "Synthesis of mesoporous carbon composite and its electric double-layer formation behavior,"*Microporous and Mesoporous Materials* 93:232-239, 2006.

Hu et al., "Effects of electrolytes and electrochemical pretreatments on the capacitive characteristics of activated carbon fabrics for supercapacitors," *Journal of Power Sources* 125:299-308, 2004.

Inomata et al., "Natural gas storage in activated carbon pellets without a binder," *Carbon* 40:87-93, 2002.

International Preliminary Report of Patentability, dated Jul. 23, 2013, for International Application No. PCT/US/2010/030396, 9 pages.

International Preliminary Report of Patentability, dated May 27, 2008, for International Application No. PCT/US2006/044524, 7 pages.

International Preliminary Report of Patentability, dated May 19, 2009, for International Application No. PCT/US2007/084886, 7 pages.

International Search Report and Written Opinion, dated Apr. 11, 2007, for International Application No. PCT/US2006/044524, 8 pages.

International Search Report and Written Opinion, dated Jun. 11, 2008, for International Application No. PCT/US2007/84886, 11 pages.

International Search Report and Written Opinion, dated Sep. 8, 2010, for International Application No. PCT/US2010/40836, 12 pages.

International Search Report and Written Opinion, dated Mar. 12, 2011, for International Application No. PCT/US2010/059947, 14 pages.

International Search Report and Written Opinion, dated Mar. 10, 2015, for International Application No. PCT/US2014/026460, 17 pages.

Job et al., "Synthesis of transition metal-doped carbon xerogels by solubilization of metal salts in resorcinol-formaldehyde aqueous solution," *Carbon* 42:3217-3227, 2004.

Job et al., "Highly dispersed platinum catalysts prepared by impregnation of texture-tailored carbon xerogels," *Journal of Catalysis* 240:160-171, 2006.

Job et al., "Carbon aerogels, cryogels and xerogels: Influence of the drying method on the textural properties of porous carbon materials," *Carbon* 43:2481-2494, 2005.

Khomenko et al., "High-voltage asymmetric supercapacitors operating in aqueous electrolyte," *Appl. Phys. A* 82:567-573, 2006.

Kim et al., "Correlation between the capacitor performance and pore structure," *Tanso* 221:31-39, 2006.

Kim et al., "Adsorption of phenol and reactive dyes from aqueous solution on carbon cryogel microspheres with controlled porous structure," *Microporous and Mesoporous Materials* 96: 191-196, 2006.

Kocklenberg et al., "Texture control of freeze-dried resorcinol-formaldehyde gels," *Journal of Non-Crystalline Solids* 225:8-13, 1998.

Konno et al., "Preparation of activated carbon having the structure derived from biomass by alkali activation with NaOH, and its application for electric double-layer capacitor," *Tanso* 231:2-7, 2008.

Kowalczyk et al., "Estimation of the pore-size distribution function from the nitrogen adsorption isotherm. Comparison of density functional theory and the method of Do and co-workers," *Carbon* 41:1113-1125, 2003.

Lozano-Castelló et al., "Influence of pore structure and surface chemistry on electric double layer capacitance in non-aqueous electrolyte," *Carbon* 41:1765-1775, 2003.

Lozano-Castelló et al., "Powdered Activated Carbons and Activated Carbon Fibers for Methane Storage: A Comparative Study," *Energy & Fuels* 16:1321-1328, 2002.

McEwen et al., "Nonequeous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.

Miller, "Pulse Power Performance of Electrochemical Capacitors: Technical Status of Present Commercial Devices," Proceedings of the $8^{th}$ International Seminar on Double Layer Capacitors and Similar Energy Storage Devices, Deerfield Beach, Florida, Dec. 7-9, 1998, 9 pages.

Naoi et al., "Second generation 'nanohybrid supercapacitor': Evolution of capacitive energy storage devices," *Energy Environ. Sci.* 5:9363-9373, 2012.

Nishihara et al., "Preparation of resorcinol—formaldehyde carbon cryogel microhoneycombs," *Carbon* 42:899-901, 2004.

Ogasawara et al., "Rechargeable $LI_2O_2$ Electrode for Lithium Batteries," *Journal American Chemical Society* 128(4):1390-1393, 2006.

Otowa et al., "Production and adsorption characteristics of MAXSORB: High-surface-area active carbon," *Gas Separation and Purification* 7(4):241-245, 1993.

Pääkkö, "Long and entangled native cellulose I nanofibers allow flexible aerogels and hierarchically porous templates for functionalities," *Soft Matter* 4:2492-2499, 2008.

Pekala et al., "Structure of Organic Aerogels. 1. Morphology and Scaling," *Macromolecules* 26:5487-5493, 1993.

Pekala, "Organic aerogels from the polycondensation of resorcinol with formaldehyde," *Journal of Materials Science* 24:3221-3227, 1989.

Pekala et al., "Aerogels derived from multifunctional organic monomers," *Journal of Non-Crystalline Solids* 145:90-98, 1992.

Perrin et al., "Methane Storage within Dry and Wet Active Carbons: A Comparative Study," *Energy & Fuels* 17:1283-1291, 2003.

Pojanavaraphan et al., "Prevulcanized natural rubber latex/clay aerogel nanocomposites," *European Polymer Journal* 44:1968-1977, 2008.

Qu et al., "Studies of activated carbons used in double-layer capacitors," *Journal of Power Sources* 74:99-107, 1998.

Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.

Read, J., "Ether-Based Electrolytes for the Lithium/Oxygen Organic Electrolyte Battery," *J. Electrochem. Soc.* 153(1):A96-A100, 2006.

Read et al., "Oxygen Transport Properties of Organic Electrolytes and Performance of Lithium/Oxygen Battery," *J. Electrochem. Soc.* 150(10):A1351-A1356, 2003.

Read, J., "Characterization of the Lithium/Oxygen Organic Electrolyte Battery," *J. Electrochemical Soc.* 149(9):A1190-A1195, 2002.

Reichenauer et al., "Microporosity in carbon aerogels," *Journal of Non-Crystalline Solids* 225:210-214, 1998.

Sakshaug et al., "Energy Storage Devices Based on Hybrid Carbon Electrode Systems," U.S. Appl. No. 14/776,535, filed Sep. 14, 2015, 137 pages.

Sakshaug et al., "High Capacity Hard Carbon Materials Comprising Efficiency Enhancers," U.S. Appl. No. 14/897,828, filed Dec. 11, 2015, 117 pages.

Salitra et al., "Carbon Electrodes for Double-Layer Capacitors I. Relations Between Ion and Pore Dimensions," *Journal of the Electrochemical Society* 147(7):2486-2493, 2000.

Setoyama et al., "Simulation Study on the Relationship Between a High Resolution $\alpha_s$-Plot and the Pore Size Distribution for Activated Carbon," *Carbon* 36(10):1459-1467, 1998.

Simon et al., "Materials for electrochemical capacitors," *Nature Materials* 7:845-854, Nov. 2008.

(56) References Cited

OTHER PUBLICATIONS

Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso, "Isotropic Graphite Engineering Data," *Toyo Tanso Co., Ltd.* Catalog published 1994.
Toyo Tanso, "Isotropic Graphite Technical Data," *Toyo Tanso Co., Ltd.* Catalog published 1997.
Toyo Tanso, "Graphite Applications," *Toyo Tanso Co., Ltd.* Catalog published 1998. (Machine Translation attached).
Toyo Tanso Carbon Products, "Special Graphite and Compound Material Products," *Toyo Tanso Co., Ltd.* Catalog published 2008.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391,2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene,"*Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Control of mesoporosity of carbon gels prepared by sol-gel polycondensation and freeze drying," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351,2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte $Li/O_2$ battery," *Journal of Power Sources* 195:1235-1240, 2010.
Abánades et al., "Experimental analysis of direct thermal methane cracking," *International Journal of Hydrogen Energy* 36(20):12877-12886, 2011.
Fotouhi et al., "A low cost, disposable cable-shaped Ai-air battery for portable biosensors," *J. Micromech. Microeng.* 26:055011, 2016. (8 pages).

* cited by examiner

COMPOSITE CARBON MATERIALS COMPRISING LITHIUM ALLOYING ELECTROCHEMICAL MODIFIERS

BACKGROUND

Technical Field

The present invention generally relates to composite carbon materials, methods for making the same and devices containing the same.

Description of the Related Art

Lithium-based electrical storage devices have potential to replace devices currently used in any number of applications. For example, current lead acid automobile batteries are not adequate for next generation all-electric and hybrid electric vehicles due to irreversible, stable sulfate formations during discharge. Lithium ion batteries are a viable alternative to the lead-based systems currently used due to their capacity, and other considerations. Carbon is one of the primary materials used in both lithium secondary batteries and hybrid lithium-ion capacitors (LIC). The carbon anode typically stores lithium between layered graphite sheets through a mechanism called intercalation. Traditional lithium ion batteries are comprised of a graphitic carbon anode and a metal oxide cathode; however such graphitic anodes typically suffer from low power performance and limited capacity.

Silicon, Tin, and other lithium alloying electrochemical modifiers have also been proposed based on their ability to store very large amounts of lithium per unit weight. However, these materials are fundamentally limited by the substantial swelling that occurs when they are fully lithiated. This swelling and shrinkage when the lithium is removed results in an electrode that has limited cycle life and low power. The solution thus far has been to use very small amounts of alloying electrochemical modifier in a largely carbon electrode, but this approach does not impart the desired increase in lithium capacity. Finding a way to increase the alloying electrochemical modifier content in an anode composition while maintaining cycle stability is desired to increase capacity. A number of approaches have been utilized involving nano-structured alloying electrochemical modifier, blends of carbon with alloying electrochemical modifier, or deposition of alloying electrochemical modifier onto carbon using vacuum or high temperature. However none of these processes has proven to combine a scalable process that results in the desired properties.

Hard carbon materials have been proposed for use in lithium ion batteries, but the physical and chemical properties of known hard carbon materials are not optimized for use as anodes in lithium-based batteries. Thus, anodes comprising known hard carbon materials still suffer from many of the disadvantages of limited capacity and low first cycle efficiency. Hard carbon materials having properties optimized for use in lithium-based batteries are expected to address these deficiencies and provide other related advantages.

While significant advances have been made in the field, there continues to be a need in the art for improved hard carbon materials and for improvements to the approaches used for incorporating alloying electrochemical modifiers into these carbons in order to result in the desired material properties and electrochemical performance needed in electrical energy storage devices (e.g., lithium ion batteries). The present invention fulfills these needs and provides further related advantages.

BRIEF SUMMARY

In general terms, the current invention is directed to novel hard carbon materials and their composites that contain high lithium capacity alloying electrochemical modifiers with optimized lithium storage and utilization properties. The novel composite materials find utility in any number of electrical energy storage devices, for example as electrode material in lithium-based electrical energy storage devices (e.g., lithium ion batteries). Electrodes comprising the composite materials display high reversible capacity, high first cycle efficiency, high power performance or any combination thereof. While not wishing to be bound by theory, the present inventors believe that such improved electrochemical performance is related, at least in part, to the carbon materials' physical and chemical properties such as surface area, pore structure, crystallinity, surface chemistry and/or other properties, the approach that is used to deposit the alloying electrochemical modifier and/or the resulting structure of the alloying electrochemical modifier within the carbon material as discussed in more detail herein. Furthermore, certain electrochemical modifiers can be incorporated on the surface of and/or in the carbon material to further tune the desired properties.

Accordingly, in one embodiments the present disclosure provides a composite material having a first cycle insertion of at least 700 mAh/g and a first cycle efficiency in the absence of ex situ prelithiation of greater than 70% when the composite material is incorporated into an electrode of a lithium based energy storage device, wherein the composite material comprises a carbon material and a lithium alloying electrochemical modifier.

In certain embodiments, the first cycle insertion is at least 1000 mAh/g and the first cycle efficiency in the absence of ex situ prelithiation is greater than 80%. In other embodiments, the first cycle insertion is at least 2400 mAh/g and the first cycle efficiency in the absence of ex situ prelithiation is greater than 80%. In still other embodiments of the foregoing, the first cycle efficiency in the absence of ex situ prelithiation is greater than 90%.

In other embodiments of any of the foregoing composites, the composite material further comprises a first cycle extraction of at least 600 mAh/g and a fifth cycle retention of greater than 99%. For example, in some embodiments the first cycle extraction is at least 1200 mAh/g.

In various other embodiments of the disclosed composite materials the lithium alloying electrochemical modifier is silicon, tin, germanium, nickel, aluminum, manganese, $Al_2O_3$, titanium, titanium oxide, sulfur, molybdenum, arsenic, gallium, phosphorous, selenium, antimony, bismuth, tellurium or indium or combinations thereof. For example, in some specific embodiments the lithium alloying electrochemical modifier is silicon.

Various forms of the composite are also provided. For example in some embodiments, the composite material comprises particles having a core-shell structure, wherein the shell comprises substantially the carbon material and the core comprises substantially the electrochemical modifier. In other embodiments, the composite material comprises particles having a core-shell structure wherein the core comprises substantially the carbon material and the shell comprises substantially the electrochemical modifier. In still other embodiments, the composite material comprises particles of the carbon material, carbon material particles encapsulating a plurality of particles of the lithium alloying electrochemical modifier.

In certain embodiments, the electrochemical modifier comprises nanoparticles. For example, in certain embodiments the electrochemical modifier comprises particles having a particle size ranging from 10 nm to 500 nm.

Various ratios of carbon and electrochemical modifier are present in the disclosed composite materials. In some embodiments, a ratio of carbon material to electrochemical modifier ranges from 40:1 to 1:99 on a mass basis. In other embodiments, a ratio of carbon material to electrochemical modifier ranges from 19:1 to 1:9 on a mass basis.

In still more embodiments, the composite material further comprises an efficiency enhancing electrochemical modifier. For example, in some embodiments the efficiency enhancing electrochemical modifier comprises phosphorus and in further embodiments the phosphorous is present in the composite material at 3-13% as measured by TXRF.

The presence of other elements in the composite material may affect the electrochemical performance thereof. Accordingly, in some embodiments the composite material comprises a total of less than 200 ppm of all elements having atomic numbers ranging from 11 to 92, excluding any intentionally added electrochemical modifier, as measured by TXRF.

In various embodiments of any of the foregoing, the carbon material is a hard carbon material.

In other aspects, the present disclosure is directed to a composite material having a first cycle extraction of at least 1900 mAh/g and a first cycle efficiency in the absence of ex situ prelithiation of greater than 80% when the composite material is incorporated into an electrode of a lithium based energy storage device, wherein the composite material comprises silicon and carbon material in a ratio ranging from about 8.5:1 to about 9.5:1 by weight and further comprising 3-13% phosphorus. In other related embodiments, the ratio of silicon to carbon is about 9:1.

Methods for preparing the composite materials are also provided. For example, in one embodiment the disclosure provides a method for preparing a composite material, the composite material comprising a carbon material and a lithium alloying electrochemical modifier, the method comprising:

A) copolymerizing one or more polymer precursors in the presence of the electrochemical modifier or a compound comprising the electrochemical modifier to obtain a polymer gel; and B) pyrolyzing the polymer gel to obtain the composite material.

In further embodiments of the foregoing method, the polymer precursor comprises polyphenylglycidylether-co-formaldehyde polymer, and copolymerizing further comprises reacting the polymer precursors in the presence of phosphoric acid.

In other embodiments of the method, the electrochemical modifier comprises silicon. In still other embodiments, the electrochemical modifier or the compound comprising the electrochemical modifier is brought into contact with a composition comprising the polymer precursors before initiation of polymerization.

In different embodiments of the disclosed methods, the electrochemical modifier or the compound comprising the electrochemical modifier is brought into contact with a composition comprising the polymer precursors after initiation of polymerization.

In still other embodiments, the electrochemical modifier is in the form of particles, for example nanoparticles.

In still more embodiments, the disclosure is directed to an electrode comprising any of the composite materials described herein. Devices comprising such electrodes are also provided.

In more embodiments, an electrical energy storage device is provided, the device comprising:

a) at least one anode comprising any of the composite materials disclosed herein;

b) at least one cathode comprising a metal oxide; and c) an electrolyte comprising lithium ions.

In further embodiments of the foregoing, the device is a lithium ion battery or hybrid lithium ion capacitor.

Use of the disclosed composite materials for storage or distribution of electrical energy is also provided.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
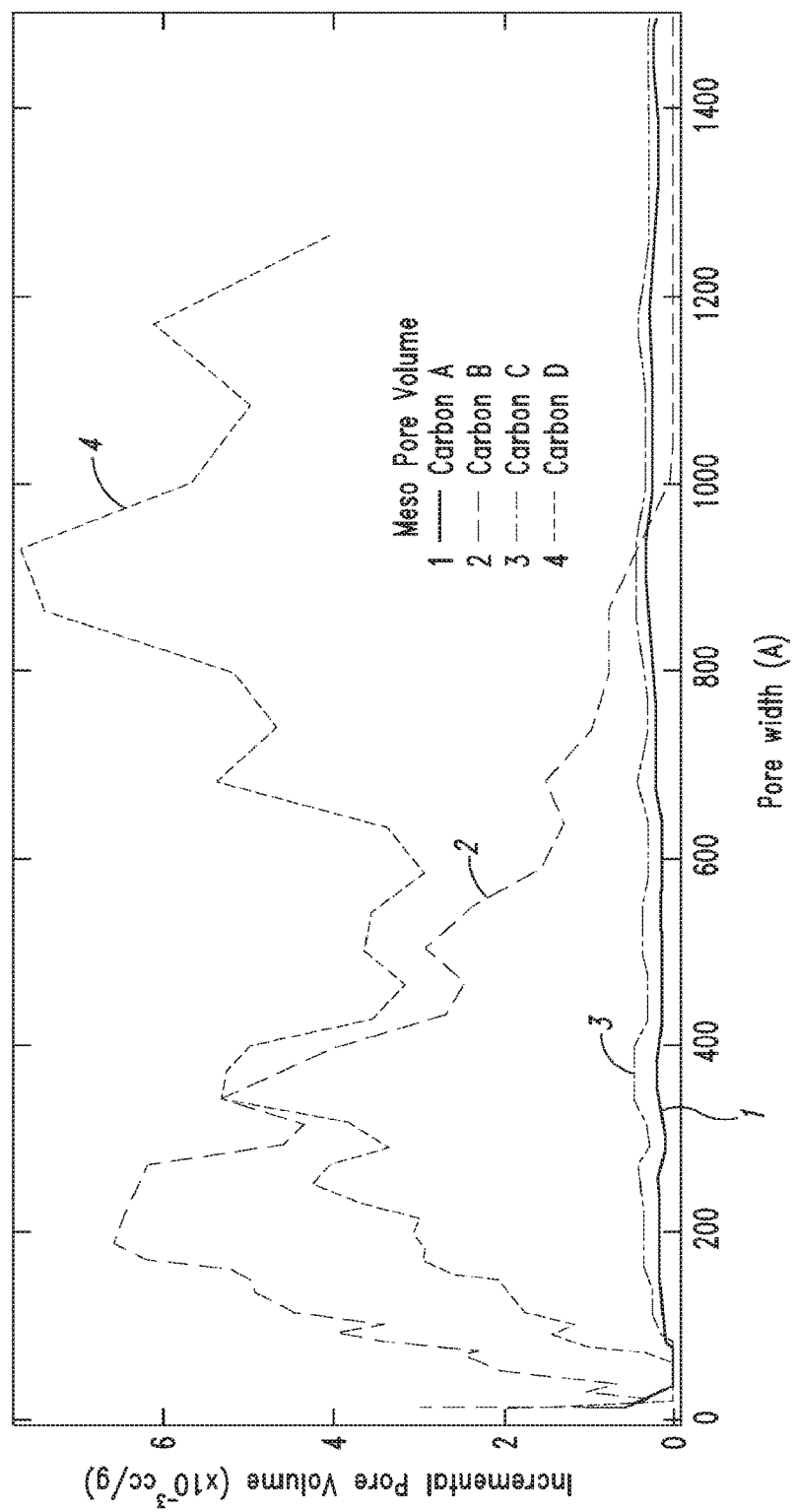
FIG. 1 depicts pore size distribution of exemplary carbon materials.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, and unless the context dictates otherwise, the following terms have the meanings as specified below.

"Carbon material" refers to a material or substance comprised substantially of carbon. Carbon materials include ultrapure as well as amorphous and crystalline carbon materials. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. "Carbon material" is also referred to herein as the "carbon component" with respect to the disclosed composites. Throughout the description herein, "carbon material" and/or "carbon component" refers to the carbon material or carbon component, respectively, in the absence of electrochemical modifier (which is typically present in the disclosed composites).

"Hard Carbon" refers to a non-graphitizable carbon material. At elevated temperatures (e.g., >1500° C.) a hard carbon remains substantially amorphous, whereas a "soft" carbon will undergo crystallization and become graphitic.

"Modified hard carbon" or "composite material" refer to material comprising both carbon and an electrochemical modifier such as a lithium alloying material, such as silicon, tin, germanium, nickel, aluminum, manganese, $Al_2O_3$, titanium, titanium oxide, sulfur, molybdenum, arsenic, gallium, phosphorous, selenium, antimony, bismuth, tellurium or indium or any other metal or semi-metal that is capable of lithium uptake. In some embodiments, the carbon and lithium alloying material are intimately integrated through chemical bonding or in other embodiments the two materials are a distinct mixture between two powders. In some embodiments, the composite materials comprise an efficiency enhancer.

"Allotrope" refers to a material which can exists in different forms. C60, graphene, diamond, hard carbon, soft carbon, graphite, and carbon nanotubes are non-limiting examples of carbon allotropes.

"First cycle efficiency" refers to the percent difference in volumetric or gravimetric capacity between the initial charge and the first discharge cycle of a lithium battery. First cycle efficiency is calculated by the following formula: $(F^2/F^1) \times 100$), where $F^1$ and $F^2$ are the volumetric or gravimetric capacity of the initial lithium insertion and the first cycle lithium extraction, respectively.

"Electrochemical modifier" refers to any chemical element, compound comprising a chemical element or any combination of different chemical elements and compounds which enhances the electrochemical performance of a carbon material. Electrochemical modifiers can change (increase or decrease) the resistance, capacity, efficiency, power performance, stability and/or other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure include, but are not limited to, elements, and compounds or oxides comprising elements, in groups 12-15 of the periodic table, other elements such as silicon, tin, sulfur, and tungsten and combinations thereof. For example, electrochemical modifiers include, but are not limited to, tin, silicon, tungsten, silver, zinc, molybdenum, iron, nickel, aluminum, manganese and combinations thereof as well as oxides of the same and compounds comprising the same. In certain embodiments, the electrochemical modifier is a lithium alloying material, such as silicon, tin, germanium, nickel, aluminum, manganese, $Al_2O_3$, titanium, titanium oxide, sulfur, molybdenum, arsenic, gallium, phosphorous, selenium, antimony, bismuth, tellurium or indium or any other metal or semi-metal that is capable of lithium uptake.

"Efficiency enhancer" refers to a sub-class of electrochemical modifier that can increase the first cycle efficiency of a carbon material. In certain embodiments, the potency of an efficiency enhancer is dependent on the method of its incorporation into the carbon material.

"Group 12" elements include zinc (Zn), cadmium (Cd), mercury (Hg), and copernicium (Cn).

"Group 13" elements include boron (B), aluminum (Al), gallium (Ga), indium (In) and thallium (Tl).

"Group 14" elements include carbon (C), silicon (Si), germanium (Ge), tin (Sn) and lead (Pb).

"Group 15" elements include nitrogen (N), phosphorous (P), arsenic (As), antimony (Sb) and bismuth (Bi).

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material or composite material refers to any element or combination of elements, other than carbon, which is present in the carbon material. Impurity levels are typically expressed in parts per million (ppm). Impurities do not include substances, such as electrochemical modifiers, which are purposely added to a carbon material or composite material.

"TXRF impurity," "TXRF element," "PIXE impurity" or "PIXE element" is any impurity element having an atomic number ranging from 11 to 92 (i.e., from sodium to uranium), excluding any intentionally added electrochemical modifier. The phrases "total TXRF impurity content," "total TXRF impurity level," "total PIXE impurity content" and "total PIXE impurity level" refer to the sum of all TXRF or PIXE impurities present in a sample, for example, a polymer gel, a carbon material or a composite material. Electrochemical modifiers are not considered TXRF PIXE impurities as they are a desired constituent of the composite materials. For example, in some embodiments an element may be added to a carbon material as an electrochemical modifier and will not be considered a TXRF or PIXE impurity, while in other embodiments the same element may not be a desired electrochemical modifier and, if present in the carbon material or composite material, will be considered a TXRF or PIXE impurity. TXRF impurity concentrations and identities may be determined by total x-ray reflection fluorescence (TXRF). PIXE impurity concentrations and identities may be determined by proton induced x-ray emission (PIXE).

"Ultrapure" refers to a substance having a total TXRF or PIXE impurity content of less than 0.050%. For example, an "ultrapure carbon material" is a carbon material having a total TXRF or PIXE impurity content of less than 0.050% (i.e., 500 Ppm).

"Ash content" refers to the nonvolatile inorganic matter which remains after subjecting a substance to a high decomposition temperature. Herein, the ash content of a carbon material is calculated from the total TXRF or PIXE impurity content as measured by total x-ray reflection fluorescence, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to compounds used in the preparation of a synthetic polymer. Examples of polymer precursors that can be used in certain embodiments of the preparations disclosed herein include, but are not limited to, aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a ultrapure polymer gel as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of activated carbon material comprises micropores and mesopores.

"Pore volume" refers to the total volume of the carbon mass occupied by pores or empty volume. The pores may be either internal (not accessible by gas sorption) or external (accessible by gas sorption).

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as $LiPF_6$ (lithium hexafluorophosphate), LiBOB (lithium bis(oxatlato)borate), TEA TFB (tetraethylammonium tetrafluoroborate), MTEATFB (methyltriethylammonium tetrafluoroborate), EMITFB (1-ethyl-3-methylimidazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

"Elemental form" refers to a chemical element having an oxidation state of zero (e.g., metallic lead).

"Oxidized form" form refers to a chemical element having an oxidation state greater than zero.

"Skeletal density" refers to the density of the material including internal porosity and excluding external porosity as measured by helium pycnometry "Lithium uptake" refers to a carbon's ability to intercalate, absorb, or store lithium as measured as a ratio between the maximum number of lithium atoms to 6 carbon atoms.

X-ray photoelectron spectroscopy ("XPS") is a spectroscopic technique for quantitating a material's elemental composition and provides information on chemical state and electronic state of elements that exist within a material.

A. Carbon Materials

As noted above, traditional lithium based energy storage devices comprise graphitic anode material. The disadvantages of graphitic carbon are numerous in lithium ion batteries. For one, the graphite undergoes a phase and volume change during battery operation. That is, the material physically expands and contracts when lithium is inserted between the graphene sheets while the individual sheets physically shift laterally to maintain a low energy storage state. Secondly, graphite has a low capacity. Given the ordered and crystalline structure of graphite, it takes six carbons to store one lithium ion. The structure is not able to accommodate additional lithium. Thirdly, the movement of lithium ions is restricted to a 2D plane, reducing the kinetics and the rate capability of the material in a battery. This means that graphite does not perform well at high rates where power is needed. This power disadvantage is one of the limiting factors for using lithium ion batteries in all-electric vehicles.

Although hard carbon anodes for lithium-based devices have been explored, these carbon materials are generally low purity and low surface area and the known devices still suffer from poor power performance and low first cycle efficiency. The presently disclosed composite materials comprise hard carbon materials which are optimized for use in lithium-based devices and which exceed the performance characteristics of other known devices.

1. Modified Hard Carbon Materials and Components Thereof

As noted above, the present disclosure is directed to composite materials useful as anode material in lithium-based (or sodium-based) and other electrical storage devices. While not wishing to be bound by theory, it is believed that the electrochemical modifier content of a composite, electrochemical modifier structure within the composite, purity profile of the carbon, surface area of the carbon, porosity of the carbon and/or other properties of the carbon materials are related, at least in part, to its preparation method, and variation of the preparation parameters may yield composite materials having different properties. Accordingly, in some embodiments, the composite material is a pyrolyzed polymer gel with a high silicon content.

Figure 2:
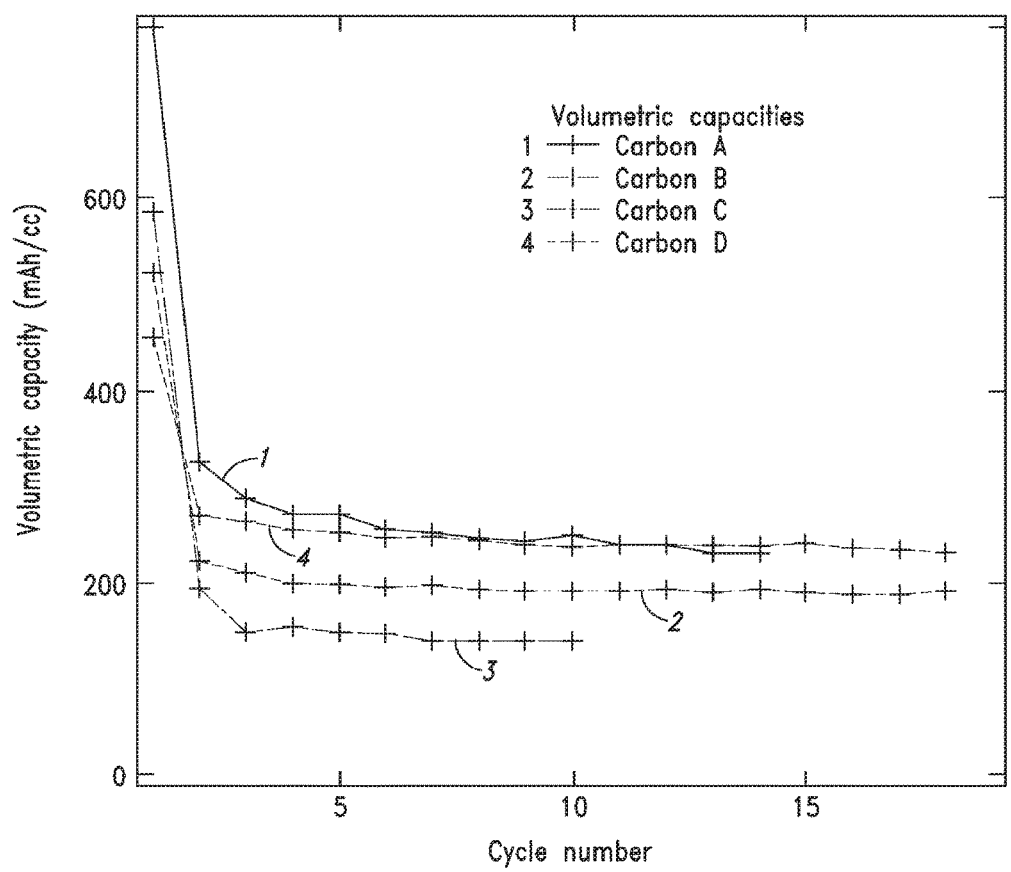
FIG. 2 shows electrochemical performance of exemplary carbon materials.

The disclosed composite materials improve the properties of any number of electrical energy storage devices, for example the composite materials have been shown to improve the first cycle efficiency of a lithium-based battery (see e.g., FIG. 2). Accordingly, one embodiment of the present disclosure provides a composite material, wherein the composite material has a first cycle efficiency of greater than 50% when the composite material is incorporated into an electrode of a lithium based energy storage device, for example a lithium ion battery. For example, some embodiments provide a composite material having a surface area of greater than 50 $m^2/g$, wherein the composite material has a first cycle efficiency of greater than 50% and a reversible capacity of at least 600 mAh/g when the composite material is incorporated into an electrode of a lithium based energy storage device. In other embodiments, the first cycle efficiency is greater than 55%. In some other embodiments, the first cycle efficiency is greater than 60%. In yet other embodiments, the first cycle efficiency is greater than 65%. In still other embodiments, the first cycle efficiency is greater than 70%. In other embodiments, the first cycle efficiency is greater than 75%, and in other embodiments, the first cycle efficiency is greater than 80%, greater than 90%, greater than 95%, greater than 98%, or greater than 99%. In some embodiments of the foregoing, the composite materials also comprise a surface area ranging from about 5 $m^2/g$ to about 400 $m^2/g$, or a pore volume ranging from about 0.05 to about 1.0 cc/g or both. For example, in some embodiments the surface area ranges from about 200 $m^2/g$ to about 300 $m^2/g$ or the surface area is about 250 $m^2/g$.

In other embodiments the composite material has a surface area of less than 50 $m^2/g$, wherein the composite material has a first cycle efficiency of greater than 50% and a reversible capacity of at least 600 mAh/g when the composite material is incorporated into an electrode of a lithium based energy storage device. In other embodiments, the first cycle efficiency is greater than 55%. In some other embodiments, the first cycle efficiency is greater than 60%. In yet other embodiments, the first cycle efficiency is greater than 65%. In still other embodiments, the first cycle efficiency is greater than 70%. In other embodiments, the first cycle efficiency is greater than 75%, and in other embodiments, the first cycle efficiency is greater than 80%, greater than 90%, greater than 95%, greater than 98%, or greater than 99%. In some other embodiments, the composite materials comprise a surface area ranging from about 5 $m^2/g$ to about 400 $m^2/g$ or a pore volume ranging from about 0.05 to about 1.0 cc/g or both. For example, in some embodiments the surface area ranges from about 200 $m^2/g$ to about 300 $m^2/g$ or the surface area is about 250 $m^2/g$.

The properties of the composite material (e.g., first cycle efficiency, capacity, etc.) can be determined by incorporating it into an electrode, known to those versed in the art. The composite is tested electrochemically. The methods of testing may vary depending on the carbon:electrochemical modifier composition, as known in the art. In one example, the composite material to be characterized is tested between upper and lower voltages of 1.0V and 10 mV at a current of 400 mA/g, after two formation cycles between 1.0V and 70 mV at a current of 200 mA/g, with respect to the mass of the composite material. Alternatively, the composite materials are tested by limiting the capacity at a predefined value and measuring the stability and voltage fluctuations of the composite.

The first cycle efficiency of the composite anode material can be determined by comparing the lithium inserted into the anode during the first cycle to the lithium extracted from the anode on the first cycle (without any ex situ prelithiation). Alternatively, the composite material can be prelithiated before the first cycle. This process of prelithiation as described in the art, may be conducted to increase the first cycle efficiency. When the insertion and extraction are equal, the efficiency is 100%. As known in the art, the anode material can be tested in a half cell, where the counter electrode is lithium metal, the electrolyte is a 1M LiPF$_6$ 1:1 ethylene carbonate:diethylcarbonate (EC:DEC), using a commercial polypropylene separator.

In some embodiments, the first cycle efficiency of the composite material is between 10% and 99.9%. In other embodiments, the first cycle efficiency of the composite material is between 50% and 98%. In yet other embodiments, the first cycle efficiency of the composite material is between 80% and 95%. In still other embodiments, the first cycle efficiency of the composite material is between 85% and 90%. In another embodiment the first cycle efficiency is around 80%.

The third cycle efficiency of the composite material can be determined by comparing the lithium inserted into the anode during the third cycle to the lithium extraction from the anode on the third cycle in a half cell. In some embodiments, the third cycle efficiency is between 90% and 100%, 95% and 100%, 99% and 99.999%, 99.95% and 99.99%.

In certain embodiments of the above, the composite material is used as anode material.

In another embodiment the present disclosure provides a composite material, wherein the carbon material component of the composite has a volumetric capacity (i.e., reversible capacity) of at least 400 mAh/cc when the carbon material is incorporated into an electrode of a lithium based energy storage device, for example a lithium ion battery. The volumetric capacity of the carbon materials can be calculated from multiplying the maximum gravimetric capacity (mAh/g) with the pycnometer, skeletal density (g/cc). In other embodiments, the volumetric capacity is at least 450 mAh/cc. In some other embodiments, the volumetric capacity is at least 500 mAh/cc. In yet other embodiments, the volumetric capacity is at least 550 mAh/cc. In still other embodiments, the volumetric capacity is at least 600 mAh/cc. In other embodiments, the volumetric capacity is at least 650 mAh/cc, and in other embodiments, the volumetric capacity is at least 700 mAh/cc. In another embodiment, the volumetric capacity of the carbon component of the composite ranges from 700 to 1100 mAh/cc.

In another embodiment the present disclosure provides a composite material, wherein the carbon material component has a gravimetric capacity (i.e., reversible capacity) of at least 150 mAh/g when the carbon material is incorporated into an electrode of a lithium based energy storage device, for example a lithium ion battery. In other embodiments, the gravimetric capacity is at least 200 mAh/g. In some other embodiments, the gravimetric capacity is at least 300 mAh/g. In yet other embodiments, the gravimetric capacity is at least 400 mAh/g. In still other embodiments, the gravimetric capacity is at least 500 mAh/g. In other embodiments, the gravimetric capacity is at least 600 mAh/g, and in other embodiments, the gravimetric capacity is at least 700 mAh/g, at least 800 mAh/g, at least 900 mAh/g, at least 1000 mAh/g, at least 1100 mAh/g or even at least 1200 mAh/g. In yet other embodiments, the gravimetric capacity ranges from 1200 to 3500 mAh/g. In some particular embodiments the carbon materials have a gravimetric capacity ranging from about 550 mAh/g to about 750 mAh/g. Certain examples of any of the above carbons comprise an electrochemical modifier as described in more detail below.

In another embodiment the present disclosure provides a composite material, wherein the composite has a gravimetric capacity (i.e., reversible capacity) of at least 150 mAh/g when the composite material is incorporated into an electrode of a lithium based energy storage device, for example a lithium ion battery. In other embodiments, the gravimetric capacity is at least 200 mAh/g. In some other embodiments, the gravimetric capacity is at least 300 mAh/g. In yet other embodiments, the gravimetric capacity is at least 400 mAh/g. In still other embodiments, the gravimetric capacity is at least 500 mAh/g. In other embodiments, the gravimetric capacity is at least 600 mAh/g, and in other embodiments, the gravimetric capacity is at least 700 mAh/g, at least 800 mAh/g, at least 900 mAh/g, at least 1000 mAh/g, at least 1100 mAh/g or even at least 1200 mAh/g. In yet other embodiments, the gravimetric capacity is between 1200 and 3500 mAh/g. In some particular embodiments the composite materials have a gravimetric capacity ranging from about 550 mAh/g to about 750 mAh/g.

In another embodiment the present disclosure provides a composite material, wherein the composite has a gravimetric capacity (i.e., reversible capacity) of at least 400 mAh/g when the composite material is incorporated into an electrode of a lithium based energy storage device, for example a lithium ion battery. In other embodiments, the gravimetric capacity is at least 450 mAh/g. In some other embodiments, the gravimetric capacity is at least 500 mAh/g. In yet other embodiments, the gravimetric capacity is at least 600 mAh/g. In still other embodiments, the gravimetric capacity is at least 700 mAh/g. In other embodiments, the gravimetric capacity is at least 800 mAh/g, and in other embodiments, the gravimetric capacity is at least 900 mAh/g, at least 1000 mAh/g, at least 1100 mAh/g, at least 1200 mAh/g, at least 1300 mAh/g or even at least 1400 mAh/g. In yet other embodiments, the gravimetric capacity is between 1400 and 4200 mAh/g. In some particular embodiments the composite materials have a gravimetric capacity ranging from about 1200 mAh/g to about 1600 mAh/g.

In another embodiment the present disclosure provides a composite material, wherein the composite has a volumetric capacity (i.e., reversible capacity) of at least 800 mAh/cc when the composite material is incorporated into an electrode of a lithium based energy storage device, for example a lithium ion battery. The volumetric capacity of the composite materials can be calculated from multiplying the maximum gravimetric capacity (mAh/g) with the pycnometer, skeletal density (g/cc) prior to electrochemical testing. In other embodiments, the gravimetric capacity is at least 900 mAh/cc. In some other embodiments, the gravimetric capacity is at least 1000 mAh/cc. In yet other embodiments, the gravimetric capacity is at least 1100 mAh/cc. In still other embodiments, the gravimetric capacity is at least 1200 mAh/cc. In other embodiments, the gravimetric capacity is at least 1300 mAh/cc, and in other embodiments, the gravimetric capacity is at least 1400 mAh/cc, at least 1500 mAh/cc, at least 1600 mAh/cc, at least 1700 mAh/cc, at least 1800 mAh/cc or even at least 1900 mAh/cc. In yet other embodiments, the gravimetric capacity is between 2000 and 8000 mAh/cc. In still other embodiments, the gravimetric capacity is between 4000 and 7000 mAh/cc. In some particular embodiments the composite materials have a gravimetric capacity ranging from about 2500 mAh/cc to about 3500 mAh/cc. The volumetric and gravimetric capacity can be determined through the use of any number of methods known in the art, for example by incorporating into an electrode half cell with lithium metal counter electrode in a coin cell. The gravimetric specific capacity is determined by dividing the measured capacity by the mass of the electrochemically active carbon materials. The volumetric specific capacity is determined by dividing the measured capacity by the volume of the electrode, including binder and conductivity additive. Methods for determining the volumetric and gravimetric capacity are described in more detail in the Examples.

In addition to various electrochemical modifiers (such as lithium alloying elements), the composite materials comprise lithium metal in some embodiments, either through doping or through electrochemical cycling, in the pores of the carbon component. Lithium plating within pores is seen as beneficial to both the capacity and cycling stability of the hard carbon in some embodiments. Plating within the pores can yield novel nanofiber lithium. In some cases lithium is plated on the outside of the particle. In certain embodiments, the present inventors believe external lithium plating is detrimental to the overall performance as explained in the examples. The presence of both internal and external lithium metal may be measured by cutting a material using a focused ion beam (FIB) and a scanning electron microscope (SEM). Metallic lithium is easily detected in contrast to hard carbon in an SEM. After cycling, and when the material has lithium inserted below 0V, the carbon may be sliced and imaged. In one embodiment the carbon displays lithium in the micropores. In another embodiment the carbon displays lithium in the mesopores. In still another embodiment, the carbon displays no lithium plating on the surface of the carbon. In yet still another embodiment carbon is stored in multiple pore sizes and shapes. The material shape and pore size distribution may uniquely and preferentially promote pore plating prior to surface plating. Ideal pore size for lithium storage is explained below.

In certain embodiments, the particle size distribution of the composite materials is believed to contribute to power performance and/or volumetric capacity. As the packing improves, the volumetric capacity will typically increase. In one embodiment the particle size distributions are either Gaussian with a single peak in shape, bimodal, or polymodal (>2 distinct peaks). The properties of particle size of the composite can be described by the D0 (smallest particle in the distribution), D50 (average particle size) and D100 (maximum size of the largest particle). The optimal combination of particle packing and performance will be some combination of the size ranges below.

In one embodiment the D0 of the composite ranges from 1 nm to 5 microns. In another embodiment the D0 of the composite ranges from 5 nm to 1 micron, 5 nm to 500 nm, 5 nm to 100 nm or 10 nm to 50 nm. In another embodiment the D0 of the composite ranges from 500 to 2 microns, 750 nm to 1 micron or 1 microns to 2 microns. In still another embodiment, the D0 of the composite ranges from 2 to 5 microns or even greater than 5 microns.

In one embodiment the D50 of the composite ranges from 5 nm to 20 microns. In another embodiment the D50 of the composite ranges from 5 nm to 1 micron, 5 nm to 500 nm, 5 nm to 100 nm or 10 nm to 50 nm. In another embodiment the D50 of the composite ranges from 500 to 2 microns, 750 nm to 1 micron or 1 microns to 2 microns. In still another embodiment, the D50 of the composite ranges from 2 to 20 microns, 3 microns to 10 microns, 4 microns to 8 microns or is greater than 20 microns.

In one embodiment the D100 of the composite ranges from 8 nm to 100 microns. In another embodiment the D100 of the composite ranges from 5 nm to 1 micron, 5 nm to 500 nm, 5 nm to 100 nm or 10 nm to 50 nm. In another embodiment the D100 of the composite ranges from 500 to 2 microns, 750 nm to 1 micron or 1 microns to 2 microns. In still another embodiment, the D100 of the composite ranges from 2 to 100 microns, 5 to 50 microns, 8 to 40 microns, 10 to 35 microns, 15 to 30 microns, 20 to 30 microns, about 25 microns or greater than 100 microns.

In still other embodiments the present disclosure provides a composite material, wherein when the composite material is incorporated into an electrode of a lithium based energy storage device the composite material has a volumetric capacity at least 10% greater than when the lithium based energy storage device comprises a graphite electrode. In some embodiments, the lithium based energy storage device is a lithium ion battery. In other embodiments, the composite material has a volumetric capacity in a lithium based energy storage device that is at least 5% greater, at least 10% greater or at least 15% greater than the volumetric capacity of the same electrical energy storage device having a graphite electrode. In still other embodiments, the composite material has a volumetric capacity in a lithium based energy storage device that is at least 20% greater, at least 30% greater, at least 40% greater, at least 50% greater, at least 200% greater, at least 100% greater, at least 150% greater, or at least 200% greater than the volumetric capacity of the same electrical energy storage device having a graphite electrode.

While not wishing to be bound by theory, the present applicants believe the superior properties of the disclosed composite materials is related, at least in part, to its unique properties such as surface area, purity, pore structure, crystallinity and/or surface chemistry, etc. For example, in some embodiments the specific surface area (as measured by BET analysis or in other embodiments by using $CO_2$ absorption) of the composite materials may be low (<50 $m^2/g$), medium (from about 50 $m^2/g$ to about 100 $m^2/g$) or high (>100 $m^2/g$) or have a surface area that spans one or more of these ranges. For example, in some embodiments the surface area ranges from about 0.1 $m^2/g$ to about 50 $m^2/g$ for example from about 1 $m^2/g$ to about 20 $m^2/g$. In other particular embodiments, the surface area ranges from about 5 $m^2/g$ to about 10 $m^2/g$ for example the surface area may be about 8 $m^2/g$.

In some embodiments, the specific surface area of the composite materials is less than about 100 $m^2/g$. In other embodiments, the specific surface area is less than about 50 $m^2/g$. In other embodiments, the specific surface area is less than about 20 $m^2/g$. In other embodiments, the specific surface area is less than about 10 $m^2/g$. In other embodiments, the specific surface area is less than about 5 $m^2/g$.

In some embodiments the surface area of the composite materials ranges from about 1 $m^2/g$ to about 50 $m^2/g$. In some other embodiments the surface area ranges from about 20 $m^2/g$ to about 50 $m^2/g$. In yet other embodiments the surface area ranges from about 1 $m^2/g$ to about 20 $m^2/g$, for example from about 2 $m^2/g$ to about 15 $m^2/g$. While not limiting in any way, some embodiments which comprise a surface area ranging from about 1 $m^2/g$ to about 20 $m^2/g$ for example from about 5 $m^2/g$ to about 10 $m^2/g$ have also been found to have good first cycle efficiency (e.g., >80%).

Other embodiments include composite materials comprising medium surface area (from 50 to 100 $m^2/g$). In some embodiments the surface area ranges from about 50 $m^2/g$ to about 75 $m^2/g$. In some other embodiments the surface area ranges from about 50 $m^2/g$ to about 60 $m^2/g$. In yet other embodiments the surface area ranges from about 60 $m^2/g$ to about 100 $m^2/g$. In yet other embodiments the surface area ranges from about 60 $m^2/g$ to about 80 $m^2/g$.

In still other embodiments, the composite materials comprise high surface area (>100 $m^2/g$). In some embodiments the surface area ranges from about 100 $m^2/g$ to about 500 $m^2/g$. In some other embodiments the surface area ranges from about 100 $m^2/g$ to about 200 $m^2/g$.

The surface area of the composite may be modified through activation. The activation method may use steam, chemical activation, $CO_2$ or other gasses. Methods for activation of carbon material are well known in the art.

The carbon material may be doped with lithium atoms, wherein the lithium is in ionic form and not in the form of lithium metal. These lithium atoms may or may not be able to be separated from the carbon. The number of lithium atoms to 6 carbon atoms can be calculated by techniques known to those familiar with the art:

$$\#Li = Q \times 3.6 \times MM / (C\% \times F)$$

Wherein Q is the lithium extraction capacity measured in mAh/g between the voltages of 5 mV and 2.0V versus lithium metal, MM is 72 or the molecular mass of 6 carbons, F is Faraday's constant of 96500, C % is the mass percent carbon present in the structure as measured by CHNO or XPS.

The material can be characterized by the ratio of lithium atoms to carbon atoms (Li:C) which, in some embodiments, ranges from about 0:6 to about 2:6. In some embodiments the Li:C ratio ranges from about 0.05:6 to about 1.9:6. In other embodiments the maximum Li:C ratio wherein the lithium is in ionic and not metallic form is 2.2:6. In certain other embodiments, the Li:C ratio ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the Li:C ratio is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

In certain other embodiments, the carbon materials comprise an Li:C ratio ranging from about 1:6 to about 2.5:6, from about 1.4:6 to about 2.2:6 or from about 1.4:6 to about 2:6. In still other embodiments, the carbon materials may not necessarily include lithium, but instead have a lithium uptake capacity (i.e., the capability to uptake a certain quantity of lithium). While not wishing to be bound by theory, it is believed the lithium uptake capacity of the carbon materials contributes to their superior performance in lithium based energy storage devices. The lithium uptake capacity is expressed as a ratio of the atoms of lithium taken up by the carbon per atom of carbon. In certain other embodiments, the carbon materials comprise a lithium uptake capacity ranging from about 1:6 to about 2.5:6, from about 1.4:6 to about 2.2:6 or from about 1.4:6 to about 2:6.

In certain other embodiments, the lithium uptake capacity ranges from about 1.2:6 to about 2:6, from about 1.3:6 to about 1.9:6, from about 1.4:6 to about 1.9:6, from about 1.6:6 to about 1.8:6 or from about 1.7:6 to about 1.8:6. In other embodiments, the lithium uptake capacity is greater than 1:6, greater than 1.2:6, greater than 1.4:6, greater than 1.6:6 or even greater than 1.8:6. In even other embodiments, the Li:C ratio is about 1.4:6, about 1.5:6, about 1.6:6, about 1.6:6, about 1.7:6, about 1.8:6 or about 2:6. In a specific embodiment the Li:C ratio is about 1.78:6.

Different methods of doping lithium may include chemical reactions, electrochemical reactions, physical mixing of particles, gas phase reactions, solid phase reactions, and liquid phase reactions. In other embodiments the lithium is in the form of lithium metal.

Since the total pore volume of the carbon component of the composite may partially relate to the incorporation of large amounts of electrochemical modifier and hence the storage of lithium ions, the internal ionic kinetics, as well as the available composite/electrolyte surfaces capable of charge-transfer, this is one parameter that can be adjusted in the carbon prior to incorporation of electrochemical modifier to obtain the desired electrochemical properties in the final composite. Some embodiments include composite materials having carbons with low total pore volume (e.g., less than about 0.1 cc/g). In one embodiment, the total pore volume of the carbon without the added electrochemical modifier is less than about 0.01 cc/g. In another embodiment, the total pore volume of the carbon without electrochemical modifier is less than about 0.001 cc/g. In yet another embodiment, the total pore volume of the carbon without electrochemical modifier is less than about 0.0001 cc/g.

In one embodiment, the total pore volume of the composite materials ranges from about 0.00001 cc/g to about 0.1 cc/g, for example from about 0.0001 cc/g to about 0.01 cc/g. In some other embodiments, the total pore volume of the composite materials ranges from about 0.001 cc/g to about 0.01 cc/g.

In other embodiments, the composite materials comprise a total pore volume of greater than or equal to 0.1 cc/g, and in other embodiments the composite materials comprise a total pore volume less than or equal to 0.6 cc/g. In other embodiments, the composite materials comprise a total pore volume ranging from about 0.1 cc/g to about 0.6 cc/g. In some other embodiments, the total pore volume of the composite materials ranges from about 0.1 cc/g to about 0.2 cc/g. In some other embodiments, the total pore volume of the composite materials ranges from about 0.2 cc/g to about 0.3 cc/g. In some other embodiments, the total pore volume of the composite materials ranges from about 0.3 cc/g to about 0.4 cc/g. In some other embodiments, the total pore volume of the composite materials ranges from about 0.4 cc/g to about 0.5 cc/g. In some other embodiments, the total pore volume of the composite materials ranges from about 0.5 cc/g to about 0.6 cc/g.

In certain embodiments, the present invention also includes composite materials having high total pore volume, for example greater than 0.6 cc/g. In some other embodiments, the total pore volume of the composite materials ranges from about 0.6 cc/g to about 2.0 cc/g. In some other embodiments, the total pore volume of the composite materials ranges from about 0.6 cc/g to about 1.0 cc/g. In some other embodiments, the total pore volume of the composite materials ranges from about 1.0 cc/g to about 1.5 cc/g. In some other embodiments, the total pore volume of the composite materials ranges from about 1.5 cc/g to about 2.0 cc/g.

In some embodiments, the composite materials comprise a majority (e.g., >50%) of the total pore volume residing in pores of a certain diameter. For example, in some embodiments greater than 50%, greater than 60%, greater than 70%, greater than 80%, greater than 90% or even greater than 95% of the total pore volume resides in pores having a diameter of 1 nm or less. In other embodiments greater than 50%, greater than 60%, greater than 70%, greater than 80%, greater than 90% or even greater than 95% of the total pore volume resides in pores having a diameter of 100 nm or less. In other embodiments greater than 50%, greater than 60%, greater than 70%, greater than 80%, greater than 90% or even greater than 95% of the total pore volume resides in pores having a diameter of 0.5 nm or less.

In some embodiments, the tap density of the composite materials is predictive of their electrochemical performance, for example the volumetric capacity. While not limiting in any way, the pore volume of a composite material may be related to its tap density and composite s having low pore volume are sometimes found to have high tap density (and vice versa). Accordingly, composite materials having low tap density (e.g., <0.3 g/cc), medium tap density (e.g., from 0.3 to 0.75 g/cc) or high tap density (e.g., >0.75 g/cc) are provided.

In some other embodiments, the composite materials comprise a tap density less than 0.3 g/cc. In yet some other embodiments, the composite materials comprise a tap density ranging from about 0.05 g/cc to about 0.25 g/cc. In some embodiments, the composite materials comprise a tap density ranging from about 0.1 g/cc to about 0.2 g/cc.

In yet some other embodiments, the composite materials comprise a tap density greater than or equal to 0.3 g/cc. In yet some other embodiments, the composite materials comprise a tap density ranging from about 0.3 g/cc to about 0.75 g/cc. In some embodiments, the composite materials comprise a tap density ranging from about 0.35 g/cc to about 0.45 g/cc. In some other embodiments, the composite materials comprise a tap density ranging from about 0.30 g/cc to about 0.40 g/cc. In some embodiments, the composite materials comprise a tap density ranging from about 0.40 g/cc to about 0.50 g/cc. In some embodiments, the composite materials comprise a tap density ranging from about 0.5 g/cc to about 0.75 g/cc. In some embodiments of the foregoing, the composite materials comprise a medium total pore volume (e.g., from about 0.1 cc/g to about 0.6 cc/g).

In yet some other embodiments, the composite materials comprise a tap density greater than about 0.5 g/cc. In some other embodiments, the composite materials comprise a tap density ranging from about 0.5 g/cc to about 2.0 g/cc. In some other embodiments, the composite materials comprise a tap density ranging from about 0.5 g/cc to about 1.0 g/cc. In some embodiments, the composite materials comprise a tap density ranging from about 0.5 g/cc to about 0.75 g/cc. In some embodiments, the composite materials comprise a tap density ranging from about 0.75 g/cc to about 1.0 g/cc, for example from about 0.75 g/cc to about 0.95 g/cc. In some embodiments of the foregoing, the composite materials comprise a low, medium or high tap density.

The density of the composite materials can also be characterized by their skeletal density as measured by helium pycnometry. In certain embodiments, the skeletal density of the composite materials ranges from about 1 g/cc to about 3 g/cc, for example from about 1.5 g/cc to about 2.3 g/cc. In other embodiments, the skeletal density ranges from about 1.5 cc/g to about 1.6 cc/g, from about 1.6 cc/g to about 1.7 cc/g, from about 1.7 cc/g to about 1.8 cc/g, from about 1.8 cc/g to about 1.9 cc/g, from about 1.9 cc/g to about 2.0 cc/g, from about 2.0 cc/g to about 2.1 cc/g, from about 2.1 cc/g to about 2.2 cc/g or from about 2.2 cc/g to about 2.4 cc/g.

In one embodiment, the total pore volume of the carbon component ranges from about 0.00001 cc/g to about 0.1 cc/g, for example from about 0.0001 cc/g to about 0.01 cc/g. In some other embodiments, the total pore volume of the carbon component ranges from about 0.001 cc/g to about 0.01 cc/g.

In other embodiments, the carbon component comprises a total pore volume ranging greater than or equal to 0.1 cc/g, and in other embodiments the carbon component comprises a total pore volume less than or equal to 0.6 cc/g. In other embodiments, the carbon component comprises a total pore volume ranging from about 0.1 cc/g to about 0.6 cc/g. In some other embodiments, the total pore volume of the carbon component ranges from about 0.1 cc/g to about 0.2 cc/g. In some other embodiments, the total pore volume of the carbon component ranges from about 0.2 cc/g to about 0.3 cc/g. In some other embodiments, the total pore volume of the carbon component ranges from about 0.3 cc/g to about 0.4 cc/g. In some other embodiments, the total pore volume of the carbon component ranges from about 0.4 cc/g to about 0.5 cc/g. In some other embodiments, the total pore volume of the carbon component ranges from about 0.5 cc/g to about 0.6 cc/g.

The present invention also includes composites comprising carbon components having high total pore volume, for example greater than 0.6 cc/g. In some other embodiments, the total pore volume of the carbon component ranges from about 0.6 cc/g to about 2.0 cc/g. In some other embodiments, the total pore volume of the carbon component ranges from about 0.6 cc/g to about 1.0 cc/g. In some other embodiments, the total pore volume of the carbon component ranges from about 1.0 cc/g to about 1.5 cc/g. In some other embodiments, the total pore volume of the carbon component ranges from about 1.5 cc/g to about 2.0 cc/g.

In some embodiments, the carbon component comprises a majority (e.g., >50%) of the total pore volume residing in pores of a certain diameter. For example, in some embodiments greater than 50%, greater than 60%, greater than 70%, greater than 80%, greater than 90% or even greater than 95% of the total pore volume resides in pores having a diameter of 1 nm or less. In other embodiments greater than 50%, greater than 60%, greater than 70%, greater than 80%, greater than 90% or even greater than 95% of the total pore volume resides in pores having a diameter of 100 nm or less. In other embodiments greater than 50%, greater than 60%, greater than 70%, greater than 80%, greater than 90% or even greater than 95% of the total pore volume resides in pores having a diameter of 0.5 nm or less.

In some embodiments, the tap density of the carbon component is predictive of its ability to incorporate electrochemical modifiers and hence electrochemical performance, for example the volumetric capacity. While not limiting in any way, the pore volume of a carbon component may be related to its tap density and carbon components having low pore volume are sometimes found to have high tap density (and vice versa). Accordingly, carbon components having low tap density (e.g., <0.3 g/cc), medium tap density (e.g., from 0.3 to 0.5 g/cc) or high tap density (e.g., >0.5 g/cc) are provided as components of the composite.

In yet some other embodiments, the carbon component comprises a tap density greater than or equal to 0.3 g/cc. In yet some other embodiments, the carbon component comprises a tap density ranging from about 0.3 g/cc to about 0.5 g/cc. In some embodiments, the carbon component comprises a tap density ranging from about 0.35 g/cc to about 0.45 g/cc. In some other embodiments, the carbon component comprises a tap density ranging from about 0.30 g/cc to about 0.40 g/cc. In some embodiments, the carbon component comprises a tap density ranging from about 0.40 g/cc to about 0.50 g/cc. In some embodiments of the foregoing, the carbon component comprises a medium total pore volume (e.g., from about 0.1 cc/g to about 0.6 cc/g).

In yet some other embodiments, the carbon component comprises a tap density greater than about 0.5 g/cc. In some other embodiments, the carbon component comprises a tap density ranging from about 0.5 g/cc to about 2.0 g/cc. In some other embodiments, the carbon component comprises a tap density ranging from about 0.5 g/cc to about 1.0 g/cc. In some embodiments, the carbon component comprises a tap density ranging from about 0.5 g/cc to about 0.75 g/cc. In some embodiments, the carbon component comprises a tap density ranging from about 0.75 g/cc to about 1.0 g/cc, for example from about 0.75 g/cc to about 0.95 g/cc. In some embodiments of the foregoing, the carbon component comprises a low, medium or high total pore volume.

Their skeletal density as measured by helium pycnometry can also characterize the density of the carbon component. In certain embodiments, the skeletal density of the carbon component ranges from about 1 g/cc to about 3 g/cc, for example from about 1.5 g/cc to about 2.3 g/cc. In other embodiments, the skeletal density ranges from about 1.5 cc/g to about 1.6 cc/g, from about 1.6 cc/g to about 1.7 cc/g, from about 1.7 cc/g to about 1.8 cc/g, from about 1.8 cc/g to about 1.9 cc/g, from about 1.9 cc/g to about 2.0 cc/g, from about 2.0 cc/g to about 2.1 cc/g, from about 2.1 cc/g to about 2.2 cc/g or from about 2.2 cc/g to about 2.3 cc/g.

The properties of the carbon component can easily be measured before incorporation of the electrochemical modifier. The properties of the carbon component can also be measured by removal of the electrochemical modifier after the fact. In the case of silicon this can easily be accomplished by dissolving the silicon with a solvent that does not impact the carbon and then measuring the properties of the carbon without electrochemical modifier.

As discussed in more detail below, the surface functionality of the presently disclosed composite materials may be altered to obtain the desired electrochemical properties. One property which can be predictive of surface functionality is the pH of the composite materials. The presently disclosed composite materials comprise pH values ranging from less than 1 to about 14, for example less than 5, from 5 to 8 or greater than 8. In some embodiments, the pH of the composite materials is less than 4, less than 3, less than 2 or even less than 1. In other embodiments, the pH of the composite materials is between about 5 and 6, between about 6 and 7, between about 7 and 8 or between 8 and 9 or between 9 and 10. In still other embodiments, the pH is high and the pH of the composite materials ranges is greater than 8, greater than 9, greater than 10, greater than 11, greater than 12, or even greater than 13.

Figure 3:
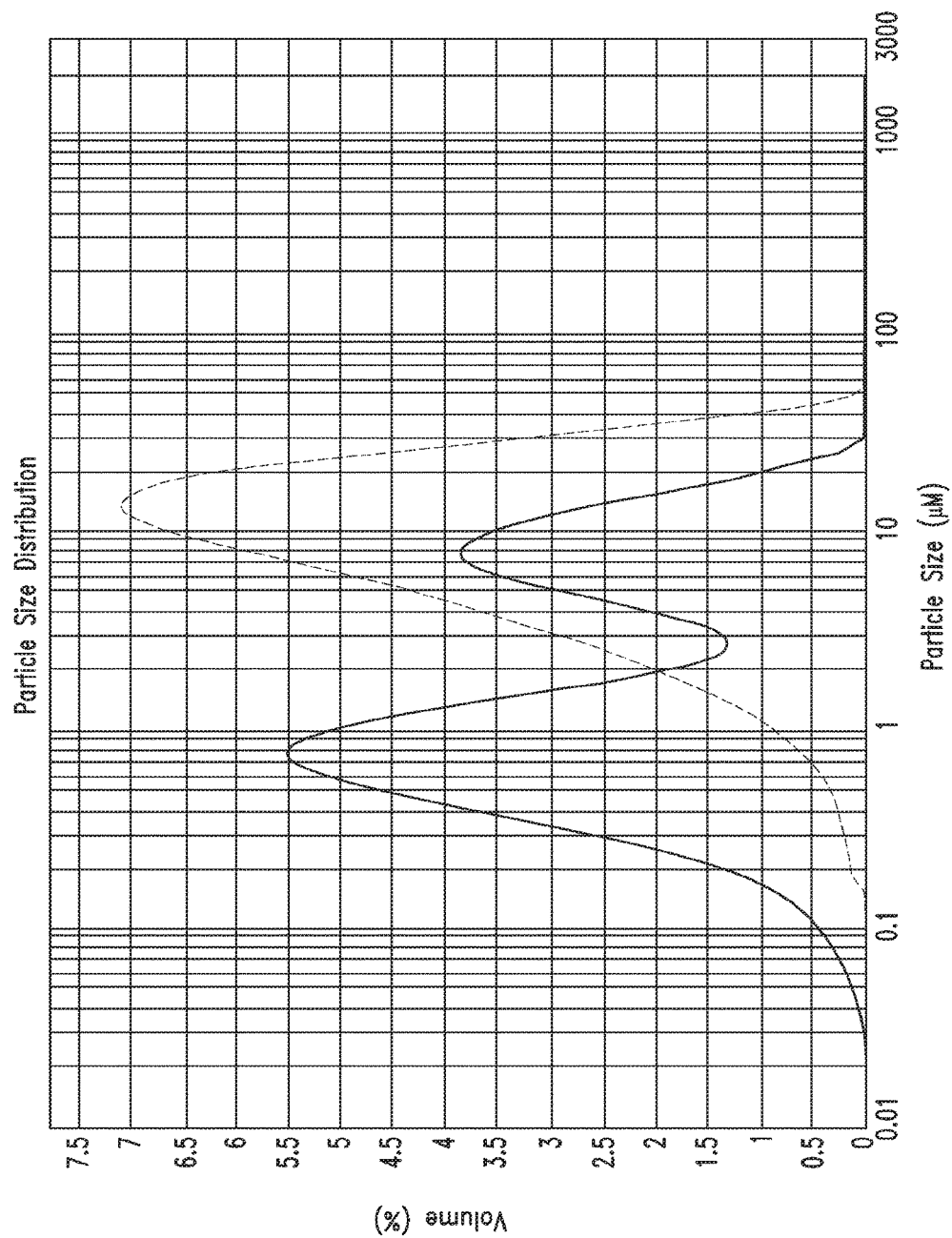
FIG. 3 presents pore size distributions of exemplary carbon materials.

Pore size distribution of the carbon component may, in some embodiments, contribute to both the storage capacity of the composite material and the kinetics and power capability of the system as well as the ability to incorporate large amounts of electrochemical modifiers. The pore size distribution can range from micro to meso to macro (see e.g., FIG. 1) and may be either monomodal, bimodal or multimodal (i.e., may comprise one or more different distribution of pore sizes, see e.g., FIG. 3). Micropores, with average pore sizes less than 1 nm, may create additional storage sites as well as lithium (or sodium) ion diffusion paths. Graphite sheets typically are spaced 0.33 nm apart for lithium storage. While not wishing to be bound by theory, it is thought that large quantities of pores of similar size may yield graphite-like structures within pores with additional hard carbon-type storage in the bulk structure. Mesopores are typically below 100 nm. These pores are ideal locations for nano particle dopants, such as metals, and provide pathways for both conductive additive and electrolyte for ion and electron conduction. In some embodiments the carbon materials comprise macropores greater than 100 nm which may be especially suited for large particle doping.

Pore size distribution of the composite may be important to both the storage capacity of the material and the kinetics and power capability of the system as well as the ability to incorporate large amounts of electrochemical modifiers. The pore size distribution can range from micro to meso to macro and may be either monomodal, bimodal or multimodal. In some embodiments the composite materials comprise micropores less than 100 nm which may be especially suited for lithium diffusion.

Accordingly, in one embodiment, the carbon material comprises a fractional pore volume of pores at or below 1 nm that comprises at least 50% of the total pore volume, at least 75% of the total pore volume, at least 90% of the total pore volume or at least 99% of the total pore volume. In other embodiments, the carbon material comprises a fractional pore volume of pores at or below 10 nm that comprises at least 50% of the total pore volume, at least 75% of the total pore volume, at least 90% of the total pore volume or at least 99% of the total pore volume. In other embodiments, the carbon material comprises a fractional pore volume of pores at or below 50 nm that comprises at least 50% of the total pore volume, at least 75% of the total pore volume, at least 90% of the total pore volume or at least 99% of the total pore volume.

In another embodiment, the carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon material comprises a fractional pore surface area of pores at or greater than 100 nm that comprises at least 50% of the total pore surface area, at least 75% of the total pore surface area, at least 90% of the total pore surface area or at least 99% of the total pore surface area.

In another embodiment, the carbon material comprises pores predominantly in the range of 100 nm or lower, for example 10 nm or lower, for example 5 nm or lower. Alternatively, the carbon material comprises micropores in the range of 0-2 nm and mesopores in the range of 2-100 nm. The ratio of pore volume or pore surface in the micropore range compared to the mesopore range can be in the range of 95:5 to 5:95.

In some embodiments, the median particle diameter for the composite materials ranges from 0.5 to 1000 microns. In other embodiments the median particle diameter for the composite materials ranges from 1 to 100 microns. Still in other embodiments the median particle diameter for the composite materials ranges from 1 to 50 microns. Yet in other embodiments, the median particle diameter for the composite materials ranges from 5 to 15 microns or from 1 to 5 microns. Still in other embodiments, the median particle diameter for the composite materials is about 10 microns. Still in other embodiments, the median particle diameter for the composite materials is less than 4, is less than 3, is less than 2, is less than 1 microns.

In some embodiments, the composite materials exhibit a median particle diameter ranging from 1 micron to 5 microns. In other embodiments, the median particle diameter ranges from 5 microns to 10 microns. In yet other embodiments, the median particle diameter ranges from 10 nm to 20 microns. Still in other embodiments, the median particle diameter ranges from 20 nm to 30 microns. Yet still in other embodiments, the median particle diameter ranges from 30 microns to 40 microns. Yet still in other embodiments, the median particle diameter ranges from 40 microns to 50 microns. In other embodiments, the median particle diameter ranges from 50 microns to 100 microns. In other embodiments, the median particle diameter ranges in the submicron range <1 micron.

In other embodiments, the carbon components are microporous (e.g., greater than 50% of pores less than 1 nm) and comprise monodisperse micropores. For example in some embodiments the carbon components are microporous, and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In other embodiments, the carbon components are mesoporous (e.g., greater than 50% of pores less than 100 nm) and comprise monodisperse mesopores. For example in some embodiments, the carbon components are mesoporous and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In other embodiments, the carbon components are macroporous (e.g., greater than 50% of pores greater than 100 nm) and comprise monodisperse macropores. For example in some embodiments, the carbon components are macroporous and (Dv90−Dv10)/Dv50, where Dv10, Dv50 and Dv90 refer to the pore size at 10%, 50% and 90% of the distribution by volume, is about 3 or less, typically about 2 or less, often about 1.5 or less.

In some other embodiments, the carbon components have a bimodal pore size distribution. For example, in some embodiments the carbon component comprise a population of micropores and a population of mesopores. In some embodiments, the ratio of micropores to mesopores ranges from about 1:10 to about 10:1, for example from about 1:3 to about 3:1.

In some embodiments, the carbon component comprises pores having a peak height found in the pore volume distribution ranging from 0.1 nm to 0.25 nm. In other embodiments, the peak height found in the pore volume distribution ranges from 0.25 nm to 0.50 nm. Yet in other embodiments, the peak height found in the pore volume distribution ranges from 0.75 nm to 1.0 nm. Still in other embodiments, the peak height found in the pore volume distribution ranges from 0.1 nm to 0.50 nm. Yet still in other embodiments, the peak height found in the pore volume distribution ranges from 0.50 nm to 1.0 nm.

In some embodiments, the carbon component comprises pores having a peak height found in the pore volume distribution ranging from 2 nm to 10 nm. In other embodiments, the peak height found in the pore volume distribution ranges from 10 nm to 20 nm. Yet in other embodiments, the peak height found in the pore volume distribution ranges from 20 nm to 30 nm. Still in other embodiments, the peak height found in the pore volume distribution ranges from 30 nm to 40 nm. Yet still in other embodiments, the peak height found in the pore volume distribution ranges from 40 nm to 50 nm. In other embodiments, the peak height found in the pore volume distribution ranges from 50 nm to 100 nm.

While not wishing to be bound by theory, the present inventors believe that the extent of disorder in the carbon component and composite materials may have an impact on the electrochemical properties of the carbon materials. For example, the data in Table 4 (see Examples) shows a possible trend between the available lithium sites for insertion and the range of disorder/crystallite size. Thus controlling the extent of disorder in the carbon component provides a possible avenue to improve the rate capability for carbons since a smaller crystallite size may allow for lower resistive lithium ion diffusion through the amorphous structure. The present invention includes embodiments which comprise both high and low levels of disorder.

Figure 4:
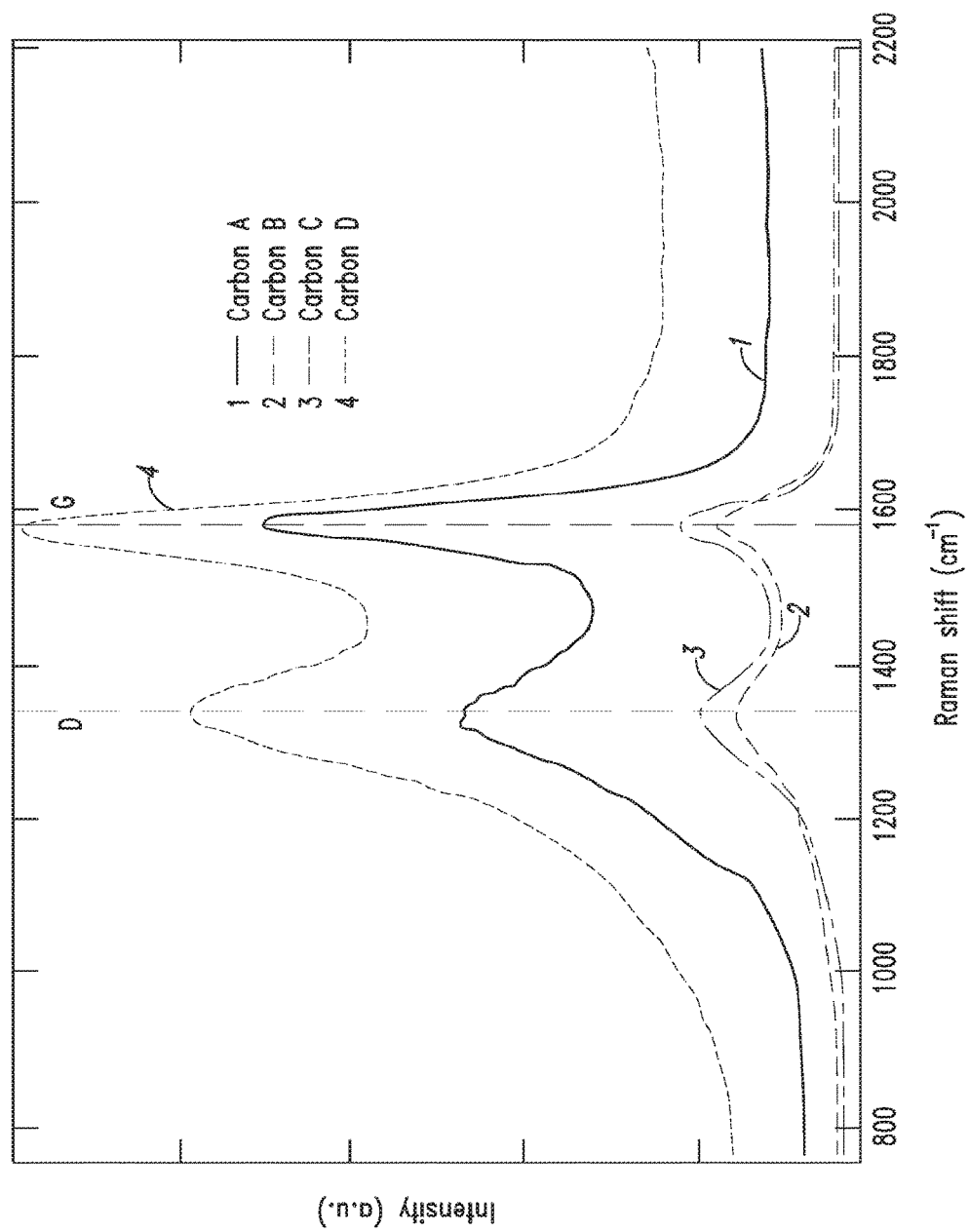
FIG. 4 depicts RAMAN spectra of exemplary carbon materials.

Disorder, as recorded by RAMAN spectroscopy, is a measure of the size of the crystallites found within both amorphous and crystalline structures (M. A. Pimenta, G. Dresselhaus, M. S. Dresselhaus, L. G. Can ado, A. Jorio, and R. Saito, "Studying disorder in graphite-based systems by Raman spectroscopy," Physical Chemistry Chemical Physics, vol. 9, no. 11, p. 1276, 2007). RAMAN spectra of exemplary carbon are shown in FIG. 4. For carbon structures, crystallite sizes ($L_a$) can be calculated from the relative peak intensities of the D and G Raman shifts (Eq 1)

$$L_a(nm) = (2.4 \times 10^{-10}) \lambda^4_{laser} R^{-1} \tag{1}$$

where $$R = I_D/I_G \tag{2}$$

The values for R and $L_a$ can vary in certain embodiments, and their value may affect the electrochemical properties of the carbon materials, for example the capacity of the $2^{nd}$ lithium insertion ($2^{nd}$ lithium insertion is related to first cycle efficiency since first cycle efficiency=(capacity at $1^{st}$ lithium insertion/capacity at $2^{nd}$ lithium insertion)×100). For example, in some embodiments R ranges from about 0 to about 1 or from about 0.50 to about 0.95. In other embodiments, R ranges from about 0.60 to about 0.90. In other embodiments, R ranges from about 0.80 to about 0.90. $L_a$ also varies in certain embodiments and can range from about 1 nm to about 500 nm. In certain other embodiments, La ranges from about 5 nm to about 100 nm or from about 10 to about 50 nm. In other embodiments, La ranges from about 15 nm to about 30 nm, for example from about 20 to about 30 nm or from about 25 to 30 nm.

In a related embodiment, the electrochemical properties of the carbon component are related to the level of crystallinity as measured by X-ray diffraction (XRD). While Raman measures the size of the crystallites, XRD records the level of periodicity in the bulk structure through the scattering of incident X-rays (see e.g., FIG. 5). The present invention includes composites comprising carbon materials that are non-graphitic (crystallinity <10%) and semi-graphitic (crystallinity between 10 and 50%). The crystallinity of the carbon component ranges from about 0% to about 99%. In some embodiments, the carbon component comprises less than 10% crystallinity, less than 5% crystallinity or even less than 1% crystallinity (i.e., highly amorphous). In other embodiments, the carbon component comprises from 10% to 50% crystallinity. In still other embodiments, the carbon component comprises less than 50% crystallinity, less than 40% crystallinity, less than 30% crystallinity or even less than 20% crystallinity.

In a related embodiment, the electrochemical properties of the composite materials are related to the level of crystallinity as measured by X-ray diffraction (XRD). The present invention includes composite materials that are non-crystalline (crystallinity <10%) and semi-crystalline (crystallinity between 10 and 50%) and crystalline (>50%). The crystallinity of the composite materials ranges from about 0% to about 99%. In some embodiments, the carbon materials without electrochemical modifier comprise less than 10% crystallinity, less than 5% crystallinity or even less than 1% crystallinity (i.e., highly amorphous). In other embodiments, the composite materials comprise from 10% to 50% crystallinity. In still other embodiments, the composite materials comprise less than 50% crystallinity, less than 40% crystallinity, less than 30% crystallinity or even less than 20% crystallinity. In a related embodiment, the electrochemical performance of the carbon materials without electrochemical modifier are related to the empirical values, R, as calculated from Small Angle X-ray Diffraction (SAXS), wherein R=B/A and B is the height of the double layer peak and A is the baseline for the single graphene sheet as measured by SAXS.

Figure 6:
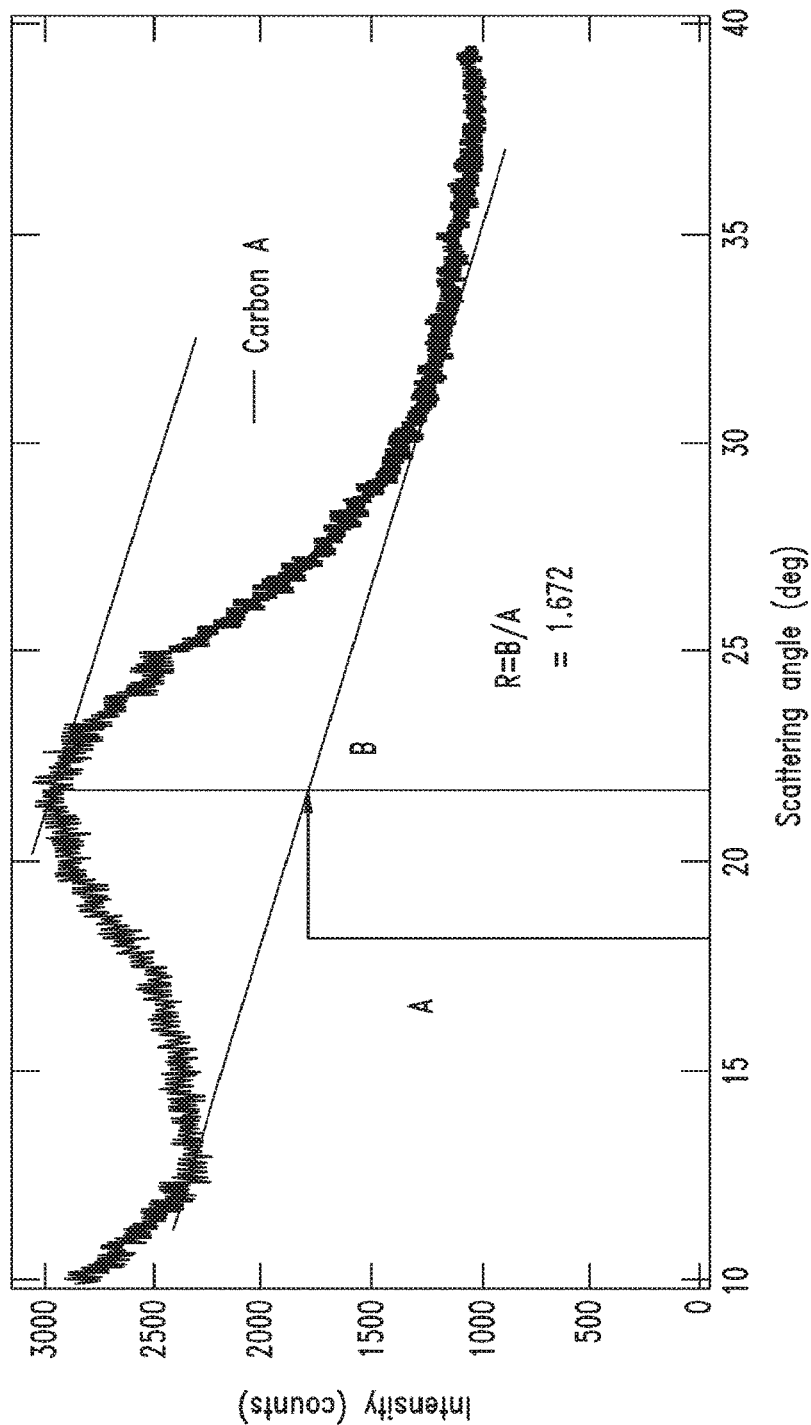
FIG. 6 shows an example SAXS plot along with the calculation of the empirical R value for determining internal pore structure.
Figure 7:
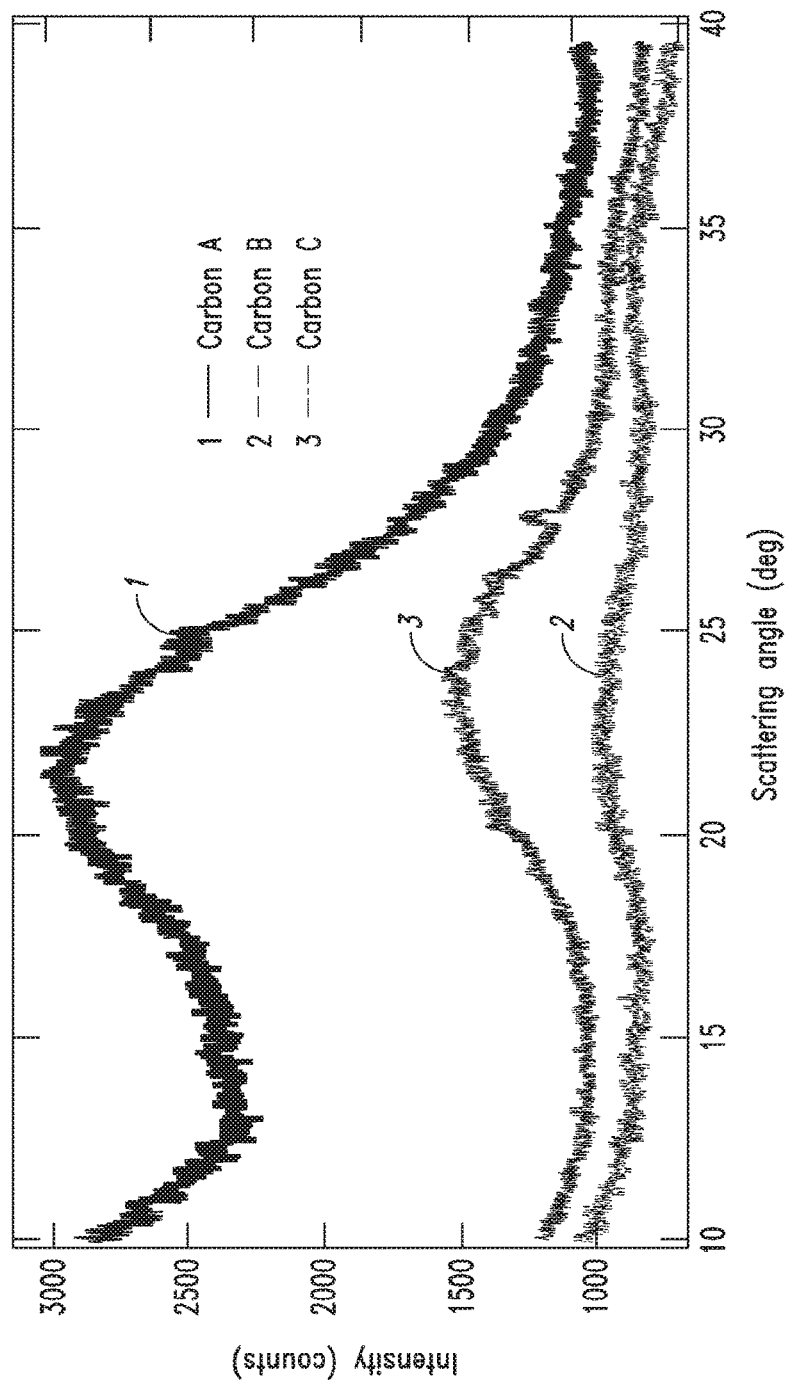
FIG. 7 presents SAXS of three exemplary carbon materials.

SAXS has the ability to measure internal pores, perhaps inaccessible by gas adsorption techniques but capable of lithium storage. In certain embodiments, the R factor is below 1, comprising single layers of graphene. In other embodiments, the R factor ranges from about 0.1 to about 20 or from about 1 to 10. In yet other embodiments, the R factor ranges from 1 to 5, from 1 to 2, or from 1.5 to 2. In still other embodiments, the R factor ranges from 1.5 to 5, from 1.75 to 3, or from 2 to 2.5. Alternatively, the R factor is greater than 10. The SAXS pattern may also be analyzed by the number of peaks found between 10° and 40°. In some embodiments, the number of peaks found by SAXS at low scattering angles are 1, 2, 3, or even more than 3. FIGS. 6 and 7 present representative SAXS plots.

In certain embodiments, the organic content of either the composite materials or the carbon materials can be manipulated to provide the desired properties, for example by contacting the materials with a hydrocarbon compound such as cyclohexane and the like. Infra-red spectroscopy (FTIR) can be used as a metric to determine the organic content of both surface and bulk structures of the materials (see e.g., FIG. 8A.). In one embodiment, the carbon component comprises essentially no organic material. An FTIR spectra which is essentially featureless is indicative of such embodiments (e.g., carbons B and D). In other embodiments, the carbon component comprises organic material, either on the surface or within the bulk structure. In such embodiments, the FTIR spectra generally depict large hills and valleys which indicates the presence of organic content.

The organic content may have a direct relationship to the electrochemical performance (FIG. 8b) and response of the material when placed into a lithium bearing device for energy storage. Carbon components with flat FTIR signals (no organics) often display a low extraction peak in the voltage profile at 0.2 V. Well known to the art, the extract voltage is typical of lithium stripping. In certain embodiments, the carbon component comprises organic content and the lithium stripping plateau is absent or near absent.

The carbon component comprises varying amounts of carbon, oxygen, hydrogen and nitrogen as measured by gas chromatography CHNO analysis in various embodiments. In one embodiment, the carbon content is greater than 98 wt. % or even greater than 99.9 wt % as measured by CHNO analysis. In another embodiment, the carbon content ranges from about 10 wt % to about 99.9%, for example from about 50 to about 98 wt. % of the total mass. In yet other embodiments, the carbon content ranges 90 to 98 wt. %, 92 to 98 wt % or greater than 95% of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass.

The composite materials may also comprise varying amounts of carbon, oxygen, hydrogen and nitrogen as measured by gas chromatography CHNO analysis. In one embodiment, the carbon content of the composite is greater than 98 wt. % or even greater than 99.9 wt % as measured by CHNO analysis. In another embodiment, the carbon content of the composite ranges from about 10 wt % to about 99.9%, for example from about 50 to about 98 wt. % of the total mass. In yet other embodiments, the carbon content of the composite ranges 90 to 98 wt. %, 92 to 98 wt % or greater than 95% of the total mass. In yet other embodiments, the carbon content of the composite ranges from 80 to 90 wt. % of the total mass. In yet other embodiments, the carbon content of the composite ranges from 70 to 80 wt. % of the total mass. In yet other embodiments, the carbon content ranges of the composite from 60 to 70 wt. % of the total mass. In yet other embodiments, the carbon content ranges of the composite from 50 to 60 wt. % of the total mass. In yet other embodiments, the carbon content ranges of the composite from 40 to 50 wt. % of the total mass. In yet other embodiments, the carbon content ranges of the composite from 30 to 40 wt. % of the total mass. In yet other embodiments, the carbon content ranges of the composite from 20 to 30 wt. % of the total mass. In yet other embodiments, the carbon content ranges of the composite from 10 to 20 wt. % of the total mass. In yet other embodiments, the carbon content ranges of the composite from 1 to 10 wt. % of the total mass.

In another embodiment, the nitrogen content of the carbon component ranges from 0 to 90 wt. % based on total mass of all components in the carbon material as measured by CHNO analysis. In another embodiment, the nitrogen content ranges from 1 to 10 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %. In some more specific embodiments, the nitrogen content ranges from about 1% to about 6%, while in other embodiments, the nitrogen content ranges from about 0.1% to about 1%. In certain of the above embodiments, the nitrogen content is based on weight relative to total weight of all components in the carbon material The carbon and nitrogen content may also be measured as a ratio of C:N (carbon atoms to nitrogen atoms). In one embodiment, the C:N ratio ranges from 1:0.001 to 0.001:1 or from 1:0.001 to 1:1. In another embodiment, the C:N ratio ranges from 1:0.001 to 1:0.01. In yet another embodiment, the C:N ratio ranges from 1:0.01 to 1:1. In yet another embodiment, the content of nitrogen exceeds the content of carbon, for example the C:N ratio can range from about 0.01:1 to about 0.1:1 or from 0.1:1 to about 0.5:1.

The composite materials may also comprise varying amounts of carbon, oxygen, nitrogen, Cl, and Na, to name a few, as measured by XPS analysis. In one embodiment, the carbon content is greater than 98 wt. % as measured by XPS analysis. In another embodiment, the carbon content ranges from 50 to 98 wt. % of the total mass. In yet other embodiments, the carbon content ranges 90 to 98 wt. % of the total mass. In yet other embodiments, the carbon content ranges from 80 to 90 wt. % of the total mass. In yet other embodiments, the carbon content ranges from 70 to 80 wt. % of the total mass. In yet other embodiments, the carbon content ranges from 60 to 70 wt. % of the total mass.

In other embodiments, the carbon content in the composite ranges from 10% to 99.9%, from 10% to 99%, from 10% to 98%, from 50% to 99.9%, from 50% to 99%, from 50% to 98%, from 75% to 99.9%, from 75% to 99% or from 75% to 98% of the total mass of all components in the carbon material as measured by XPS analysis In another embodiment, the nitrogen content in the composite ranges from 0 to 90 wt. % as measured by XPS analysis. In another embodiment, the nitrogen content ranges from 1 to 75 wt. % of the total mass. In another embodiment, the nitrogen content ranges from 1 to 50 wt. % of the total mass. In another embodiment, the nitrogen content ranges from 1 to 25 wt. % of the total mass. In another embodiment, the nitrogen content ranges from 1 to 20 wt. % of the total mass. In another embodiment, the nitrogen content ranges from 1 to 10 wt. % of the total mass. In another embodiment, the nitrogen content ranges from 1 to 6 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %.

The carbon and nitrogen content may also be measured as a ratio of C:N by XPS. In one embodiment, the C:N ratio of the composite ranges from 0.001:1 to 1:0.001. In one embodiment, the C:N ratio ranges from 0.01:1 to 1:0.01. In one embodiment, the C:N ratio ranges from 0.1:1 to 1:0.01. In one embodiment, the C:N ratio ranges from 1:0.5 to 1:0.001. In one embodiment, the C:N ratio ranges from 1:0.5 to 1:0.01. In one embodiment, the C:N ratio ranges from 1:0.5 to 1:0.1. In one embodiment, the C:N ratio ranges from 1:0.2 to 1:0.01. In one embodiment, the C:N ratio ranges from 1:0.001 to 1:1. In another embodiment, the C:N ratio ranges from 1:0.001 to 0.01. In yet another embodiment, the C:N ratio ranges from 1:0.01 to 1:1. In yet another embodiment, the content of nitrogen exceeds the content of carbon.

The carbon and phosphorus content of the composite may also be measured as a ratio of C:P by XPS. In one embodiment, the C:P ratio of the composite ranges from 0.001:1 to 1:0.001. In one embodiment, the C:P ratio ranges from 0.01:1 to 1:0.01. In one embodiment, the C:P ratio ranges from 0.1:1 to 1:0.01. In one embodiment, the C:P ratio ranges from 1:0.5 to 1:0.001. In one embodiment, the C:P ratio ranges from 1:0.5 to 1:0.01. In one embodiment, the C:P ratio ranges from 1:0.5 to 1:0.1. In one embodiment, the C:P ratio ranges from 1:0.2 to 1:0.01. In one embodiment, the C:P ratio ranges from 1:0.001 to 1:1. In another embodiment, the C:P ratio ranges from 1:0.001 to 0.01. In yet another embodiment, the C:P ratio ranges from 1:0.01 to 1:1. In yet another embodiment, the content of nitrogen exceeds the content of carbon.

XPS may also be used to detect individual bonds between elements. In the case of a modified carbon, the interface between the carbon and the electrochemical modifier may include an C—X bond, wherein X is the primary element that alloys with lithium (such as C—Si bond for a silicon electrochemical modifier). The presence of C—X may affect the performance of the material. This percent of C—X bonds within a composite can be characterized using XPS. In one embodiment the percent of C—X bonds as measured by XPS is between 0% and 50%. In another embodiment the percent of C—X bonds is between 0% and 10%, 0% and 5%, 0% and 3%, 0% and 2%, 0% and 1%, 1% and 2%, between 10% and 50%, or greater than 50%. In yet another embodiment, the C—X bond also produces a material in-situ that is also capable of alloying electrochemically with silicon.

The carbon material can include both sp3 and sp2 hybridized carbons. The percentage of sp2 hybridization can be measured by XPS using the Auger spectrum, as known in the art. It is assumed that for materials which are less than 100% sp2, the remainder of the bonds are sp3. The carbon materials range from about 1% sp2 hybridization to 100% sp2 hybridization. Other embodiments include carbon materials comprising from about 25% to about 95% sp2, from about 50%-95% sp2, from about 50% to about 75% sp2, from about 65% to about 95% sp2 or about 65% sp2.

The composite materials may also be created by incorporation of an electrochemical modifier selected to optimize the electrochemical performance of the non-modified carbon materials. The electrochemical modifier may be incorporated within the pore structure and/or on the surface of the carbon material or incorporated in any number of other ways. For example, in some embodiments, the composite materials comprise a coating of the electrochemical modifier (e.g., silicon or $Al_2O_3$) on the surface of the carbon materials. In some embodiments, the composite materials comprise greater than about 100 ppm of an electrochemical modifier. In certain embodiments, the electrochemical modifier is selected from iron, tin, silicon, nickel, aluminum and manganese.

In certain embodiments the electrochemical modifier comprises an element with the ability to lithiate from 3 to 0 V versus lithium metal (e.g. silicon, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

In certain embodiments, the electrochemical modifier is an efficiency enhancer, such as phosphorous. In other embodiments, the composite comprises a lithium alloying element and an efficiency enhancer, such as phosphorous.

The electrochemical modifier may be provided in any number of forms. For example, in some embodiments the electrochemical modifier comprises a salt. In other embodiments, the electrochemical modifier comprises one or more elements in elemental form, for example elemental iron, tin, silicon, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises silicon. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$. In yet other embodiments, the electrochemical modifier comprises titanium. In yet other embodiments, the electrochemical modifier comprises titanium oxide. In yet other embodiments, the electrochemical modifier comprises lithium. In yet other embodiments, the electrochemical modifier comprises sulfur. In yet other embodiments, the electrochemical modifier comprises phosphorous. In yet other embodiments, the electrochemical modifier comprises molybdenum. In yet other embodiments, the electrochemical modifier comprises germanium. In yet other embodiments, the electrochemical modifier comprises arsenic. In yet other embodiments, the electrochemical modifier comprises gallium. In yet other embodiments, the electrochemical modifier comprises phosphorous. In yet other embodiments, the electrochemical modifier comprises selenium. In yet other embodiments, the electrochemical modifier comprises antimony. In yet other embodiments, the electrochemical modifier comprises bismuth. In yet other embodiments, the electrochemical modifier comprises tellurium. In yet other embodiments, the electrochemical modifier comprises indium.

Accordingly, in some embodiments the composite materials comprise a second carbon allotrope such as, but not limited to, graphite, amorphous carbon (soft and hard), diamond, C60, carbon nanotubes (e.g., single and/or multi-walled), graphene and carbon fibers. In some embodiments, the second carbon form is graphite. In other embodiments, the second form is soft carbon. The ratio of carbon material (e.g., hard carbon) to second carbon allotrope can be tailored to fit any desired electrochemical application. The second carbon allotrope is considered the electrochemical modifier of the hard carbon if and only if the second allotrope exhibits alloying behavior with lithium ions during an electrochemical reaction.

In certain embodiments, the mass ratio of hard carbon to second carbon allotrope in the composite materials ranges from about 0.01:1 to about 100:1. In other embodiments, the mass ratio of hard carbon to second carbon allotrope ranges from about 1:1 to about 10:1 or about 5:1. In other embodiments, the mass ratio of hard carbon to second carbon allotrope ranges from about 1:10 to about 10:1. In other embodiments, the mass ratio of hard carbon to second carbon allotrope ranges from about 1:5 to about 5:1. In other embodiments, the mass ratio of hard carbon to second carbon allotrope ranges from about 1:3 to about 3:1. In other embodiments, the mass ratio of hard carbon to second carbon allotrope ranges from about 1:2 to about 2:1.

Multiple carbon allotropes can be combined within a single composite to further improve electrochemical performance. For example, a hard carbon can be blended with both graphite and soft carbon to change the density as well as the capacity or first cycle efficiency. The three or more carbon allotropes will have a synergistic effect, creating a unique structure and performance. In certain embodiments, the mass ratio of hard carbon to the sum of the masses for all other carbon allotropes present in the composite material ranges from about 0.01:1 to about 100:1. In other embodiments, the mass ratio of hard carbon to the sum of the masses for all other carbon allotropes in the composite material ranges from about 1:1 to about 10:1 or about 5:1. In other embodiments the mass ratio of hard carbon to the sum of the masses for all other carbon allotropes in the composite material ranges from about 1:10 to about 10:1. In other embodiments, the mass ratio of hard carbon to the sum of the masses for all other carbon allotropes in the composite material ranges from about 1:5 to about 5:1. In other embodiments, the mass ratio of hard carbon to the sum of the masses for all other carbon allotropes in the composite material ranges from about 1:3 to about 3:1. In other embodiments, the mass ratio of hard carbon to the sum of the masses for all other carbon allotropes in the composite material ranges from about 1:2 to about 2:1.

The electrochemical properties of the composite materials can be modified, at least in part, by the amount of the electrochemical modifier in the composite material. In some of these embodiments, the electrochemical modifier is an alloying material such as silicon, tin, indium, aluminum, germanium or gallium, for example silicon. Accordingly, in some embodiments, the composite material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the composite materials comprise between 0.5% and 99.5% carbon and between 0.5% and 99.5% electrochemical modifier. In another embodiment, the composite material comprises 70%-99% silicon, for example between 75% and 95%, for example between 80% and 95%. The percent of the electrochemical modifier is calculated on weight percent basis (wt %). In some other more specific embodiments, the electrochemical modifier comprises iron, tin, silicon, nickel and manganese. In a different embodiment, the composite material comprises 70%-99% silicon, for example between 75% and 95%, for example between 80% and 95%.

In still other embodiments, the composite materials comprise carbon and silicon, wherein the silicon is present in about 1% to about 75% by weight of composite material. For example, in some embodiments the silicon content ranges from about 1% to about 10% or from about 3% to about 7%. In still other embodiments, the silicon content ranges from about 40% to about 60%, for example about 45% to about 55%.

In still other embodiments, the composite materials comprise carbon and silicon, wherein the silicon is present in about 65% to about 85% by weight of composite material. For example, in some embodiments the silicon content ranges from about 70% to about 80% or from about 72% to about 78%. In still other embodiments, the silicon content ranges from about 80% to about 95%, for example about 85% to about 95%.

The unmodified carbon materials have purities not previously obtained with hard carbon materials. While not wishing to be bound by theory, it is believed that the high purity of the unmodified carbon materials contributes to the superior electrochemical properties of the same. In some embodiments, the unmodified carbon material comprises low total TXRF impurities (excluding any intentionally included electrochemical modifier). Thus, in some embodiments the total TXRF impurity content (excluding any intentionally included electrochemical modifier) of all other TXRF elements in the carbon material (as measured by proton induced x-ray emission) is less than 1000 ppm. In other embodiments, the total TXRF impurity content (excluding any intentionally included electrochemical modifier) of all other TXRF elements in the carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm.

In addition to low content of undesired TXRF impurities, the carbon component may comprise high total carbon content. In some examples, in addition to carbon, the carbon material may also comprise oxygen, hydrogen, nitrogen and an optional electrochemical modifier. In some embodiments, the material comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of an unmodified carbon material may, in some instances, have an effect on the electrochemical performance of a carbon material. Accordingly, in some embodiments, the ash content (excluding any intentionally included electrochemical modifier) of the carbon material ranges from 0.1% to 0.001% weight percent ash, for example in some specific embodiments the ash content (excluding any intentionally included electrochemical modifier) of the carbon material is less than 0.1%, less than 0.08%, less than 0.05%, less than 0.03%, than 0.025%, less than 0.01%, less than 0.0075%, less than 0.005% or less than 0.001%.

In other embodiments, the composite material comprises a total TXRF impurity content (excluding any intentionally included electrochemical modifier) of less than 500 ppm and an ash content (excluding any intentionally included electrochemical modifier) of less than 0.08%. In further embodiments, the composite material comprises a total TXRF impurity content (excluding any intentionally included electrochemical modifier) of less than 300 ppm and an ash content (excluding any intentionally included electrochemical modifier) of less than 0.05%. In other further embodiments, the composite material comprises a total TXRF impurity content (excluding any intentionally included electrochemical modifier) of less than 200 ppm and an ash content (excluding any intentionally included electrochemical modifier) of less than 0.05%. In other further embodiments, the composite material comprises a total TXRF impurity content (excluding any intentionally included electrochemical modifier) of less than 200 ppm and an ash content (excluding any intentionally included electrochemical modifier) of less than 0.025%. In other further embodiments, the composite material comprises a total TXRF impurity content (excluding any intentionally included electrochemical modifier) of less than 100 ppm and an ash content (excluding any intentionally included electrochemical modifier) of less than 0.02%. In other further embodiments, the composite material comprises a total TXRF impurity content (excluding any intentionally included electrochemical modifier) of less than 50 ppm and an ash content (excluding any intentionally included electrochemical modifier) of less than 0.01%.

In other embodiments, the composite material comprises a total TXRF impurity content (excluding any intentionally included electrochemical modifier, such as silicon) of greater than 500 ppm and an ash content (excluding any intentionally included electrochemical modifier) of greater than 0.08%. In further embodiments, the composite material comprises a total TXRF impurity content (excluding any intentionally included electrochemical modifier) of greater than 5000 ppm and an ash content (excluding any intentionally included electrochemical modifier) of greater than 0.5%. In other further embodiments, the composite material comprises a total TXRF impurity content (excluding any intentionally included electrochemical modifier) of greater than 1% and an ash content (excluding any intentionally included electrochemical modifier) of greater than 0.5%. In other further embodiments, the composite material comprises a total TXRF impurity content (excluding any intentionally included electrochemical modifier) of greater than 2% and an ash content (excluding any intentionally included electrochemical modifier) of greater than 1%. In other further embodiments, the composite material comprises a total TXRF impurity content (excluding any intentionally included electrochemical modifier) of greater than 3% and an ash content (excluding any intentionally included electrochemical modifier) of greater than 2%. In other further embodiments, the composite material comprises a total TXRF impurity content (excluding any intentionally included electrochemical modifier) of greater than 4% and an ash content (excluding any intentionally included electrochemical modifier) of greater than 3%. In other further embodiments, the composite material comprises a total TXRF impurity content (excluding any intentionally included electrochemical modifier) of greater than 5% and an ash content (excluding any intentionally included electrochemical modifier) of greater than 4%. In other further embodiments, the composite material comprises a total TXRF impurity content (excluding any intentionally included electrochemical modifier) of greater than 6% and an ash content (excluding any intentionally included electrochemical modifier) of greater than 5%. In other further embodiments, the composite material comprises a total TXRF impurity content (excluding any intentionally included electrochemical modifier) of greater than 7% and an ash content (excluding any intentionally included electrochemical modifier) of greater than 6%. In other further embodiments, the composite material comprises a total TXRF impurity content (excluding any intentionally included electrochemical modifier) of greater than 8% and an ash content (excluding any intentionally included electrochemical modifier) of greater than 7%. In other further embodiments, the composite material comprises a total TXRF impurity content (excluding any intentionally included electrochemical modifier) of greater than 9% and an ash content (excluding any intentionally included electrochemical modifier) of greater than 8%. In other further embodiments, the composite material comprises a total TXRF impurity content (excluding any intentionally included electrochemical modifier) of greater than 10% and an ash content (excluding any intentionally included electrochemical modifier) of greater than 9%.

The amount of individual TXRF impurities present in the disclosed composite materials can be determined by total x-ray fluorescence. Individual TXRF impurities may contribute in different ways to the overall electrochemical performance of the disclosed composite materials. Thus, in some embodiments, the level of sodium present in the composite material is less than 1000 ppm, less than 500 ppm, less than 100 ppm, less than 50 ppm, less than 10 ppm, or less than 1 ppm. In some embodiments, the level of magnesium present in the composite material is less than 1000 ppm, less than 100 ppm, less than 50 ppm, less than 10 ppm, or less than 1 ppm. In some embodiments, the level of aluminum present in the composite material is less than 1000 ppm, less than 100 ppm, less than 50 ppm, less than 10 ppm, or less than 1 ppm. In some embodiments, the level of silicon present in the composite material is less than 500 ppm, less than 300 ppm, less than 100 ppm, less than 50 ppm, less than 20 ppm, less than 10 ppm or less than 1 ppm. In some embodiments, the level of phosphorous present in the composite material is less than 1000 ppm, less than 100 ppm, less than 50 ppm, less than 10 ppm, or less than 1 ppm. In some embodiments, the level of sulfur present in the composite material is less than 1000 ppm, less than 100 ppm, less than 50 ppm, less than 30 ppm, less than 10 ppm, less than 5 ppm or less than 1 ppm. In some embodiments, the level of chlorine present in the composite material is less than 1000 ppm, less than 100 ppm, less than 50 ppm, less than 10 ppm, or less than 1 ppm. In some embodiments, the level of potassium present in the composite material is less than 1000 ppm, less than 100 ppm, less than 50 ppm, less than 10 ppm, or less than 1 ppm. In other embodiments, the level of calcium present in the composite material is less than 100 ppm, less than 50 ppm, less than 20 ppm, less than 10 ppm, less than 5 ppm or less than 1 ppm. In some embodiments, the level of chromium present in the composite material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the composite material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the composite material is less than 20 ppm, less than 10 ppm, less than 5 ppm, less than 4 ppm, less than 3 ppm, less than 2 ppm or less than 1 ppm. In some other embodiments, the level of copper present in the composite material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the composite material is less than 20 ppm, less than 10 ppm, less than 5 ppm, less than 2 ppm or less than 1 ppm. In yet other embodiments, the sum of all other TXRF impurities (excluding any intentionally included electrochemical modifier) present in the composite material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the composite material comprises undesired TXRF impurities near or below the detection limit of the proton induced x-ray emission analysis. For example, in some embodiments the unmodified composite material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some embodiments, the composite material comprises undesired TXRF impurities near or below the detection limit of the proton induced x-ray emission analysis. In some specific embodiments, the unmodified composite material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by TXRF. In other specific embodiments, the composite material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the composite material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the composite material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

In certain of the foregoing embodiments, and other embodiments described herein, the impurity content is measured by PIXE, rather than TXRF.

In certain embodiments, the composite material comprises carbon and two or more different electrochemical modifiers. In embodiments, the composite material comprises carbon, silicon and one or more electrochemical modifiers selected from: phosphorus, nitrogen, sulfur, boron and aluminum. In certain embodiments, the composite material comprises carbon, silicon and 1-20% (by weight) of a Group 13 element or combinations thereof. In other certain embodiments, the composite material comprises carbon, silicon and 1-20% (by weight) of a Group 15 element, or combinations thereof. In other certain embodiments, the composite material comprises carbon, silicon and 1-20% (by weight) of lithium, sodium, or potassium, or combinations thereof.

The composite material may include various surface treatments or properties in order to further improve the electrochemical performance as defined by capacity, stability and/or power performance. In one embodiment the composite (e.g., the individual composite particles) is covered by an ionically conductive polymer with a thickness ranging from about 1 nm to about 10 microns. In another embodiment the composite is covered by a ceramic protective coating with a thickness ranging from about 1 nm to about 10 microns. In yet another embodiment the composite is covered by an organic film with a thickness ranging from about 1 nm to about 10 microns. The thickness can be measured with a variety of techniques known in the art such as but not limited to XPS sputtering, FIB/SEM or SIMS.

B. Preparation Methods

Any of the above described materials can be prepared via a variety of processes including sol gel, emulsion/suspension, solvent free (solid state, melt/liquid state, vapor state). Exemplary methods are described below.

The carbon component can be prepared by a method disclosed herein, for example, in some embodiments the carbon material is prepared by a method comprising pyrolyzing a polymer gel as disclosed herein. The carbon materials may also be prepared by pryolyzing a substance such as chitosan. The carbon materials can be prepared by any number of methods described in more detail below.

Numerous methods are available for the incorporation of an electrochemical modifier into carbon. The composite may be formed through a gas phase deposition of an electrochemical modifier onto the carbon. The composite may be synthesized through mechanical mixing or milling of two distinct solids. Electrochemical modifiers can also be incorporated during the polymerization stage, into the polymer gel or into the pyrolyzed or activated carbon materials. Methods for preparation of carbon materials are described in more detail below.

1. Polymer Gels

Polymer gels are intermediates in the preparation of the disclosed composite materials. As such, the physical and chemical properties of the polymer gels contribute to, and are predictive of, the properties of the carbon materials. Polymer gels used for preparation of the composite materials are included within the scope of certain aspects of the present invention.

Methods for preparation of certain carbon materials are described in U.S. Pat. Nos. 7,723,262 and 8,293,818; and U.S. patent application Ser. Nos. 12/829,282; 13/046,572; 13/250,430; 12/965,709; 13/336,975 and 13/486,731, the full disclosures of which are hereby incorporated by reference in their entireties for all purposes. Accordingly, in one embodiment the present disclosure provides a method for preparing any of the carbon materials or polymer gels described above. The carbon materials may synthesized through pyrolysis of either a single precursor (such as chitosan) or from a complex resin, formed using a sol-gel method using polymer precursors such as phenol, resorcinol, urea, melamine, etc. in water, ethanol, methanol, etc. with formaldehyde. The resin may be acid or basic, and possibly contain a catalyst. The pyrolysis temperature and dwell time may be optimized as described below.

In some embodiments, the methods comprise preparation of a polymer gel by a sol gel process, condensation process or crosslinking process involving monomer precursor(s) and a crosslinking agent, two existing polymers and a crosslinking agent or a single polymer and a crosslinking agent, followed by pyrolysis of the polymer gel. The polymer gel may be dried (e.g., freeze dried) prior to pyrolysis; however drying is not required and in some embodiments is not desired. The sol gel process provides significant flexibility such that an electrochemical modifier can be incorporated at any number of steps. In one embodiment, a method for preparing a polymer gel comprising an electrochemical modifier is provided. In another embodiment, methods for preparing pyrolyzed polymer gels are provided. Details of the variable process parameters of the various embodiments of the disclosed methods are described below.

The target carbon properties can be derived from a variety of polymer chemistries provided the polymerization reaction produces a resin/polymer with the necessary carbon backbone. Different polymer families include novolacs, resoles, acrylates, styrenics, ureathanes, rubbers (neoprenes, styrene-butadienes, etc.), nylons, etc. The preparation of any of these polymer resins can occur via a number of different processes including sol gel, emulsion/suspension, solid state, solution state, melt state, etc. for either polymerization and cross-linking processes.

The polymer gels may be prepared by a sol gel process. For example, the polymer gel may be prepared by co-polymerizing one or more polymer precursors in an appropriate solvent. In one embodiment, the one or more polymer precursors are copolymerized under acidic conditions. In some embodiments, a first polymer precursor is a phenolic compound and a second polymer precursor is an aldehyde compound. In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. Other polymer precursors include nitrogen containing compounds such as melamine, urea and ammonia. In some cases the precursors include silicon containing compounds such as silanes (silane, dimethyl silane, diethylsilane, chlorosilane, chloromethyl silane, chloroethyl silane, dichloro silane, dichlorodimethyl silane, dichlorodiethyl silane, diphenylsilane, tristrimethylsilyl silane) siloxane, silica, silicon carbide.

In some embodiments, the electrochemical modifier is incorporated as a metal salt into the mixture from which the gel resin is produced. In some embodiments, the metal salt dissolved into the mixture from which the gel resin is produced is soluble in the reaction mixture. In this case, the mixture from which the gel resin is produced may contain an acid and/or alcohol which improves the solubility of the metal salt. The metal-containing polymer gel can be optionally freeze dried, followed by pyrolysis. Alternatively, the metal-containing polymer gel is not freeze dried prior to pyrolysis.

In some embodiments the electrochemical modifier is incorporated into the material as a polymer. For example, the organic or carbon containing polymer, RF (resorcinol-formaldehyde) for example, is copolymerized with the polymer, which contains the electrochemical modifier. In one embodiment, the electrochemical modifier-containing polymer contains silicon. In one embodiment the polymer is tetraethylorthosilane (TEOS). In one embodiment, a TEOS solution is added to the RF solution prior to or during polymerization. In another embodiment the polymer is a polysilane with organic side groups. In some cases these side groups are methyl groups, in other cases these groups are phenyl groups, in other cases the side chains include phenyl, pyrrole, acetate, vinyl, siloxane fragments. In some cases the side chain includes a group 14 element (silicon, germanium, tin or lead). In other cases the side chain includes a group 13 element (boron, aluminum, boron, gallium, indium). In other cases the side chain includes a group 15 element (nitrogen, phosphorous, arsenic). In other cases the side chain includes a group 16 element (oxygen, sulfur, selenium).

In another embodiment the electrochemical modifier is a silole. In some cases it is a phenol-silole or a silafluorene. In other cases it is a poly-silole or a poly-silafluorene. In some cases the silicon is replaced with germanium (germole or germafluorene), tin (stannole or stannaflourene) nitrogen (carbazole) or phosphorous (phosphole, phosphafluorene). In all cases the heteroatom containing material can be a small molecule, an oligomer or a polymer. Phosphorous atoms may or may not be also bonded to oxygen.

In certain embodiments the heteroatom containing polymer is a physical mixture with the carbon polymer. In another case it is a copolymer. In another case a block or multi-block copolymer. In other cases it is in the polymer side chain, main chain or a small molecule used to crosslink the carbon polymers. Heteroatoms include but are not limited to Group 14 elements (Si, Ge, Sn, Pb), Group 15 elements (N, P, As, Sb), Group 16 elements (O, S, Se, Te).

In another embodiment the electrochemical modifier is a silicon dendrimer. In one case it is a first generation dendrimer. In another case it is a higher generation dendrimer. In some embodiments the polymer and dendrimer form a mixture. In other embodiments the dendrimer is covalently bonded to the polymer. In other embodiments the dendrimer is ionically bonded to the polymer.

In some embodiments the polymerization reaction contains phosphorous. In certain other embodiments, the phosphorus is in the form of phosphoric acid. In certain other embodiments, the phosphorus can be in the form of a salt, wherein the anion of the salt comprises one or more phosphate, phosphite, phosphide, hydrogen phosphate, dihydrogen phosphate, hexafluorophosphate, hypophosphite, polyphosphate, or pyrophosphate ions, or combinations thereof. In certain other embodiments, the phosphorus can be in the form of a salt, wherein the cation of the salt comprises one or more phosphonium ions. The non-phosphate containing anion or cation pair for any of the above embodiments can be chosen for those known and described in the art. In the context, exemplary cations to pair with phosphate-containing anions include, but are not limited to, ammonium, tetraethylammonium, and tetramethylammonium ions. In the context, exemplary anions to pair with phosphate-containing cations include, but are not limited to, carbonate, dicarbonate, and acetate ions.

In some cases the crosslinker is important because of its chemical and electrochemical properties. In other cases the crosslinker is important because it locks in the polymer geometry. In other cases both polymer geometry and chemical composition are important.

The crosslinker can react at either low or high temperatures. In some cases a portion of the reaction will occur at low temperatures with the rest of the reaction occurring at higher temperatures. Both extent of crosslinking and reaction kinetics can be measured by a variety of chemical techniques (TGA, FTIR, NMR, XRD, etc.) and physical techniques (indentation, tensile testing, modulus, hardness, etc.).

In some cases it will be favorable to have the electrochemical modifier and/or crosslinker evenly distributed throughout the initial co-polymer—a homogenous mixture. In other cases it is important to have an uneven distribution of crosslinker and/or electrochemical modified throughout the initial co-polymer.

The structure of the polymer precursors is not particularly limited, provided that the polymer precursor is capable of reacting with another polymer precursor or with a second polymer precursor to form a polymer. Polymer precursors include, but are not limited to, amine-containing compounds, alcohol-containing compounds and carbonyl-containing compounds. In some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide, an alkene, an alkyne, an acrylate, an epoxide and an isocyanate.

Various monomers, molecular components, oligomers and polymeric materials may be combined to make a variety of polymers including, novolacs, resoles, novolac epoxides (comprised of one or more of phenol, resorcinol, formaldehyde, epichlorohydrin, bisphenol-A, bisphenol-F, epoxide), rubbers (isoprene, styrene-butadiene, styrene-butadiene-styrene, isobutylene, polyacrylate rubber, ethylenene-acrylate rubber, bromo-isobutylene, isoprene, polybutadiene, chloro isobutadiene isoprene, polychloroprene, epichlorohydrin, ethylene propylene, ethylene propylene diene monomer, polyether urethane, perfluorocarbon rubber, fluorosilicone, hydrogenated nitrile butadiene, acrylonitrile butadiene, polyurethane), nylons (including nylon-6; nylon-6,6; nylon-6,9; nylon-6,10; nylon-6,12; nylon-11, nylon-12; and nylon-4,6), acrylates (methylacrylate, ethyl acrylate, 2-Chloroethyl-vinyl ether, 2-Ethylhexyl acrylate, hydroyethyl methacrylate, butyl acrylate, butyl methacrylate, acrylonitrile), polystyrene, and polyurethanes (composed of ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, ethanolamine, diethanolamine, methyldiethanolamine, pehnyldiethanolamine, glycerol, trimethylolpropane, 1,2,6-hexanetriol, triethanolamine, pentaerythritol, diethyltoluenediamine, dimethylthiotoluenediamine).

In some cases the polymer precursor materials include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In one embodiment, the method comprises use of a first and second polymer precursor, and in some embodiments the first or second polymer precursor is a carbonyl containing compound and the other of the first or second polymer precursor is an alcohol containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor is a urea or an amine containing compound. For example, in some embodiments the polymer precursor is urea or melamine. Other embodiments include polymer precursors selected from isocyanates or other activated carbonyl compounds such as acid halides and the like.

In some embodiments of the methods described herein, the molar ratio of phenolic precursor to catalyst is from about 5:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 5:1 to about 10:1. In further embodiments, the molar ratio of phenolic precursor to catalyst is from about 100:1 to about 5:1.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 5:1 to about 10:1. In further embodiments, the molar ratio of resorcinol to catalyst is from about 100:1 to about 5:1.

The total solids content in the solution or suspension prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.35 to 0.6.

Examples of solvents useful in the preparation of the polymer gels disclosed herein include but are not limited to water or alcohols such as, for example, ethanol, t butanol, methanol or combinations thereof as well as aqueous mixtures of the same. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of the polymer gels include volatile basic catalysts that facilitate polymerization of the precursor materials into a monolithic polymer. The catalyst can also comprise various combinations of the catalysts described above. In embodiments comprising phenolic compounds, such catalysts can be used in the range of molar ratios of 5:1 to 200:1 phenolic compound:catalyst. For example, in some specific embodiments such catalysts can be used in the range of molar ratios of 5:1 to 10:1 phenolic compound:catalyst.

In some embodiments, the gel polymerization process is performed under catalytic conditions. Accordingly, in some embodiments, the method comprises admixing a catalyst with the solvent-free mixture. In some embodiments, the catalyst is a solid at room temperature and pressure. In some embodiments, the catalyst is a liquid at room temperature and pressure. In some embodiments, the catalyst is a liquid at room temperature and pressure that does not provide dissolution of one or more of the other polymer precursors.

In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to polymer precursor (e.g., phenolic compound) may have an effect on the final properties of the polymer gel as well as the final properties of the carbon materials. Thus, in some embodiments such catalysts are used in the range of molar ratios of 5:1 to 2000:1 polymer precursor:catalyst. In some embodiments, such catalysts can be used in the range of molar ratios of 10:1 to 400:1 polymer precursor:catalyst. For example in other embodiments, such catalysts can be used in the range of molar ratios of 5:1 to 100:1 polymer precursor:catalyst. For example, in some embodiments the molar ratio of catalyst to polymer precursor is about 400:1. In other embodiments the molar ratio of catalyst to polymer precursor is about 100:1. In other embodiments the molar ratio of catalyst to polymer precursor is about 50:1. In other embodiments the molar ratio of catalyst to polymer precursor is about 10:1. In certain of the foregoing embodiments, the polymer precursor is a phenolic compound such as resorcinol or phenol.

In still other embodiments, the method comprises admixing an acid with the solvent-free mixture. In certain embodiments, the acid is a solid at room temperature and pressure. In some embodiments, the acid is a liquid at room temperature and pressure. In some embodiments, the acid is a liquid at room temperature and pressure that does not provide dissolution of one or more of the other polymer precursors.

The acid may be selected from any number of acids suitable for the polymerization process. For example, in some embodiments the acid is acetic acid and in other embodiments the acid is oxalic acid. In further embodiments, the acid is mixed with the first or second solvent in a ratio of acid to solvent of 99:1, 90:10, 75:25, 50:50, 25:75, 20:80, 10:90 or 1:90. In other embodiments, the acid is acetic acid and the first or second solvent is water. In other embodiments, acidity is provided by adding a solid acid.

The total content of acid in the mixture can be varied to alter the properties of the final product. In some embodiments, the acid is present from about 1% to about 50% by weight of mixture. In other embodiments, the acid is present from about 5% to about 25%. In other embodiments, the acid is present from about 10% to about 20%, for example about 10%, about 15% or about 20%.

In certain embodiments, the polymer precursor components are blended together and subsequently held for a time and at a temperature sufficient to achieve polymerization. One or more of the polymer precursor components can have particle size less than about 20 mm in size, for example less than 10 mm, for example less than 7 mm, for example, less than 5 mm, for example less than 2 mm, for example less than 1 mm, for example less than 100 microns, for example less than 10 microns. In some embodiments, the particle size of one or more of the polymer precursor components is reduced during the blending process.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplish before, during, and/or after (or combinations thereof) incubation at the reaction temperature.

Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours).

In certain embodiments, an electrochemical modifier is incorporated during the above described polymerization process. For example, in some embodiments, an electrochemical modifier in the form of metal particles, metal paste, metal salt, metal oxide or molten metal can be dissolved or suspended into the mixture from which the gel resin is produced Exemplary electrochemical modifiers for producing the composite materials may fall into one or more than one of the chemical classifications listed in Table 1.

TABLE 1

Exemplary Electrochemical Modifiers for Producing Composite Materials

| Chemical Classification | Example Precursor Materials |
|---|---|
| Saccharides | Chitin |
| | Chitosan |
| | Glucose |
| | Sucrose |
| | Fructose |
| | Cellulose |
| Biopolymers | Lignin |
| Proteins | Gelatin |
| Amines and Ureas | Urea |
| | Melamine |
| Halogen Salts | LiBr |
| | NaCl |
| | KF |
| Nitrate Salts | $NaNO_3$ |
| | $LiNO_3$ |
| Carbides | SiC |
| | $CaC_2$ |
| Metal Containing | Aluminum isoproproxide |
| Compounds | Manganese Acetate |
| | Nickel Acetate |
| | Iron Acetate |
| | Tin Chloride |
| | Silicon Chloride |
| Hydrocarbons | Propane |
| | Butane |
| | Ethylene |
| | Cyclohexane |
| | Methane |
| | Benzene |
| | Ethane |
| | Hexane |
| | Octane |
| | Pentane |
| Alcohols | Isopropanol |
| | Ethanol |
| | Methanol |
| | Butanol |
| | Ethylene Glycol |
| | Xylitol |
| | Menthol |
| Phosphate Compounds | Phytic Acid |
| | $H_3PO_3$ |
| | $NH_4H_2PO_3$ |
| | $Na_3PO_3$ |
| Ketones | Acetone |
| | Ethyl Methyl Ketone |
| | Acetophenone |
| | Muscone |
| Polymers | TEOS |
| | Etc. |
| Silicons | Silico (powders, nanoparticles, nanotubes, etc. |
| | Polycrystalline silicon |
| | Nanocrystalline silicon |
| | Amorphous silicon |
| | Porous silicon |
| | Silicyne |
| | Black silicon |

Electrochemical modifiers can be combined with a variety of polymer systems through either physical mixing or chemical reactions with latent (or secondary) polymer functionality. Examples of latent polymer functionality include, but are not limited to, epoxide groups, unsaturation (double and triple bonds), acid groups, alcohol groups, amine groups, basic groups. Crosslinking with latent functionality can occur via heteroatoms (e.g. vulcanization with sulfur, acid/base/ring opening reactions with phosphoric acid), reactions with organic acids or bases (described above), coordination to transition metals (including but not limited to Ti, Cr, Mn, Fe, Co, Ni, Cu, Zn, Zr, Nb, Mo, Ag, Au), ring opening or ring closing reactions (rotaxanes, spiro compounds, etc.).

Polymerization to form a polymer gel can be accomplished by various means described in the art and may include addition of an electrochemical modifier. For instance, polymerization can be accomplished by incubating suitable polymer precursor materials, and optionally an electrochemical modifier, in the presence of a suitable catalyst for a sufficient period of time. The time for polymerization can be a period ranging from minutes or hours to days, depending on the temperature (the higher the temperature the faster, the reaction rate, and correspondingly, the shorter the time required). The polymerization temperature can range from room temperature to a temperature approaching (but lower than) the boiling point of the starting solution. For example, in some embodiments the polymer gel is aged at temperatures from about 20° C. to about 120° C., for example about 20° C. to about 100° C. Other embodiments include temperature ranging from about 30° C. to about 90° C., for example about 45° C. or about 85° C. In other embodiments, the temperature ranges from about 65° C. to about 80° C., while other embodiments include aging at two or more temperatures, for example about 45° C. and about 75-85° C. or about 80-85° C.

Electrochemical modifiers can also be added to the polymer system through physical blending. Physical blending can include but is not limited to melt blending of polymers and/or co-polymers, the inclusion of discrete particles, chemical vapor deposition of the electrochemical modifier and coprecipitation of the electrochemical modifier and the main polymer material.

In another embodiment the electrochemical modifier is a particle. The particles of electrochemical modifier can be added with differing particle size distributions. In one embodiment the electrochemical modifier particles have a D50 of 10 nm or 50 nm or 100 nm or 150 nm or 200 nm or 500 nm or 1 um or 1.5 um or 2 um or 3 um or 5 um or 10 um or 20 um or 40 um or up to 50 um, or up to 100 um. In some embodiments the polymer and particle form a mixture. In other embodiments the particle is covalently bonded to the polymer. In other embodiments the particle is ionically bonded to the polymer. In some cases the particle is silicon, in other cases the particles are a different Group 14 elements (Ge, Sn, Pb), Group 15 elements (P, As, Sb), Group 16 elements (S, Se, Te). In some cases the particle is comprised of a single element, in other cases it is comprised of a mixture of two or more elements.

Electrochemical modifier particles can be dispersed in the organic polymer solution or pre-polymer in a variety of ways. In one embodiment, the particles are dispersed by sonication. In another embodiment, the particles are dispersed by mixing. In another embodiment, the particles are dispersed by modifying the surface chemistry of the particles or the pH of the solution. In another embodiment, the particles are dispersed by use of a surfactant. In one embodiment, the surfactant is SPAN 80. In another embodiment the particles are dispersed in an emulsion or suspension. In one embodiment the surfactant is used in combination with a hydrocarbon solvent. In one embodiment, the hydrocarbon is cyclohexane. In one embodiment the hydrocarbon is mineral oil. In another embodiment the hydrocarbon is vegetable oil.

In some instances the electrochemical modifier can be added via a metal salt solution. The metal salt solution or suspension may comprise acids and/or alcohols to improve solubility of the metal salt. In yet another variation, the polymer gel (either before or after an optional drying step) is contacted with a paste comprising the electrochemical modifier. In yet another variation, the polymer gel (either before or after an optional drying step) is contacted with a metal or metal oxide sol comprising the desired electrochemical modifier.

In addition to the above exemplified electrochemical modifiers, the composite materials may comprise one or more additional forms (i.e., allotropes) of carbon. In this regard, it has been found that inclusion of different allotropes of carbon such as graphite, amorphous carbon, diamond, C60, carbon nanotubes (e.g., single and/or multi-walled), graphene and/or carbon fibers into the composite materials is effective to optimize the electrochemical properties of the composite materials in certain embodiments. The various allotropes of carbon can be incorporated into the carbon materials during any stage of the preparation process described herein. For example, during the solution phase, during the gelation phase, during the curing phase, during the pyrolysis phase, during the milling phase, or after milling. In some embodiments, the second carbon form is incorporated into the composite material by adding the second carbon form before or during polymerization of the polymer gel as described in more detail herein. The polymerized polymer gel containing the second carbon form is then processed according to the general techniques described herein to obtain a carbon material containing a second allotrope of carbon.

In some embodiments the organic polymer and the electrochemical modifier have different solvents, ratios of solvents, mixtures of solvents, catalysts type, catalyst ratios, solvent pH, type of acid, or base.

In certain embodiments, by changing either the relative solids concentration of the carbon containing polymer solution and/or the relative solids concentration of the electrochemical modifier containing polymer solution, the electrochemical modifier content of the final composite can be varied. In one embodiment the solids concentration of the organic polymer solution can be varied between 1% to 99% solids or from 10% to 90% solids, or from 20% to 80% solids or from 20% to 50% or from 30% to 40% solids. In one embodiment the solids concentration of the polymer solution is 35%. In one embodiment the solids concentration of the electrochemical modifier polymer solution can be varied between 1% to 99% solids or from 10% to 90% solids, or from 20% to 80% solids or from 20% to 50% or from 30% to 40% solids. In one embodiment the solids concentration of the electrochemical modifier solution is 35%. In one embodiment the electrochemical modifier is a TEOS polymer is mixed with ethanol. In other embodiments, the TEOS polymer is mixed with acetone, or isopropyl alcohol.

Changing the ratio of organic polymer to the electrochemical modifier polymer solutions in any given mixture may alter the final ratio of the carbon to electrochemical modifier in the final composite. In one embodiment the ratio of organic polymer to electrochemical modifier polymer is about 10:1 or 9:1 or 8:1 or 7:1 or 6:1 or 5:1 or 4:1 or 3:1 or 2:1, or 1:1, or 1:2, or 1:3 or 1:4 or 1:5, or 1:6 or 1:7 or 1:8 or 1:9 or 1:10.

In one embodiment the organic polymer/electrochemical modifier polymer solution is heated until a gel is formed. In one embodiment a TEOS/RF solution is heated until a gel is formed. In one embodiment the heating is carried out in a sealed container. In one embodiment the heating is carried out in a polymer reactor. For example, a stirred polymer reactor. In one embodiment the solution is heated in an emulsion, or in an inverse emulsion or in a suspension. The temperature at which gelation takes place is known to impact the structure of the polymer and can be modified to control the structure of the final composite material. In one embodiment the gel is formed at 40 C or 50 C or 60 C or 70 C or 80 C or 90 C or 100 C or 110 C or 120 C or 130 C. In one embodiment the gel is formed in a two-step reaction. For example one temperature to cause the organic polymer to gel and a different temperature to cause the electrochemical modifier polymer to gel. In one embodiment the two step polymerization is carried out at 40 C or 50 C or 60 C or 70 C or 80 C or 90 C or 100 C or 110 C or 120 C or 130 C and then the second step is carried out at 40 C or 50 C or 60 C or 70 C or 80 C or 90 C or 100 C or 110 C or 120 C or 130 C. In some embodiments the organic polymer is fully gelled and then a electrochemical modifier polymer solution is added through a solvent exchange to dope the organic polymer. In some embodiments the electrochemical modifier polymer is fully gelled and then an organic polymer solution is added through a solvent exchange to dope the electrochemical modifier polymer.

In some embodiments, an optional electrochemical modifier is incorporated into the polymer gel after the polymerization step, for example either before or after an optional drying and before pyrolyzing polymer gel. In some other embodiments, the polymer gel (either before or after and optional drying and prior to pyrolysis) is impregnated with electrochemical modifier by immersion in a metal salt solution or suspension or particles. In some embodiments, the particle comprises micronized silicon powder. In some embodiments, the particles are comprised of nanoparticles of silicon. In some embodiments, the particles are comprised of nanotubes of silicon. In certain embodiments, the particles are comprised of polycrystalline silicon. In certain embodiments, the particles are comprised of nanocrystalline silicon. In certain embodiments, the particles are comprised of amorphous silicon. In certain embodiments, the particles are comprised of porous silicon. In certain embodiments, the particles are comprised of silicyne. In certain embodiments, the particles are comprised of black silicon. In certain embodiments, the particles are comprise a mixture of two or more different forms of silicon as exemplified above.

In some embodiments, the particle is tin. In still other embodiments, the particle is a combination of silicon, tin, carbon, or any oxides. Particles of electrochemical modifier can be added in different ratios to alter the electrochemical performance of the final composite. The electrochemical modifier can be added to create a specific ratio of carbon to electrochemical modifier after the polymer has been pyrolyzed and this ratio can range from 10:1-1:10. In one embodiment this ratio is 10:1 or 9:1 or 8:1 or 7:1 or 6:1 or 5:1 or 4:1 or 3:1 or 2:1, or 1:1, or 1:2, or 1:3 or 1:4 or 1:5, or 1:6 or 1:7 or 1:8 or 1:9 or 1:10. The particles of electrochemical modifier can be added with differing particle size distributions. In one embodiment the electrochemical modifier particles have a D50 of 10 nm or 50 nm or 100 nm or 150 nm or 200 nm or 500 nm or 1 um or 1.5 um or 2 um or 3 um or 5um or 10 um. In some embodiments the electrochemical modifier is added prior to polymerization of the polymer solution. In some embodiments the electrochemical modifier is added at a point where the polymer solution is pre-polymerized or partially polymerized by heating to an elevated temperature such as 40 C or 50 C or 60 C or 70 C or 80 C or 90 C or 100 C to create a partially cross linked network.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to polymer precursor (e.g., phenolic or silicon based compound) may have an effect on the final properties of the polymer gel as well as the final properties of the carbon materials. Thus, in some embodiments such catalysts are used in the range of molar ratios of 5:1 to 2000:1 polymer precursor compound:catalyst. In some embodiments, such catalysts can be used in the range of molar ratios of 10:1 to 400:1 polymer precursor compound:catalyst. For example in other embodiments, such catalysts can be used in the range of molar ratios of 5:1 to 100:1 polymer precursor compound:catalyst. For example, in some embodiments the molar ratio of catalyst to polymer precursor compound is about 400:1. In other embodiments the molar ratio of catalyst to polymer precursor compound is about 100:1. In other embodiments the molar ratio of catalyst to polymer precursor compound is about 50:1. In other embodiments the molar ratio of catalyst to polymer precursor compound is about 10:1.

The reaction solvent is another process parameter that may be varied to obtain the desired properties (e.g., surface area, porosity, purity, etc.) of the polymer gels and composite materials. In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method the solvent is a binary solvent comprising acetic acid and water. In further embodiments, the solvent comprises a ratio of acetic acid to water of 99:1, 90:10, 75:25, 50:50, 25:75, 20:80, 10:90 or 1:90. In other embodiments, acidity is provided by adding a solid acid to the reaction solvent.

One embodiment of the present disclosure is a method for preparing polymer materials following a polymerization process in the absence of solvent. In one embodiment, the method comprises heating polymer gel particles that were formed in absence of solvent to obtain a carbon material, wherein the polymer has been prepared by a process comprising:

a) blending a mixture of solid and/or liquid polymer precursors; and b) aging the mixture at a temperature and for a time sufficient to produce a solvent-free polymer network; and In some embodiments, the solvent can be present at a level of less than 80% of the total mass of polymer to be processed into carbon, for example less than 70% of the total mass of polymer to be processed, less than 60% of the total mass of polymer to be processed, less than 50% of the total mass of polymer to be processed, less than 40% of the total mass of polymer to be processed, less than 30% of the total mass of polymer to be processed, less than 20% of the total mass of polymer to be processed, less than 10% of the total mass of polymer to be processed, less than 1% of the total mass of polymer to be processed, less than 0.1% of the total mass of polymer to be processed, less than 0.01% of the total mass of polymer to be processed.

The process can also occur in the melt state. Monomer or polymer components are heated above their melting point and then react to form an altered small molecule, a higher molecular weight thermoplastic or a crosslinked thermoset.

Another embodiment of the present disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises a surfactant in a concentration equal to or greater than the critical micelle concentration and the volume average particle size (Dv,50) of the polymer particles is less than or equal to 1 mm.

In another embodiment, the disclosure provides a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is less than or equal to 1 mm.

In still other embodiments, the disclosure is directed to a method for making polymer particles in gel form via an emulsion or suspension process, the method comprising:

a) preparing a reactant mixture comprising a monomer component comprising one or more phenolic compounds, one or more crosslinking compounds, and a carrier fluid; and b) polymerizing the one or more phenolic compounds with the one or more crosslinking compounds, wherein the carrier fluid comprises 50 wt % or more of cyclohexane, based on the total weight of the carrier fluid, and the volume average particle size (Dv,50) of the polymer particles is greater than or equal to 1 mm.

In another embodiment the present application provides a method for preparing a condensation polymer gel via an emulsion or suspension process, the method comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In another embodiment, the disclosed methods include preparing a dried condensation polymer gel, the method comprises drying a condensation polymer gel, wherein the condensation polymer gel has been prepared by an emulsion or suspension process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the invention provides a method for preparing a carbon material, the method comprising heating condensation polymer gel particles to obtain a carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

The condensation polymer gel may be used without drying or the methods may further comprise drying the condensation polymer gel. In certain embodiments of the foregoing methods, the polymer gel is dried by freeze drying. The polymer formed in the emulsion or suspension can also be formed via an addition, free radical, or living polymerization method.

The methods are useful for preparation of condensation polymer gels and/or carbon materials having any number of various pore structures. In this regard, Applications have discovered that the pore structure can be controlled by variation of any number of process parameters such as continuous phase type, stir rate, temperature, aging time, etc. In some embodiments, the condensation polymer gel is microporous, and in other embodiments the condensation polymer gel is mesoporous. In certain other embodiments, the condensation polymer gel comprises a pore structure having a mixture of microporous and mesoporous pores.

In related embodiments, the carbon material is microporous or the carbon material is mesoporous. In other embodiments, the carbon material comprises a pore structure comprised of micropores, mesopores or macropores, or a combination thereof The polymer phase may be prepared by admixing the one or more polymer precursors and the optional solvent, and in some examples the mixture is prepared by admixing the continuous phase and the polymer phase. The method includes embodiments wherein the mixture is an emulsion, while in other embodiments the mixture is a suspension.

For example, in some embodiments the continuous phase and the polymer phase are not miscible with each other, and the mixture is an emulsion. While in other exemplary methods the continuous phase and the polymer phase are not soluble in each other, and the mixture is a suspension. In other examples, the polymer phase is aged prior to preparation of the mixture, and the mixture is an emulsion and/or a suspension upon combination of the continuous phase and the polymer phase.

In other different aspects, both the continuous phase and the polymer phase are soluble in each other (i.e., miscible). In some variations of this embodiment, the continuous phase and polymer phase are miscible initially but the polymer phase is aged such that it becomes immiscible with the continuous phase and the mixture becomes a suspension upon aging.

The polymer phase may be prepared by admixing the one or more polymer precursors and the optional solvent. In some embodiments, the polymer phase is "pre-reacted" prior to mixing with the continuous phase such the polymer precursors are at least partially polymerized. In other embodiments, the polymer precursors are not pre-reacted. In certain other embodiments, the method is a continuous process. For example, the polymer precursors may be continuously mixed with a continuous phase and the final condensation polymer gel may be continuously isolated from the mixture.

A single polymer precursor may be used or the methods may comprise use of two or more different polymer precursors. The structure of the polymer precursors is not particularly limited, provided that the polymer precursor is capable of reacting with another polymer precursor or with a second polymer precursor to form a polymer.

2. Creation of Polymer Gel Particles

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In other embodiments, the polymer gel particles are in the range of 0.1 microns to 2.5 cm, from about 0.1 microns to about 1 cm, from about 1 micron to about 1000 microns, from about 1 micron to about 100 microns, from about 1 micron to about 50 microns, from about 1 micron to about 25 microns or from about 1 microns to about 10 microns. In other embodiments, the polymer gel particles are in the range of about 1 mm to about 100 mm, from about 1 mm to about 50 mm, from about 1 mm to about 25 mm or from about 1 mm to about 10 mm.

In an embodiment, a roller mill is employed. A roller mill has three stages to gradually reduce the size of the gel particles. The polymer gels are generally very brittle and are not damp to the touch. Consequently they are easily milled using this approach; however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $1/8^{th}$ inch. In another embodiment, the rotary crusher has a screen mesh size of about $3/8^{th}$ inch. In another embodiment, the rotary crusher has a screen mesh size of about $5/8^{th}$ inch. In another embodiment, the rotary crusher has a screen mesh size of about $3/8^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles.

In one embodiment the polymer gel particles are formed by emulsion/suspension. As described above, a mixture of organic polymer solution can be mixed with electrochemical modifier particles, for example, through sonication or other methods. The mixture can then be stirred or further sonicated into a solution or continuous phase that is used to create an emulsion or suspension or an inverse emulsion. In one embodiment, the continuous phase contains cyclohexane. In one embodiment, the continuous phase contains a surfactant. In one embodiment, the continuous phase contains SPAN 80 as a surfactant. In one embodiment, the continuous phase contains mineral oil. In one embodiment, the continuous phase contains vegetable oil. In one embodiment, the continuous phase is largely free of cyclohexane. The ratio of surfactant can be modified to control the formation of particles. In one embodiment, the continuous phase has a ratio of surfactant to continuous phase of 200:1 v/v. In one embodiment, the continuous phase has a ratio of surfactant to continuous phase of 2000:1 v/v.

3. Soaking or Treatment of Polymer Gels

The organic polymer gels described above, can be further soaked or treated for the inclusion of an optional electrochemical modifier. The inclusion of the electrochemical modifier may change both the electrochemical properties of the final product when used in a lithium battery and/or change the physical/chemical properties of the material.

In some embodiments, an electrochemical modifier is added through a liquid phase soaking or solvent exchange. The solvent used may be the same or different than that used in the polymer gel process. Generally, for soaking, wet polymer gels are weighed and placed into a larger container. A solution containing a solvent and a precursor for electrochemical modification is combined with the wet polymer gel to form a mixture. The mixture is left to soak at a set stir rate, temperature and time. Upon completion, the excess solvent is decanted from the mixture. In other embodiments, the optional electrochemical modifier is added through a vapor phase.

In some embodiments, the precursor may be soluble in the solvent. For precursors that are soluble in the chosen solvent, in some embodiments, the solution may be unsaturated, saturated, or super saturated. In other embodiments, the precursor may be insoluble and therefore suspended in the solvent.

In some embodiments, the soak temperature ranges from 20 to 30° C. In other embodiments, the soak temperature ranges from 30 to 40° C. In yet other embodiments, the soak temperature ranges from 40 to 50° C. In yet other embodiments, the soak temperature ranges from 50 to 60° C. In yet other embodiments, the soak temperature ranges from 60 to 70° C. In yet other embodiments, the soak temperature ranges from 70 to 80° C. In yet other embodiments, the soak temperature ranges from 80 to 100° C.

In some embodiments, the soak time (the period of time between the combination of the wet polymer gel and the solution and the decanting of the excess liquid) is from about 0 hours to about 5 hours. In other embodiments, the soak time ranges from about 10 minutes to about 120 minutes, between about 30 minute and 90 minutes, and between about 40 minutes and 60 minutes. In yet other embodiments, the soak time is between about from about 0 hours to about 10 hours, from about 0 hours to about 20 hours, from about 10 hours to about 100 hours, from about 10 hours to about 15 hours, or from about 5 hours to about 10 hours.

In some embodiments, the stir rate is between 0 and 10 rpm. In other embodiments, the stir rate is between 10 and 15 rpm, between 15 and 20 rpm, between 20 and 30 rpm, between 30 and 50 rpm, between 50 and 100 rpm, between 100 and 200 rpm, between 200 and 1000 rpm, or greater than 1000 rpm. In yet other embodiments, the mixture undergoes no artificial agitation.

4. Carbon Materials and Composites

The polymer gels described above, can be further processed to obtain the desired composite materials. Such processing includes, for example, pyrolysis. Generally, in the pyrolysis process, wet polymer gels are weighed and placed in a rotary kiln. The temperature ramp is set at 10° C. per minute, the dwell time and dwell temperature are set; cool down is determined by the natural cooling rate of the furnace. The entire process is usually run under an inert atmosphere, such as a nitrogen environment. However, in certain embodiments, the gas may be a hydrocarbon listed in table 1, such as methane, or ammonia. Pyrolyzed samples are then removed and weighed. Other pyrolysis processes are well known to those of skill in the art.

In some embodiments, an optional electrochemical modifier is incorporated into the carbon material after pyrolysis of the polymer gel. For example, the electrochemical modifier can be incorporated into the pyrolyzed polymer gel by contacting the pyrolyzed polymer gel with the electrochemical modifier, for example, colloidal metal, molten metal, metal salt, metal paste, metal oxide or other sources of metals. In one embodiment molten tin as an electrochemical modifier is incorporated into the pyrolyzed organic polymer during or after pyrolysis. In one embodiment tin chloride as an electrochemical modifier is incorporated into the pyrolyzed organic polymer during or after pyrolysis. In one embodiment, tin chloride is in the form of tin tetrachloride. In one embodiment silicon chloride as an electrochemical modifier is incorporated into the pyrolyzed organic polymer during or after pyrolysis. In one embodiment, tin chloride is in the form of silicon tetrachloride In some embodiments, pyrolysis dwell time (the period of time during which the sample is at the desired temperature) is from about 0 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to 2400° C. In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 1000° C. to about 1200° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

In yet other embodiments, the surface of the composite may be modified during pyrolysis due to the thermal breakdown of solid, liquid or gas precursors. Theses precursors may include any of the chemicals listed in Table 1. In one embodiment the precursors may be introduced prior to pyrolysis under room temperature conditions. In a second embodiment, the precursors may be introduced while the material is at an elevated temperature during pyrolysis. In a third embodiment, the precursors may be introduced post-pyrolysis. Multiple precursors or a mixture of precursors for chemical and structural modification may also be used. In one embodiment a reducing gas is used to reduce the electrochemical modifier into its elemental form. In one embodiment, the reducing gas is hydrogen. In one embodiment, the reducing gas is ammonia. In one embodiment, the reducing gas is hydrogen sulfide. In one embodiment, the reducing gas is carbon monoxide.

The composite may also undergo an additional heat treatment step to help change the surface functionality. In some embodiments, heat treatment dwell temperature ranges from about 500° C. to 2400° C. In some embodiments, heat treatment dwell temperature ranges from about 650° C. to 1800° C. In other embodiments heat treatment dwell temperature ranges from about 700° C. to about 1200° C. In other embodiments heat treatment dwell temperature ranges from about 850° C. to about 1050° C. In other embodiments heat treatment dwell temperature ranges from about 1000° C. to about 1200° C. In other embodiments heat treatment dwell temperature ranges from about 800° C. to about 1100° C.

In some embodiments, heat treatment dwell time (the period of time during which the sample is at the desired temperature) is from about 0 minutes to about 300 minutes, from about 10 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In one embodiment the composite may also undergo a heat treatment under a volatile gas, such as a hydrocarbon listed in Table 1. Wishing not to be bound by theory, the hydrocarbon or volatile gas may decompose or react on the surface of the composite when exposed to elevated temperatures. The volatile may leave behind a thin layer, such as a soft carbon, covering the surface of the composite. In one embodiment the material comprising an electrochemical modifier is subjected to coating with soft carbon layer. In one embodiment silicon powders are coated with soft carbon to form a composite. In another embodiment tin powder is coated with soft carbon to form a composite.

In one embodiment the gas may be piped in directly from a compressed tank. In another embodiment the gas may originate through the heating of a liquid and the mixing of an inert carrier gas using a bubbler technique commonly known in the art. In another embodiment, as solid or liquid may be placed upstream of the sample and decompose into a volatile gas, which then reacts with the carbon in the hot zone.

In one embodiment the vapor deposition may be completed under a static gas environment. In another embodiment the vapor deposition may be completed in a dynamic, gas flowing environment but wherein the carbon is static. In yet another embodiment, the vapor deposition may be completed under continuous coating, wherein the gas and the carbon are flowing through a hot zone. In still yet another embodiment the vapor deposition may be completed under continuous coating, wherein the gas and the carbon are flowing through a hot zone, but where the gas is flowing counter current to the solid carbon. In another embodiment the carbon is coated by chemical vapor deposition while rotating in a rotary kiln.

The composite may also undergo a vapor deposition through the heating of a volatile gas at different temperatures. In some embodiments the electrochemical modifier is incorporated during the pyrolysis or high temperature treatment by a gas phase deposition of the desired compounds.

In one embodiment the gas phase contains silicon. For example, in one embodiment the silicon is conveyed in the form of silane gas. In another embodiment, the silicon is conveyed in the form of trichlorosilane gas. In one embodiment the silicon containing gas is combined with nitrogen gas. In some embodiments the gas stream contains phospine, diborane, or arsine. In one embodiment the gas contains tin. In another embodiment the gas comprises vaporized elemental tin. In one embodiment the gas phase deposition of electrochemical modifier is performed in a kiln or in a fluidized bed. The pressure of the deposition can be modified to create a near vacuum condition. In some embodiments vapor deposition temperature ranges from about 500° C. to 2400° C. In some embodiments, heat treatment dwell temperature ranges from about 650° C. to 1800° C. In other embodiments heat treatment dwell temperature ranges from about 700° C. to about 1000° C. In other embodiments heat treatment dwell temperature ranges from about 800° C. to about 900° C. In other embodiments heat treatment dwell temperature ranges from about 1000° C. to about 1200° C. In other embodiments heat treatment dwell temperature ranges from about 900° C. to about 1100° C., from about 950° C. to about 1050° C. or about 1000° C.

The composite may also undergo a vapor deposition through the heating of a volatile gas for different dwell times. In some embodiments, vapor deposition dwell time (the period of time during which the sample is at the desired temperature) is from about 0 minutes to about 5 hours, from about 10 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

The thickness of the layer of carbon deposited by vapor deposition of hydrocarbon decomposition can be measured by HRTEM. In one embodiment the thickness of the layer is less than 0.1 nm, less than 0.5 nm, less than 1 nm, or less than 2 nm. In other embodiments the thickness of the carbon layer deposited by vapor deposition of hydrocarbon decomposition measured by HRTEM is between 1 nm and 100 nm. In yet other embodiments the thickness of the carbon layer deposited by vapor deposition of hydrocarbon decomposition measured by HRTEM is between 0.1 nm and 50 nm. In still other embodiments the thickness of the carbon layer deposited by vapor deposition of hydrocarbon decomposition measured by HRTEM is between 1 nm and 50 nm. In still other embodiments the thickness of the carbon layer deposited by vapor deposition of hydrocarbon decomposition measured by HRTEM is between 2 nm and 50 nm, for example between about 10 nm and 25 nm.

5. One-Step Polymerization/Pyrolysis Procedure

A composite material may also be synthesized through a one-step polymerization/pyrolysis method. In general, the polymer is formed during the pyrolysis temperature ramp. The precursors are placed into a rotary kiln with an inert nitrogen atmosphere. The precursors will undergo polymerization within the kiln during the temperature ramp. There may or may not be an intermediate dwell time to allow for complete polymerization. After polymerization is complete, the temperature is once again increased, where the polymer undergoes pyrolysis as previously described.

In some embodiments the precursors comprise a saccharide, protein, or a biopolymer. Examples of saccharides include, but are not limited to chitin, chitosan, and lignin. A non-limiting example of a protein is animal derived gelatin. In other embodiments, the precursors may be partially polymerized prior to insertion into the kiln. In yet other embodiments, the precursors are not fully polymerized before pyrolysis is initiated.

The intermediate dwell time may vary. In one embodiment, no intermediate dwell time exists. In another embodiment, the dwell time ranges from about 0 to about 10 hrs. In yet another embodiment, the dwell time ranges from about 0 to about 5 hrs. In yet other embodiments, the dwell time ranges from about 0 to about 1 hour.

The intermediate dwell temperature may also vary. In some embodiments, the intermediate dwell temperature ranges from about 100 to about 600° C., from about 150 to about 500° C., or from about 350 to about 450° C. In other embodiments, the dwell temperature is greater than about 600° C. In yet other embodiments, the intermediate dwell temperature is below about 100° C.

The material will undergo pyrolysis to form carbon containing composite, as previously described. In some embodiments, pyrolysis dwell time (the period of time during which the sample is at the desired temperature) is from about 0 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to 2400° C. In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 850° C. to about 1050° C. In other embodiments pyrolysis dwell temperature ranges from about 1000° C. to about 1200° C.

After pyrolysis the surface area of the carbon as measured by nitrogen sorption may vary between 0 and 500 m$^2$/g, 0 and 250 m$^2$/g, 5 and 100 m$^2$/g, 5 and 50 m$^2$/g. In other embodiments, the surface area of the carbon as measured by nitrogen sorption may vary between 250 and 500 m$^2$/g, 300 and 400 m$^2$/g, 300 and 350 m$^2$/g, 350 and 400 m$^2$/g.

6. Reduction of Electrochemical Modifier to Elemental Form

In certain embodiments, the composite comprises carbon and an electrochemical modifier in elemental form. In one embodiment, the electrochemical modifier comprises elemental silicon. In one embodiment, the electrochemical modifier comprises elemental Tin. In one embodiment, the electrochemical modifier comprises elemental Germanium. In certain embodiments, it is preferable to incorporate the electrochemical modifier into the organic matrix in the form of an oxide or oxygen-containing compound followed by subsequent reduction of the oxide to elemental or essentially oxygen free electrochemical modifier. In the case of silicon, silicon oxides can be used to form a composite and then reduced to elemental silicon. In one embodiment the silicon comprises poly-crystalline silicon. In one embodiment, the silicon comprises crystalline silicon.

In one embodiment the reduction is carried out using carbothermal reduction. In one embodiment, the carbon is supplied to the reaction from the carbon in the composite material. In one embodiment the reaction is carried out in a reducing atmosphere as described above. The carbothermal reduction involves a heat treatment step under an inert atmosphere. In one embodiment the atmosphere comprises nitrogen or argon. In one embodiment, the reaction is carried out under a vacuum. In another embodiment, the atmosphere contains a reducing gas as described above. In some embodiments, heat treatment dwell temperature ranges from about 500° C. to 2400° C. In some embodiments, heat treatment dwell temperature ranges from about 1000° C. to 2200° C. In other embodiments heat treatment dwell temperature ranges from about 1500° C. to about 2000° C. In other embodiments heat treatment dwell temperature ranges from about 1600° C. to about 1900° C. In other embodiments heat treatment dwell temperature is about 1900° C. The heat treatment step is carried out with a dwell temperature for a specific period of time. In some embodiments, heat treatment dwell time (the period of time during which the sample is at the desired temperature) is from about 0 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

In one embodiment the reduction is carried out in an alkaline environment. In one embodiment reduction is magnesiothermal reduction. In another embodiment the reduction is calciothermal reduction. In one embodiment the reduction is carried out using beryllium or strontium, or barium. In the case of magnesiothermal calciothermal, or other alkaline reductions, the amount of material to be reduced can be varied against the amount of alkaline reducing agent. For example the molar ration of $SiO_2$ to alkaline reducing agent can be varied depending on the reaction conditions, completeness of reaction desired, and other reducing agents such as carbon or gases present. In one embodiment, the ratio of $SiO_2$:Alkaline is 1:1. In one embodiment, the ratio of $SiO_2$:Alkaline is 1:1.9. In one embodiment, the ratio of $SiO_2$:Alkaline is 1:3. In the case of alkaline reducing agents, the composite material comprising electrochemical modifier to be reduced is milled and mixed with powdered alkaline reducing agent.

The alkaline reduction involves a heat treatment step under a controlled atmosphere. In one embodiment the atmosphere comprises nitrogen or argon. In one embodiment, the reaction is carried out under a vacuum. In another embodiment, the atmosphere contains a reducing gas as described above. In some embodiments, heat treatment dwell temperature ranges from about 500° C. to 2400° C. In some embodiments, heat treatment dwell temperature ranges from about 600° C. to 1500° C. In other embodiments heat treatment dwell temperature ranges from about 600° C. to about 1000° C. In other embodiments heat treatment dwell temperature ranges from about 700° C. to about 800° C. In other embodiments heat treatment dwell temperature is about 725° C. The heat treatment step is carried out with a dwell temperature for a specific period of time. In some embodiments, heat treatment dwell time (the period of time during which the sample is at the desired temperature) is from about 0 minutes to about 180 minutes, from about 10 minutes to about 120 minutes, from about 30 minutes to about 100 minutes, from about 40 minutes to about 80 minutes, from about 45 to 70 minutes or from about 50 to 70 minutes.

In another embodiment, the reduction is carried out by electrochemical reduction. In this case, the electrochemical modifier to be reduced to elemental form is arranged in a high temperature electrochemical cell. In this high temperature electrochemical cell, the cathode is typically graphite but other highly stable electrically conductive compounds can be used. In one embodiment, the anode is a graphite rod. In one embodiment, the graphite rode is in electrical contact with a metal current collector and a power supply. This type of arrangements requires a high temperature electrolyte such a molten salt. In one embodiment, the electrolyte is calcium chloride. In one embodiment, the electrolyte is sodium chloride. In one embodiment, the electrolyte is a low temperature ionic liquid. In one embodiment, the electrochemical modifier to be reduced is placed in a metal crucible, which is in turn in electrical connection with a power supply. In one embodiment, the crucible comprises nickel. In another embodiment, the crucible is inconel. In another embodiment, the crucible comprises stainless steel. In another embodiment, the metal crucible containing the material to be reduced is filled with salt, and placed in the hot zone of a furnace in a controlled atmosphere and heated to a known temperature to melt the salt into an ionically conductive molten salt. In one embodiment, the atmosphere comprises nitrogen. In one embodiment, the dwell temperature of the furnace is 25 C or 50 C or 100 C or 200 C or 300 C or 400 C, or 500 C or 600 C or 700 C or 800 C or 850 C or 900 C or 950 C or 1000 C. In one embodiment, the temperature is above the melting point of the salt to be used. In one embodiment the furnace is held at the dwell temperature for a period of time required to fully melt the salt. In one embodiment, the dwell time is 30 minutes. In one embodiment, the dwell time is 60 minutes. After the dwell time has elapsed the power supply connected to the electrochemical cell is set to a potential necessary to reduce the electrochemical modifier. In one embodiment, the potential is 2.8V. In one embodiment, the current on the power supply is monitored. In one embodiment, power supply is turned off when the current stops decreasing. In one embodiment, the furnace is cooled, the crucible is removed and the salt is rinsed off of the reduced material with water.

7. Modification of Solid Phases to Produce Composite

Numerous methods are available for the incorporation of an electrochemical modifier into carbon. The composite may be formed through a gas phase deposition of an electrochemical modifier onto the carbon. The composite may be synthesized through mechanical mixing or milling of two distinct solids.

In one embodiment, both the carbon and the electrochemical modifier are in solid form. The form factor for both the solid carbon and/or the solid electrochemical modifier may be presented in any shape, such as, but not limited to a monolith, a powder, a rod, a wire, a sheet, or a tube. The two populations of materials may be combined to create a unique composite, whose physical and electrochemical properties are defined in the previous section. In one embodiment the two distinct populations are combined to make a composite prior to the fabrication of electrodes for testing. In another embodiment the composite is two distinct populations included independently into an electrode, if the two materials exhibit the same physical and electrochemical characteristics of a composite if combined prior to electrode fabrication.

The carbon solid may include multiple populations of carbon allotropes, such as graphite, soft carbon and graphene. The additional carbon allotropes are considered an electrochemical modifier if they alloy with lithium during electrochemical lithiations. Ratio of populations of allotropes are described in the previous section.

Methods of combination of multiple populations of powders to create a unique composite, known to those in the art, include but are not limited to mechanical milling (described in more detail below) such as jet milling, bead milling and ball milling, in process manufacturing techniques such as flow diversion, or techniques wherein the optimal composite is formed during electrode fabrication.

The carbon solid prior to gas phase growth of an electrochemical modifier may be considered ultrapure. The carbon solid may have any properties of the proposed composite as described in the previous section. The gas phase techniques may include thin film techniques known to those in the art, such as atomic layer deposition (ALD), chemical vapor deposition (CVD) and physical layer deposition (PLD). Gas phase precursors for the electrochemical modifier include, but are not limited to silane and all silane derivatives such as polysilanes, silicon tetrachloride, tin chloride, tetrakis-(dimethylamido)titanium, and tetrikis-(ethylamido)titanium.

The time for gas phase deposition of the electrochemical modifier on the carbon solid may impact the thickness of the silicon layer and ultimately the performance of the composite. In one embodiment the time of deposition is between 5 mins and 5 hours. In another embodiment the time of deposition is between 15 minutes and 60 minutes. In yet another embodiment the time of deposition if between 60 minutes and 4 hours, 2 hour an 3 hours or 2.5 hours.

The temperature for gas phase deposition of the electrochemical modifier on the carbon solid may impact the thickness of the silicon layer and ultimately the performance of the composite. In one embodiment the temperature of deposition is between 200 C and 1200 C. In another embodiment the temperature of deposition is between 300 C and 600 C, 400 C and 550 C, and 450 C and 500 C. In yet another embodiment the temperature of deposition if between 600 C and 1200 C, 600 C and 1000 C, 650 C and 800 C, 700 C and 750 C.

In one embodiment the composite is formed through a gas phase interaction with a silicon solid. The silicon solid may be any allotrope of known silicon and may have specific properties prior to gas phase growth of carbon. The 8. Mechanical Milling to Combine Electrochemical Modifier with Carbon Electrochemical modifiers can be incorporated with a pure carbon material by milling the two materials together using high-energy milling. Milling can create micronized and in some cases nanometer sized particles which are intimately combined by co-milling or by combination after milling. In one embodiment, the carbon component comprises hard carbon. In one embodiment, the carbon component comprises graphite. In one embodiment, the electrochemical modifier comprises silicon. In one embodiment, the electrochemical modifier comprises tin. Alternate forms of milling techniques can be used to mill the materials. In one embodiment, the milling technique is jet milling. In one embodiment, the milling technique is Fritch-milling. In one embodiment, the milling technique is ball milling. In one embodiment, the milling technique is high-energy ball milling.

In certain milling techniques, the residence time of the material in the mill can be varied to alter the result. In one embodiment, the residence time is about 10 seconds. In one embodiment, the residence time is about 30 seconds. In one embodiment, the residence time is about 1 minute. In one embodiment, the residence time is about 5 minutes. In one embodiment, the residence time is about 10 minutes. In one embodiment, the residence time is about 15 minutes. In one embodiment, the residence time is about 20 minutes. In one embodiment, the residence time is about 30 minutes. In one embodiment, the residence time is about 45 minutes. In one embodiment, the residence time is about 60 minutes. In one embodiment, the residence time is 90 minutes. In one embodiment, the residence time is 120 minutes. In one embodiment, the residence time is 180 minutes. In one embodiment, the residence time is 240 minutes.

The ratio of carbon to electrochemical modifier can be varied to create a material with different properties, such as capacity. The ratio can vary from 1:5 to 5:1. In one embodiment, the ratio is 1:5 or 1:4 or 1:3 or 1:2 or 1:1 or 2:1 or 3:1 or 4:1 or 5:1. In one embodiment, the electrochemical modifier can be used in a crystalline form. In one embodiment, electrochemical modifier can be used in an amorphous form.

The milling technique can be modified to create different particle size distributions. The D50 of the particle size distribution of the carbon can be varied independently or with the D50 of the particle size distribution of the electrochemical modifier. In one embodiment the D50 of the particle size distribution of either the carbon or the electrochemical modifier is about 0.1 um. In one embodiment the D50 of the particle size distribution of either the carbon or the electrochemical modifier is about 0.2 um. In one embodiment the D50 of the particle size distribution of either the carbon or the electrochemical modifier is about 0.5 um. In one embodiment the D50 of the particle size distribution of either the carbon or the electrochemical modifier is about 1 um. In one embodiment the D50 of the particle size distribution of either the carbon or the electrochemical modifier is about 3 um. In one embodiment the D50 of the particle size distribution of either the carbon or the electrochemical modifier is about 5 um. In one embodiment the D50 of the particle size distribution of either the carbon or the electrochemical modifier is about 8 um. In one embodiment the D50 of the particle size distribution of either the carbon or the electrochemical modifier is about 10 um. In one embodiment the D50 of the particle size distribution of either the carbon or the electrochemical modifier is about 15 um. In one embodiment the D50 of the particle size distribution of either the carbon or the electrochemical modifier is about 20 um. In one embodiment the D50 of the particle size distribution of either the carbon or the electrochemical modifier is about 30 um. In one embodiment the D50 of the particle size distribution of either the carbon or the electrochemical modifier is about 40 um. In one embodiment the D50 of the particle size distribution of either the carbon or the electrochemical modifier is about 50 um. In one embodiment the D50 of the particle size distribution of either the carbon or the electrochemical modifier is about 70 um. In one embodiment the D50 of the particle size distribution of either the carbon or the electrochemical modifier is about 100 um. In one embodiment the D50 of the particle size distribution of either the carbon or the electrochemical modifier is about 150 um. In one embodiment the D50 of the particle size distribution of either the carbon or the electrochemical modifier is about 200 um.

Alternately, after milling, the composite can be coated with carbon using vapor phase deposition as described above.

C. Form Factor of Electrochemical Modifier Relative to Carbon

The techniques described above can be used to create different arrangements and layouts of both carbon and electrochemical modifier. The above techniques are capable of creating a wide variety of formats of carbon, electrochemical modifier and their arrangement relative to each other. In one embodiment either the carbon or the electrochemical modifier is porous. In one embodiment, the electrochemical modifier is inside the pores of the carbon, for example encapsulated in the carbon. In one embodiment the carbon is inside the pores of the electrochemical modifier. In one embodiment either the carbon or the electrochemical modifier is arranged in a core-shell format. In one embodiment, the core is carbon. In other embodiments, the core is the electrochemical modifier, such as silicon or another lithium alloying element. In one embodiment, the shell thickness is about 5 nm. In one embodiment, the shell thickness is about 10 nm. In one embodiment, the shell thickness is about 30 nm. In one embodiment, the shell thickness is about 50 nm. In one embodiment, the shell thickness is about 100 nm. In one embodiment, the shell thickness is about 200 nm. In one embodiment, the shell thickness is about 300 nm. In one embodiment, the core is electrochemical modifier. In one embodiment either the carbon or the electrochemical modifier is arranged in a rod. In one embodiment either the carbon or the electrochemical modifier comprises foam. In one embodiment either the carbon or the electrochemical modifier is arranged in a tube. In one embodiment, the tube is hollow or in some embodiments the tube is filled with either carbon or electrochemical modifier. In still other embodiments, the composite is a physical blend of particles of the carbon component and particles of the electrochemical modifier.

In some embodiments, the electrochemical modifier is a coating on the surface of the carbon material. The properties of the electrochemical modifier coated onto the carbon may influence various important electrochemical metrics such as power performance and cycle life. In one embodiment, the thickness of the electrochemical modifier coating on the surface of the carbon is ranges from 1 to 10000 nm. In another embodiment the thickness ranges from 1 to 100 nm, 1, 50 nm, 1 to 10 nm, 10 to 20 nm. In yet another embodiment the thickness ranges from 100 to 1000 nm, 100 to 500 nm, 200 to 400 nm, 500 to 750 nm. In still another embodiment the thickness ranges from 1000 to 10000 nm, 1000 to 5000, or greater than 10000 nm. Examples of methods and conditions of synthesis are described in more detail below.

D. Characterization of Polymer Gels and Carbon Materials

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity and optional electrochemical modifier content of the carbon materials can be determined by any number of analytical techniques known to those of skill in the art. One particular analytical method useful within the context of the present disclosure is total x-ray reflection fluorescence (TXRF). Another analytical method useful within the context of the present disclosure is proton induced x-ray emission (PIXE). These techniques are capable of measuring the concentration of elements having atomic numbers ranging from 11 to 92 at low ppm levels. Accordingly, in one embodiment the concentration of electrochemical modifier, as well as all other elements, present in the carbon materials is determined by TXRF analysis. In other embodiments the concentration of electrochemical modifier, as well as all other elements, present in the carbon materials is determined by PIXE analysis.

E. Devices Comprising the Composite Materials

The disclosed composite materials can be used as electrode material in any number of electrical energy storage and distribution devices. For example, in one embodiment the present disclosure provides a lithium-based electrical energy storage device comprising an electrode prepared from the disclosed composite materials. Such lithium based devices are superior to previous devices in a number of respects including gravimetric and volumetric capacity and first cycle efficiency. Electrodes comprising the disclosed composite materials are also provided.

Accordingly, in one embodiment, the present disclosure provides an electrical energy storage device comprising:

a) at least one anode comprising a composite material disclosed herein;

b) at least one cathode comprising a metal oxide; and c) an electrolyte comprising lithium ions;

wherein the electrical energy storage device has a first cycle efficiency of at least 70% and a reversible capacity of at least 500 mAh/g with respect to the mass of the hard carbon material. In other embodiments, the efficiency is measured at a current density of about 100 mA/g with respect to the mass of the active hard carbon material in the anode. In still other embodiments, the efficiency is measured at a current density of about 1000 mA/g with respect to the mass of the active hard carbon material in the anode.

In some embodiments the properties of the device are tested electrochemically between upper and lower voltages of 3V and −20 mV, respectively. In other embodiments the lower cut-off voltage is between 50 mV and −20 mV, between 0V and −15 mV, or between 10 mV and 0V. Alternatively, the device is tested at a current density of 40 mA/g with respect to the mass of carbon material.

The composite material may be any of the composite materials described herein. In other embodiments, the first cycle efficiency is greater than 55%. In some other embodiments, the first cycle efficiency is greater than 60%. In yet other embodiments, the first cycle efficiency is greater than 65%. In still other embodiments, the first cycle efficiency is greater than 70%. In other embodiments, the first cycle efficiency is greater than 75%, and in other embodiments, the first cycle efficiency is greater than 80%, greater than 90%, greater than 95%, greater than 98%, or greater than 99%. In some embodiments of the foregoing, the composite material comprises a surface area of less than about 300 m$^2$/g. In other embodiments, the composite material comprises a pore volume of less than about 0.1 cc/g. In still other embodiments of the foregoing, the composite material comprises a surface area of less than about 50 m$^2$/g and a pore volume of less than about 0.1 cc/g.

In another embodiment of the foregoing electrical energy storage device, the electrical energy storage device has a volumetric capacity (i.e., reversible capacity) of at least 400 mAh/cc. In other embodiments, the volumetric capacity is at least 450 mAh/cc. In some other embodiments, the volumetric capacity is at least 500 mAh/cc. In yet other embodiments, the volumetric capacity is at least 550 mAh/cc. In still other embodiments, the volumetric capacity is at least 600 mAh/cc. In other embodiments, the volumetric capacity is at least 650 mAh/cc, and in other embodiments, the volumetric capacity is at least 700 mAh/cc.

In another embodiment of the device, the device has a gravimetric capacity (i.e., reversible capacity, based on mass of composite) of at least 150 mAh/g. In other embodiments, the gravimetric capacity is at least 200 mAh/g. In some other embodiments, the gravimetric capacity is at least 300 mAh/g. In yet other embodiments, the gravimetric capacity is at least 400 mAh/g. In still other embodiments, the gravimetric capacity is at least 500 mAh/g. In other embodiments, the gravimetric capacity is at least 600 mAh/g, and in other embodiments, the gravimetric capacity is at least 700 mAh/g, at least 800 mAh/g, at least 900 mAh/g, at least 1000 mAh/g, at least 1100 mAh/g or even at least 1200 mAh/g. In some particular embodiments the device has a gravimetric capacity ranging from about 550 mAh/g to about 750 mAh/g.

The cycle stability of the material is in part determined by the relative amount that the composite material swells when it takes on lithium. The most stable materials have a very low percent expansion relative to the original dimensions of a particle or electrode. In one embodiment, the percent expansion of the composite is about 0.5%. In one embodiment, the percent expansion of the composite is about 1%. In one embodiment, the percent expansion of the composite is about 2%. In one embodiment, the percent expansion of the composite is about 3%. In one embodiment, the percent expansion of the composite is about 4%. In one embodiment, the percent expansion of the composite is about 5%. In one embodiment, the percent expansion of the composite is about 7%. In one embodiment, the percent expansion of the composite is about 10%. In one embodiment, the percent expansion of the composite is about 15%. In one embodiment, the percent expansion of the composite is about 20%. In one embodiment, the percent expansion of the composite is about 30%. In one embodiment, the percent expansion of the composite is about 50%. In one embodiment, the percent expansion of the composite is about 100%.

The cycle stability of the composite material can be defined as the number of cycle a device is cycled until the capacity reaches 80% of the initial reversible capacity. In one embodiment the stability of the composite in a device is between 100 and 1000000 cycles. In another embodiment the cycle stability is between 100 and 5000 cycles, 200 and 1000 cycles, 300 and 1000 cycles. In yet another embodiment the cycle stability of the composite material is between 5000 and 1000000 cycles, 5000 and 100000, 5000 and 10000, or greater than 1000000 cycles.

The kinetics of charge and discharge of a composite material in a device can further be measured by power performance. In one embodiment the power density of a device made with the composite material is between 100 and 1000 W/kg, 200 and 800 W/kg, 200 and 450 W/kg, 300 and 400 W/kg. In another embodiment the power density of a device made with the composite material is between 100 and 1000 W/L, 100 and 500 W/L, 200 to 500 W/L, 300 to 450 W/L, greater than 1000 W/L.

The energy density of a device comprising the composite material can be defined both volumetrically and gravimetrically. In one embodiment the energy density of a device made with the composite material is between 100 and 1000 Wh/kg, 200 and 800 Wh/kg, 200 and 450 Wh/kg, 300 and 400 Wh/kg. In another embodiment the energy density of a device made with the composite material is between 100 and 1000 Wh/L, 100 and 500 Wh/L, 200 to 500 Wh/L, 300 to 450 Wh/L, greater than 1000 Wh/L.

Some of the capacity may be due to surface loss/storage, structural intercalation or storage of lithium within the pores. Structural storage is defined as capacity inserted above 50 mV vs Li/Li while lithium pore storage is below 50 mV versus Li/Li+ but above the potential of lithium plating. In one embodiment, the storage capacity ratio of a device between structural intercalation and pore storage is between 1:10 and 10:1. In another embodiment, the storage capacity ratio of a device between structural intercalation and pore storage is between 1:5 and 1:10. In yet another embodiment, the storage capacity ratio of a device between structural intercalation and pore storage is between 1:2 and 1:4. In still yet another embodiment, the storage capacity ratio of a device between structural intercalation and pore storage is between 1:1.5 and 1:2. In still another embodiment, the storage capacity ratio of a device between structural intercalation and pore storage is 1:1. The ratio of capacity stored through intercalation may be greater than that of pore storage in a device. In another embodiment, the storage capacity ratio of a device between structural intercalation and pore storage is between 10:1 and 5:1. In yet another embodiment, the storage capacity ratio of a device between structural intercalation and pore storage is between 2:1 and 4:1. In still yet another embodiment, the storage capacity ratio of a device between structural intercalation and pore storage is between 1.5:1 and 2:1.

Due to structural differences, lithium plating may occur at different voltages. The voltage of lithium plating is defined as when the voltage increases despite lithium insertion at a slow rate of 20 mA/g. In one embodiment the voltage of lithium plating of a device collected in a half-cell versus lithium metal at a current density of 20 mA/g is 0V. In another embodiment the voltage of lithium plating of a device collected in a half-cell versus lithium metal at a current density of 20 mA/g is between 0V and −5 mV. In yet another embodiment the voltage of lithium plating of a device collected in a half-cell versus lithium metal at a current density of 20 mA/g is between −5 mV and −10 mV. In still yet another embodiment the voltage of lithium plating of a device collected in a half-cell versus lithium metal at a current density of 20 mA/g is between −10 mV and −15 mV. In still another embodiment the voltage of lithium plating of a device collected in a half-cell versus lithium metal at a current density of 20 mA/g ranges from −15 mV to −20 mV. In yet another embodiment the voltage of lithium plating of a device collected in a half-cell versus lithium metal at a current density of 20 mA/g is below −20 mV.

In some embodiments of the foregoing, the composite material comprises a surface area of less than about 300 m$^2$/g. In other embodiments, the composite material comprises a pore volume of less than about 0.1 cc/g. In still other embodiments of the foregoing, the composite material comprises a surface area of less than about 300 m$^2$/g and a pore volume of less than about 0.1 cc/g.

In yet still another embodiment of the foregoing electrical energy storage device, the electrical energy storage device has a volumetric capacity at least 5% greater than the same device which comprises a graphite electrode instead of an electrode comprising the disclosed composite material. In still other embodiments, the electrical energy storage device has a gravimetric capacity that is at least 10% greater, at least 20% greater, at least 30% greater, at least 40% greater or at least 50% greater than the gravimetric capacity of the same electrical energy storage device having a graphite electrode.

Embodiments wherein the cathode comprises a material other than a metal oxide are also envisioned. For example, in another embodiment, the cathode comprises a sulfur-based material rather than a metal oxide. In still other embodiments, the cathode comprises a lithium containing metal-phosphate. In still other embodiments, the cathode comprises lithium metal. In still other embodiments, the cathode is a combination of two or more of any of the foregoing materials. In still other embodiments, the cathode is an air cathode.

For ease of discussion, the above description is directed primarily to lithium based devices; however the disclosed carbon materials find equal utility in sodium based devices and such devices (and related composite materials) are included within the scope of the invention.

The following examples are provided for purpose of illustration and not limitation.

EXAMPLES

The polymer gels, pyrolyzed cryogels, carbon materials and composite materials disclosed herein may be prepared according to the following exemplary procedures. Chemicals were obtained from commercial sources at reagent grade purity or better and were used as received from the supplier without further purification.

Unless indicated otherwise, the following conditions were generally employed for preparation of the carbon materials and precursors. Phenolic compound and aldehyde were reacted in the presence of a catalyst in a binary solvent system (e.g., water and acetic acid). The molar ratio of phenolic compound to aldehyde was typically 0.5 to 1. For monolith procedures, the reaction was allowed to incubate in a sealed container at temperatures of up to 85° C. for up to 24 h. The resulting polymer hydrogel contained water, but no organic solvent; and was not subjected to solvent exchange of water for an organic solvent, such as t-butanol. The polymer hydrogel monolith was then physically disrupted, for example by grinding, to form polymer hydrogel particles having an average diameter of less than about 5 mm.

The wet polymer hydrogel was typically pyrolyzed by heating in a nitrogen atmosphere at temperatures ranging from 800-1200° C. for a period of time as specified in the examples. Specific pyrolysis conditions were as described in the following examples.

Where appropriate, impregnation of the carbon materials with electrochemical modifiers was accomplished by including a source of the electrochemical modifier in the polymerization reaction or contacting the carbon material, or precursors of the same (e.g., polymer hydrogel, dried polymer hydrogel, pyrolyzed polymer gel, etc.), with a source of the electrochemical modifier as described more fully above and exemplified below.

Example 1

Monolith Preparation of Wet Polymer Gel

Polymer gels were prepared using the following general procedure. A polymer gel was prepared by polymerization of resorcinol and formaldehyde (0.5:1) in water and acetic acid (75:25) and ammonium acetate (RC=10, unless otherwise stated). The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. In certain embodiments the polymer is rinsed in a urea or polysaccharide solution. While not wishing to be bound by theory, it is believed such treatment may either impart surface functionality or alter the bulk structure of the carbon and improve the electrochemical characteristics of the carbon materials.

Example 2

Alternative Monolith Preparation of Wet Polymer Gel

Alternatively to Example 1, polymer gels were also prepared using the following general procedure. A polymer gel was prepared by polymerization of urea and formaldehyde (1:1.6) in water (3.3:1 water:urea) and formic acid. The reaction mixture was stirred at room temperature until gellation to create a white polymer gel. Polymer gel particles were created through manually crushing.

The extent of crosslinking of the resin can be controlled through both the temperature and the time of curing. In addition, various amine containing compounds such as urea, melamine and ammonia can be used. One of ordinary skill in the art will understand that the ratio of aldehyde (e.g., formaldehyde) to solvent (e.g., water) and amine containing compound can be varied to obtain the desired extent of cross linking and nitrogen content.

Example 3

Post-Gel Chemical Modification

A nitrogen containing hard carbon was synthesized using a resorcinol-formaldehyde gel mixture in a manner analogous to that described in Example 1. About 20 mL of polymer solution was obtained (prior to placing solution at elevated temperature and generating the polymer gel). The solution was then stored at 45° C. for about 5 h, followed by 24 h at 85° C. to fully induce cross-linking. The monolith gel was broken mechanically and milled to particle sizes below 100 microns. The gel particles were then soaked for 16 hours in a 30% saturated solution of urea (0.7:1 gel:urea and 1.09:1 gel:water) while stirring. After the excess liquid was decanted, the resulting wet polymer gel was allowed to dry for 48 hours at 85° C. in air then pyrolyzed by heating from room temperature to 1100° C. under nitrogen gas at a ramp rate of 10° C. per min to obtain a hard carbon containing the nitrogen electrochemical modifier.

In various embodiments of the above method, the gel particles are soaked for about 5 minutes to about 100 hrs, from about 1 hour to about 75 hours, from about 5 hours to about 60 hours, from about 10 hours to 50 hours, from about 10 hours to 20 hours from about 25 hours to about 50 hours, or about 40 hours. In certain embodiments the soak time is about 16 hours.

The drying temperature may be varied, for example from about room temperature (e.g. about 20-25 C) to about 100 C, from about 25 C to about 100 C, from about 50 to about 90 C, from about 75 C to about 95 C, or about 85 C.

Ratio of the polymer gel to the soak composite (e.g., a compound such as urea, melamine, ammonia, sucrose etc. or any of the compounds listed in table 1) can also be varied to obtain the desired result. The ratio of gel to nitrogen containing compound ranges from about 0.01:1 to about 10:1, from about 0.1:1 to about 10:1, from about 0.1:1 to about 5:1, from about 1:1 to about 5:1, from about 0.2:1 to about 1:1 or from about 0.4:1 to about 0.9:1.

The ratio of gel to water can also range from about 0.01:1 to about 10:1, from about 0.5:1 to about 1.5:1, from about 0.7:1 to about 1.2:1 or from about 0.9:1 to about 1.1:1.

Various solvents such as water, alcohols, oils and/or ketones may be used for soaking the polymer gel as described above. Various embodiments of the invention include polymer gels which have been prepared as described above (e.g., contain nitrogen as a result of soaking in a nitrogen containing compound) as well as carbon materials prepared from the same (which also contain nitrogen). Methods according to the general procedure described above are also included within the scope of the invention.

The concentration of the soak composite in the solvent in which it is soaked may be varied from about 5% to close to 100% by weight. In other embodiments, the concentration ranges from about 10% to about 90%, from about 20% to about 85%, from about 25% to about 85%, from about 50% to about 80% or from about 60% to about 80%, for example about 70%.

While not wishing to be bound by theory, it is believe that in certain embodiments the gel may undergo further cross linking while being soaked in the solution containing a compound from Table I.

Example 4

Preparation of Pyrolyzed Carbon Material from Wet Polymer Gel

Wet polymer gel prepared according to Examples 1-3 was pyrolyzed by passage through a rotary kiln at 1100° C. with a nitrogen gas flow of 200 L/h. The weight loss upon pyrolysis was about 85%.

The surface area of the pyrolyzed dried polymer gel was examined by nitrogen surface analysis using a surface area and porosity analyzer. The measured specific surface area using the standard BET approach was in the range of about 150 to 200 m$^2$/g. The pyrolysis conditions, such as temperature and time, are altered to obtain hard carbon materials having any number of various properties.

In certain embodiments, the carbon after pyrolysis is rinsed in either a urea or polysaccharide solution and re-pyrolyzed at 600° C. in an inert nitrogen atmosphere. In other embodiments, the pyrolysis temperature is varied to yield varying chemical and physical properties of the carbon.

The wet gel may also be pyrolyzed in a non-inert atmosphere such as ammonia gas. A 5 gram sample first purged under a dynamic flow of 5% ammonia/95% N2 volume mixture. The sample is then heated to 900° C. under the ammonia/N2 flow. The temperature is held for 1 hour, wherein the gas is switched to pure nitrogen for cool down. The material is not exposed to an oxygen environment until below 150° C.

Example 5

Micronization of Hard Carbon Via Jet Milling

Carbon material prepared according to Example 2 was jet milled using a Jet Pulverizer Micron Master 2 inch diameter jet mill. The conditions comprised about 0.7 lbs of activated carbon per hour, nitrogen gas flow about 20 scf per min and about 100 psi pressure. The average particle size after jet milling was about 8 to 10 microns.

Example 6

Post-Carbon Surface Treatment

Figure 9:
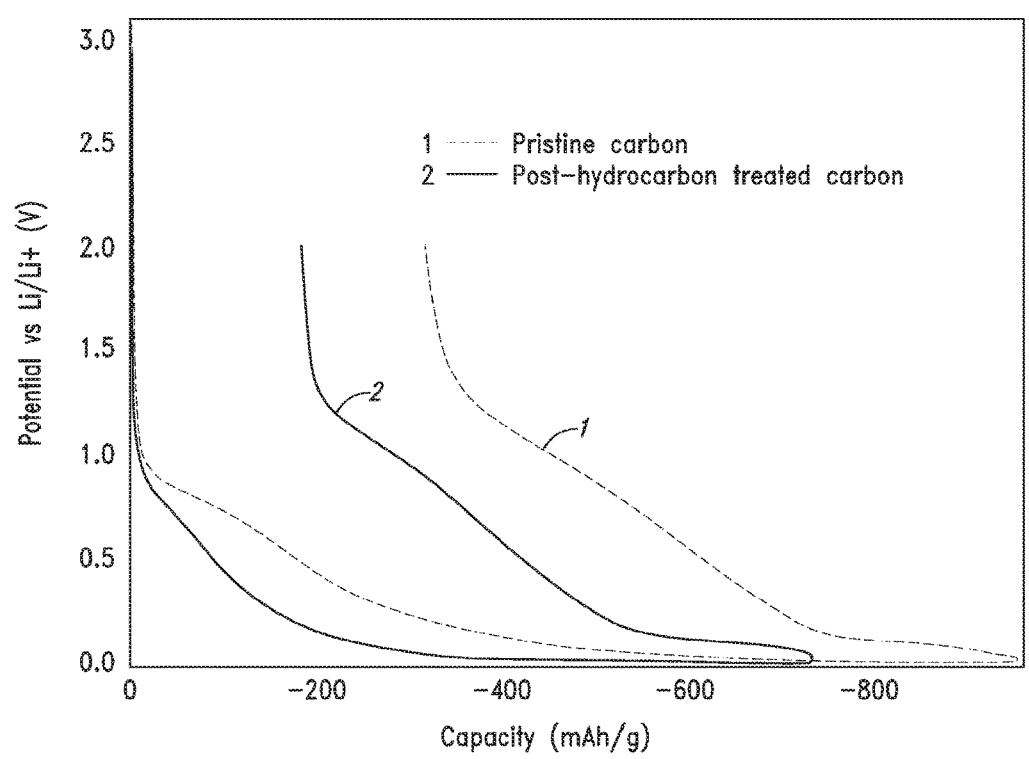
FIG. 9 presents electrochemical performance of a carbon material before and after hydrocarbon surface treatment.
Figure 10:
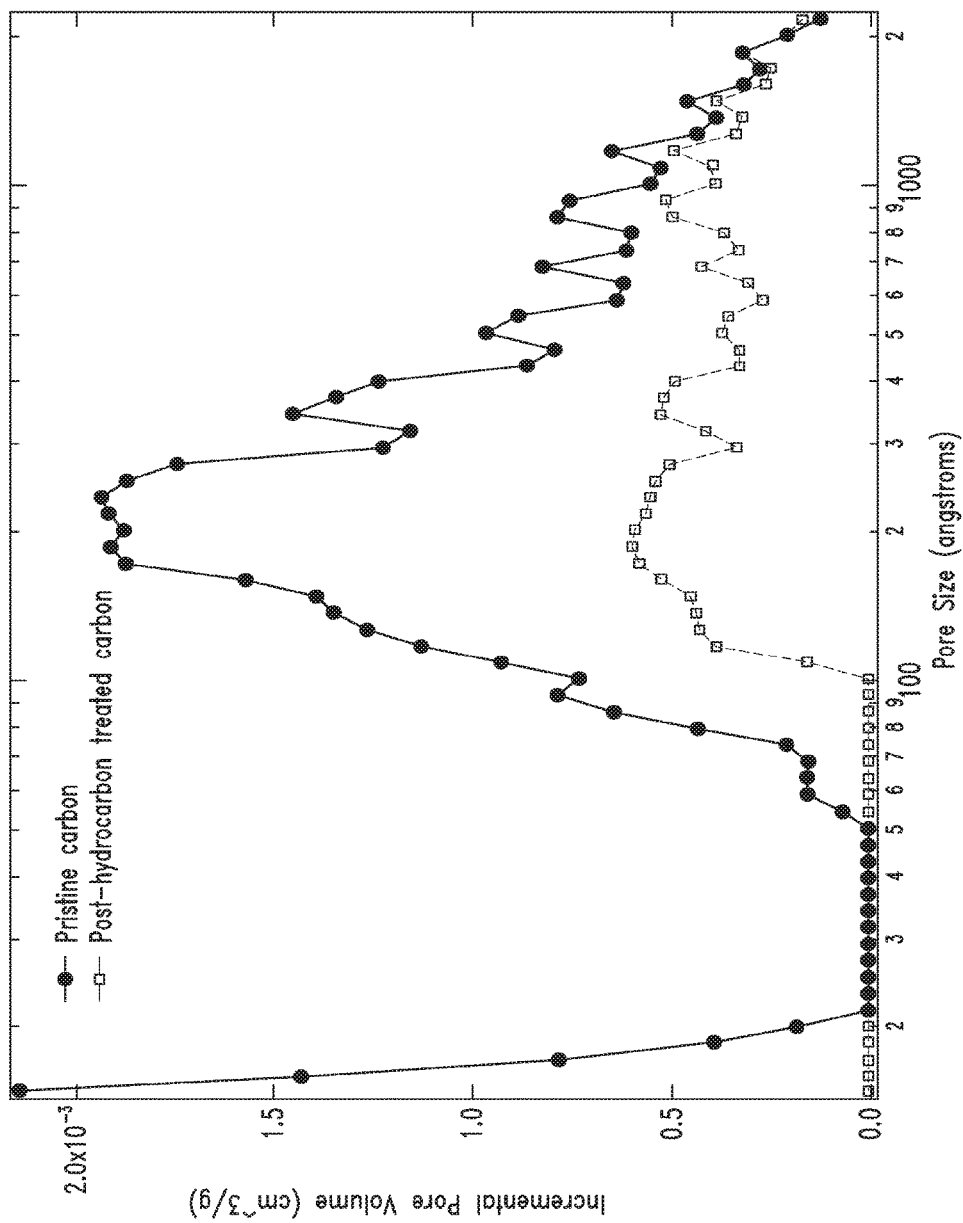
FIG. 10 is a graph showing pore size distribution of a carbon material before and after hydrocarbon surface treatment

The 1$^{st}$ cycle lithiation efficiency of the resulting hard carbon from example 5 can be improved via a non-oxygen containing hydrocarbon (from Table 1) treatment of the surface. In a typical embodiment the micronized/milled carbon is heated to 800° C. in a tube furnace under flowing nitrogen gas. At peak temperature the gas is diverted through a flask containing liquid cyclohexane. The cyclohexane then pyrolyzes on the surface of the hard carbon. FIG. 9 shows the superior electrochemical performance of the surface treated hard carbon. The modified pore size distribution is shown in FIG. 10. Exemplary surface areas of untreated and hydrocarbon treated hard carbon materials are presented in Table 2.

TABLE 2

Carbon Surface Area's Before and After Surface Treatment with Hydrocarbons

| | BET surface area (m$^2$/g) Before surface treatment | BET surface area (m$^2$/g) After surface treatment |
|---|---|---|
| Carbon A | 275 | 0.580 |
| Carbon B | 138 | 0.023 |

Example 7

Properties of Various Hard Carbons

Carbon materials were prepared in a manner analogous to those described in the above Examples and their properties measured. The electrochemical performance and certain other properties of the carbon samples are provided in Table 3. The data in Table 3 show that the carbons with surface area ranging from about 200 to about 700 m$^2$/g and pore volumes ranging from about 0.1 to about 0.7 cc/g) had the best 1$^{st}$ cycle efficiency and reversible capacity ($Q_{rev}$).

TABLE 3

Certain Properties of Exemplary Hard Carbon Materials

| | Properties | | | | |
|---|---|---|---|---|---|
| Sample | Skeletal Density (g/cc) | Specific Surface Area (m2/g) | Total Pore Volume (cc/g) | Tap Density (g/cc) | pH |
| Carbon 1 | — | 3.6 | 0.003 | 0.528 | — |
| Carbon 2 | 2.02 | 11.4 | 0.000882 | 0.97 | — |
| Carbon 3 | — | 241.7 | 0.11 | — | — |
| Carbon 4 | 1.44 | 338 | 0.14 | — | 7.038 |
| Carbon 5 | — | 705 | 0.57 | 0.44 | 3.8 |
| Carbon 6 | 1.89 | 1618 | 1.343 | 0.18 | 8.98 |
| Carbon 7 | 2.28 | 1755 | 0.798 | 0.36 | 5.41 |

| | Electrochemical Performances | | |
|---|---|---|---|
| | Q (initial) mAh/g | Q (rev) mAh/g | 1st cycle eff. (%) |
| Carbon 1 | 171 | 111 | 64 |
| Carbon 2 | 679 | 394 | 58 |
| Carbon 3 | 807 | 628 | 78 |
| Carbon 4 | 325 | 208 | 64 |
| Carbon 5 | 1401 | 566 | 40 |
| Carbon 6 | 1564 | 242 | 15 |
| Carbon 7 | 1366 | 314 | 23 |

The pore size distribution of exemplary hard carbons is provided in FIG. 1, which shows that hard carbon materials having pore size distributions ranging from microporous to mesoporous to macroporous can be obtained. The data also shows that the pore structure may also determine the packing and volumetric capacities of the material when used in a device. FIG. 2 depicts storage of lithium per unit volume of the device as a function of cycle number. The data from FIG. 2 correlates well with the data from FIG. 1. The two microporous materials display the highest volumetric capacity, possibly due to a higher density material. The mesoporous material has the third highest volumetric capacity while the macroporous material has the lowest volumetric capacity. While not wishing to be bound by theory, it is believed that the macroporous materials create empty spaces within the device, void of carbon for energy storage.

The particle size and particle size distribution of the hard carbon materials may affect the carbon packing efficiency and may contribute to the volumetric capacity of electrodes comprising the carbon materials. The particle size distribution of two exemplary hard carbon materials is presented in FIG. 3. Thus both single Gaussian and bimodal particle size distributions can be obtained. Other particle size distributions can be obtained by altering the synthetic parameters and/or through post processing such as milling or grinding.

As noted above, the crystallite size ($L_a$) and range of disorder may have an impact on the performance, such as energy and power density, of a hard carbon anode. Disorder, as determined by RAMAN spectroscopy, is a measure of the size of the crystallites found within both amorphous and crystalline structures (M. A. Pimenta, G. Dresselhaus, M. S. Dresselhaus, L. G. Can ado, A. Jorio, and R. Saito, "Studying disorder in graphite-based systems by Raman spectroscopy," Physical Chemistry Chemical Physics, vol. 9, no. 11, p. 1276, 2007). RAMAN spectra for exemplary hard carbon examples are depicted in FIG. 4, while crystallite sizes and electrochemical properties are listed in table 4. Data was collected with the wavelength of the light at 514 nm.

TABLE 4

Crystallite size and electrochemical properties for DOE carbons

| Carbon Sample | R | $L_a$ (nm) | $2^{nd}$ Lithium insertion (mAh/g) |
|---|---|---|---|
| Carbon A | 0.6540 | 25.614 | 380 |
| Carbon B | 0.908 | 18.45 | 261 |
| Carbon C | 0.8972 | 18.67 | 268 |
| Carbon D | 0.80546 | 20.798 | 353 |

The data in Table 4 shows a possible trend between the available lithium sites for insertion and the range of disorder/crystallite size. This crystallite size may also affect the rate capability for carbons since a smaller crystallite size may allow for lower resistive lithium ion diffusion through the amorphous structure. Due to the possible different effects that the value of disorder has on the electrochemical output, this present invention includes embodiments having high and low levels of disorder.

TABLE 5

Example results of CHNO analysis of carbons

| Sample | C | H | N | O | C:N Ratio |
|---|---|---|---|---|---|
| Carbon A | 80.23 | <0.3 | 14.61 | 3.44 | 1:1.82 |
| Carbon B | 79.65 | <0.3 | 6.80 | 7.85 | 1:0.085 |

TABLE 5-continued

Example results of CHNO analysis of carbons

| Sample | C | H | N | O | C:N Ratio |
|---|---|---|---|---|---|
| Carbon C | 84.13 | <0.3 | 4.87 | 6.07 | 1:0.058 |
| Carbon D | 98.52 | <0.3 | 0.43 | <0.3 | 1:0.0044 |
| Carbon E | 94.35 | <0.3 | 1.76 | <3.89 | 1:0.019 |

The data in Table 5 shows possible compositions of hard carbons as measured by CHNO analysis. The nitrogen content may be added either in the polymer gel synthesis (Carbon A and B), during soaking of the wet polymer gel (Carbon C), or after carbon synthesis. It is possible that the nitrogen content or the C:N ratio may create a different crystalline or surface structure, allowing for the reversible storage of lithium ions. Due to the possible different effects nitrogen content may play in lithium kinetics, the present invention includes embodiments having both low and high quantities of nitrogen.

Figure 20:
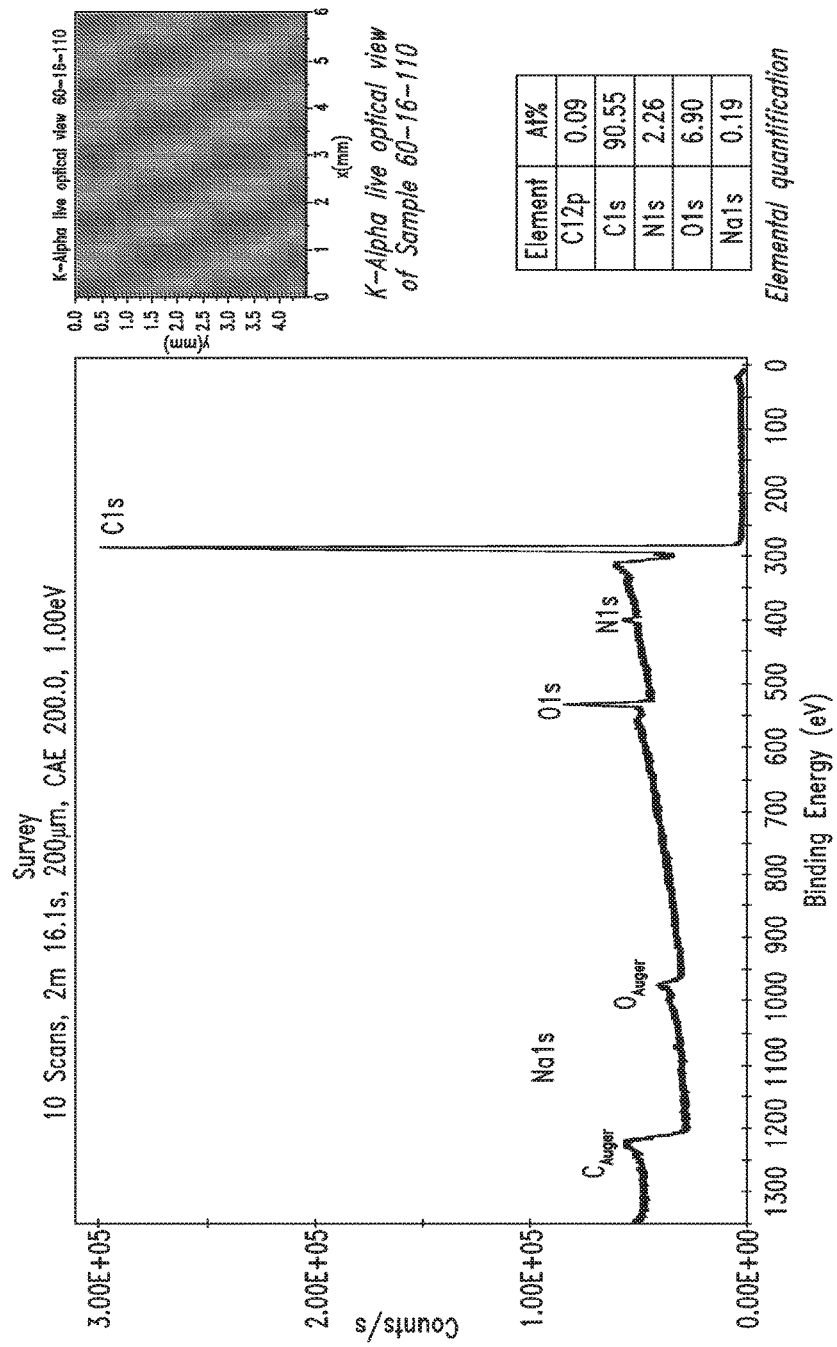
FIG. 20 is a graph of a wide angle XPS spectrum for an exemplary carbon material.
Figure 21:
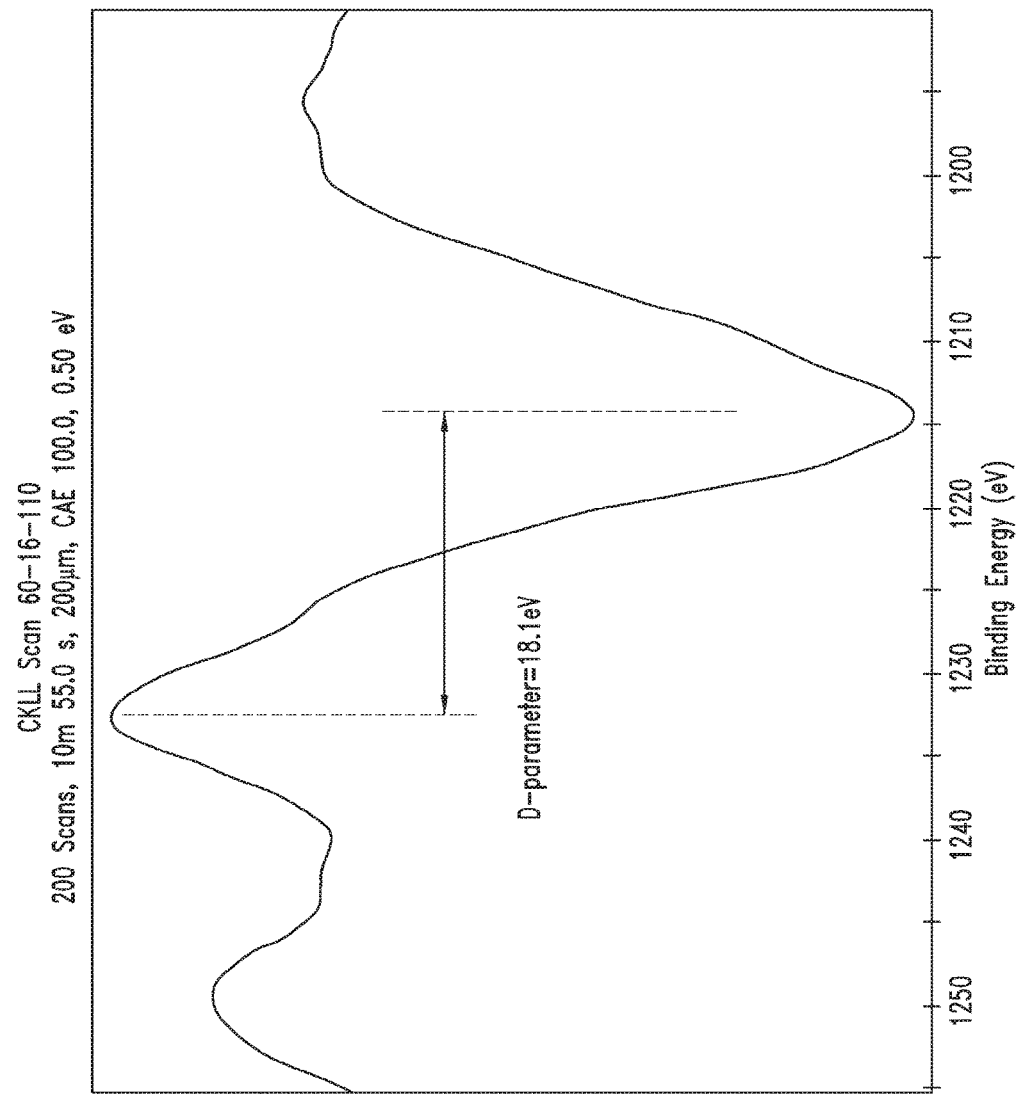
FIG. 21 presents an Auger scan using XPS methods for an exemplary carbon material having approximately 65% $sp^2$ hybridized carbons.

The elemental composition of the hard carbon may also be measured through XPS. FIG. 20 shows a wide angle XPS for an outstanding, unique carbon. The carbon has 2.26% nitrogen content, 90.55% carbon with 6.90% oxygen content. FIG. 21 uses Auger to indicate an sp2/sp3 hybridization percent concentration of 65%.

Figure 5:
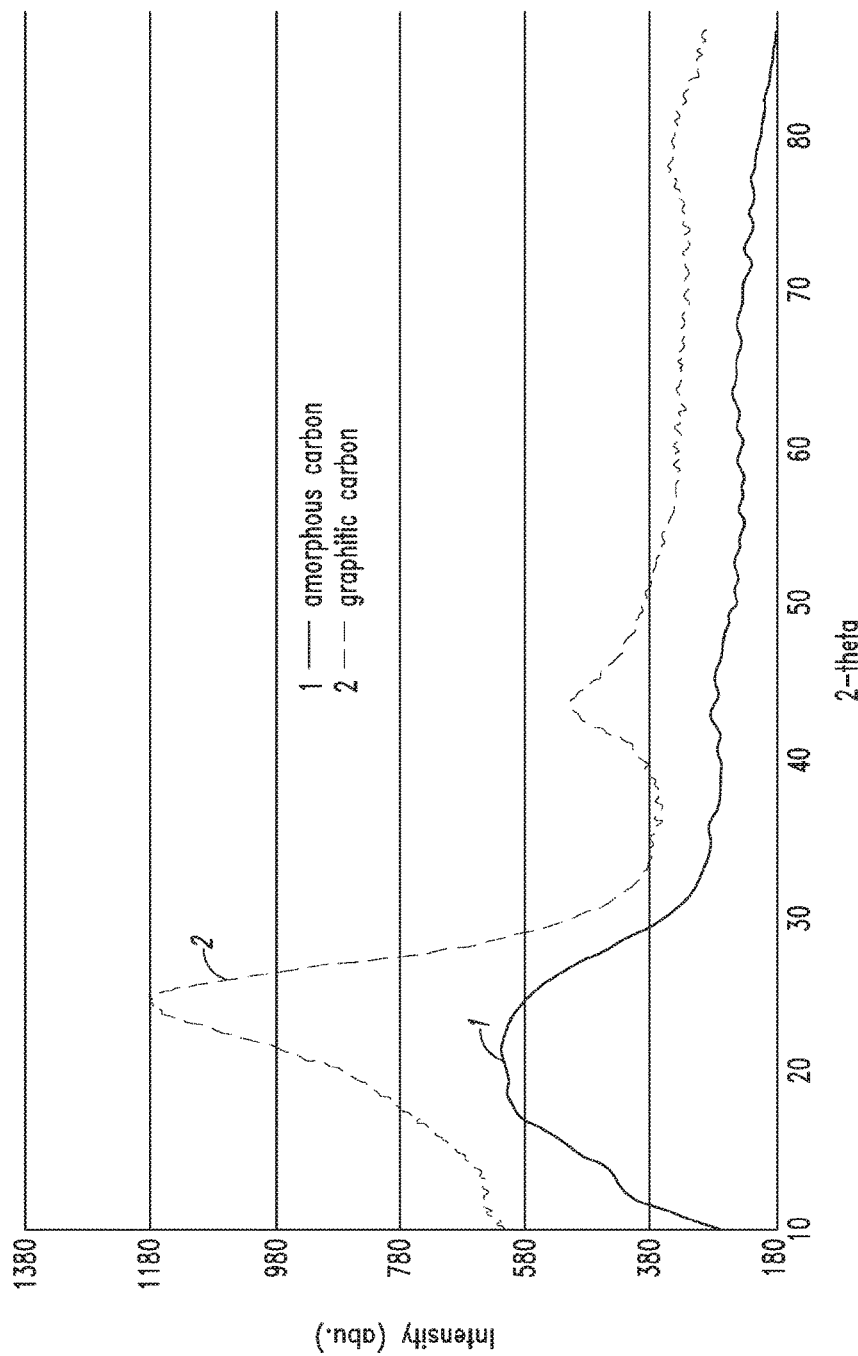
FIG. 5 is a plot of an x-ray diffraction pattern of exemplary carbon materials.

Exemplary carbon materials were also analyzed by X-ray diffraction (XRD) to determine the level of crystallinity (see FIG. 5). While Raman measures the size of the crystallites, XRD records the level of periodicity in the bulk structure through the scattering of incident X-rays. This invention include embodiments which are non-graphitic (crystallinity <10%) and semi-graphitic (crystallinity between 10 and 50%). In FIG. 5, the broad, dull peaks are synonymous with amorphous carbon, while sharper peaks indicate a higher level of crystal structure. Materials with both sharp and broad peaks are labeled as semi-graphitic. In addition to XRD, the bulk structure of the carbon materials is also characterized by hardness or Young's Elastic modulus.

For structural analysis, the carbon material may also be analyzed using Small Angle X-ray Diffraction (SAXS) (see FIGS. 6 and 7). Between 10° and 40°, the scattering angle is an indication of the number of stacked graphene sheets present within the bulk structure. For a single graphene sheet (N=1), the SAXS response is a simple negative sloping curve. For a double graphene stack (N=2), the SAXS is a single peak at ~22° with a baseline at 0°. Initial test of a carbon indicates a mixed-bulk structure of both single layer graphene sheets and double stacked graphene layers. The percentage of single-double layers can be calculated from an empirical value (R) that compares the intensities of the single (A) and double component (B). Since lithium is stored within the layers, the total reversible capacity can be optimized by tailoring the internal carbon structure. Example SAXS of exemplary carbons is depicted in FIG. 7. Notice that single, double, and even tri-layer features are present in some of the carbons.

Figure 22:
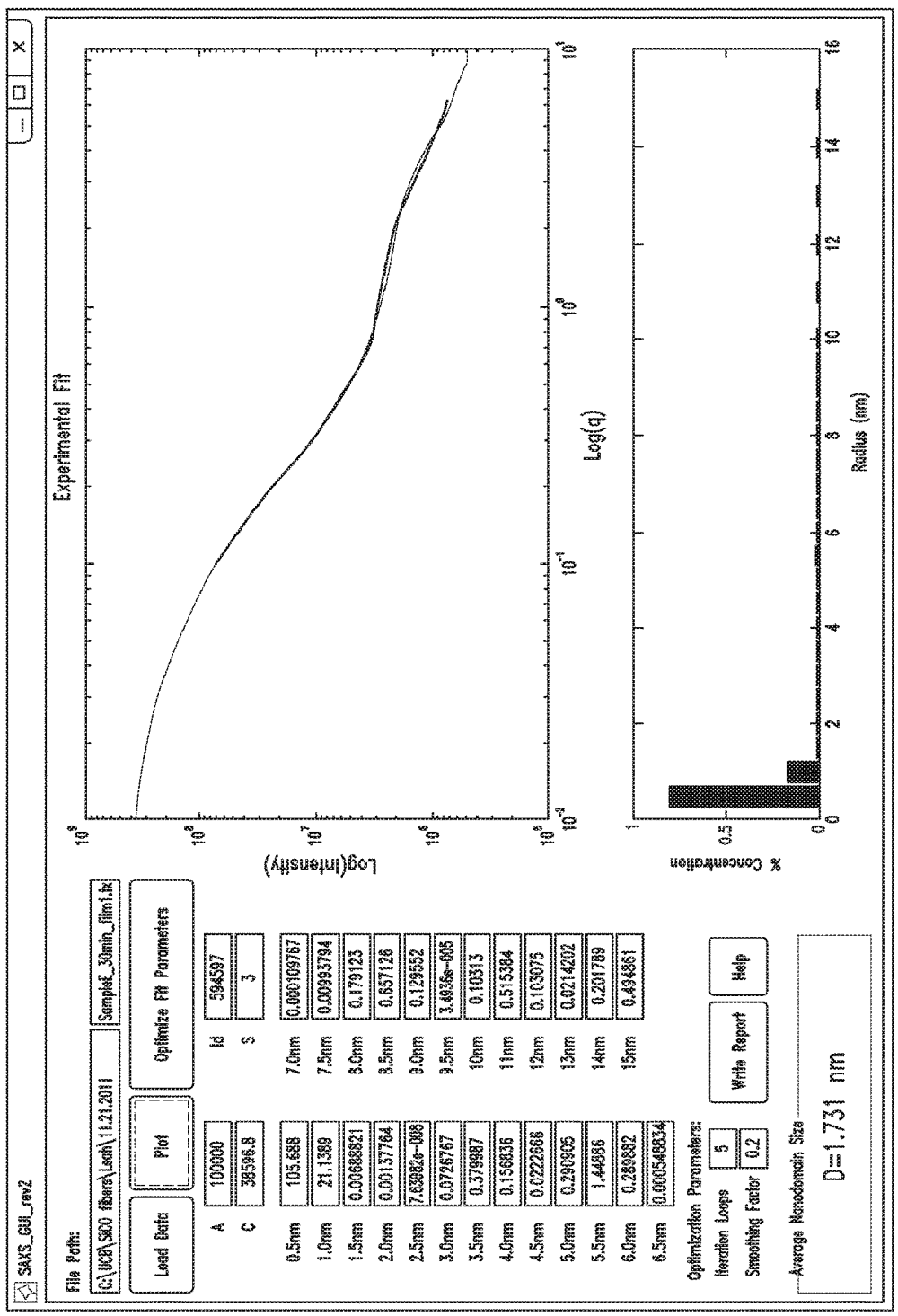
FIG. 22 depicts a SAXS measurement, internal pore analysis and domain size of exemplary hard carbon material FIG. 23 demonstrates the effect on pH as the pyrolysis temperature increases for a representative carbon material.

Not being bound by theory SAXS may also be used to measure the internal pore size distribution of the carbon. FIG. 22 shows the SAXS curve and the pore size distribution for pore smaller than 16 nm. In this example, the nitrogen containing carbon has between 0.5 and 1% of pores below 1 nm in radius.

Figures 8A, 8B:
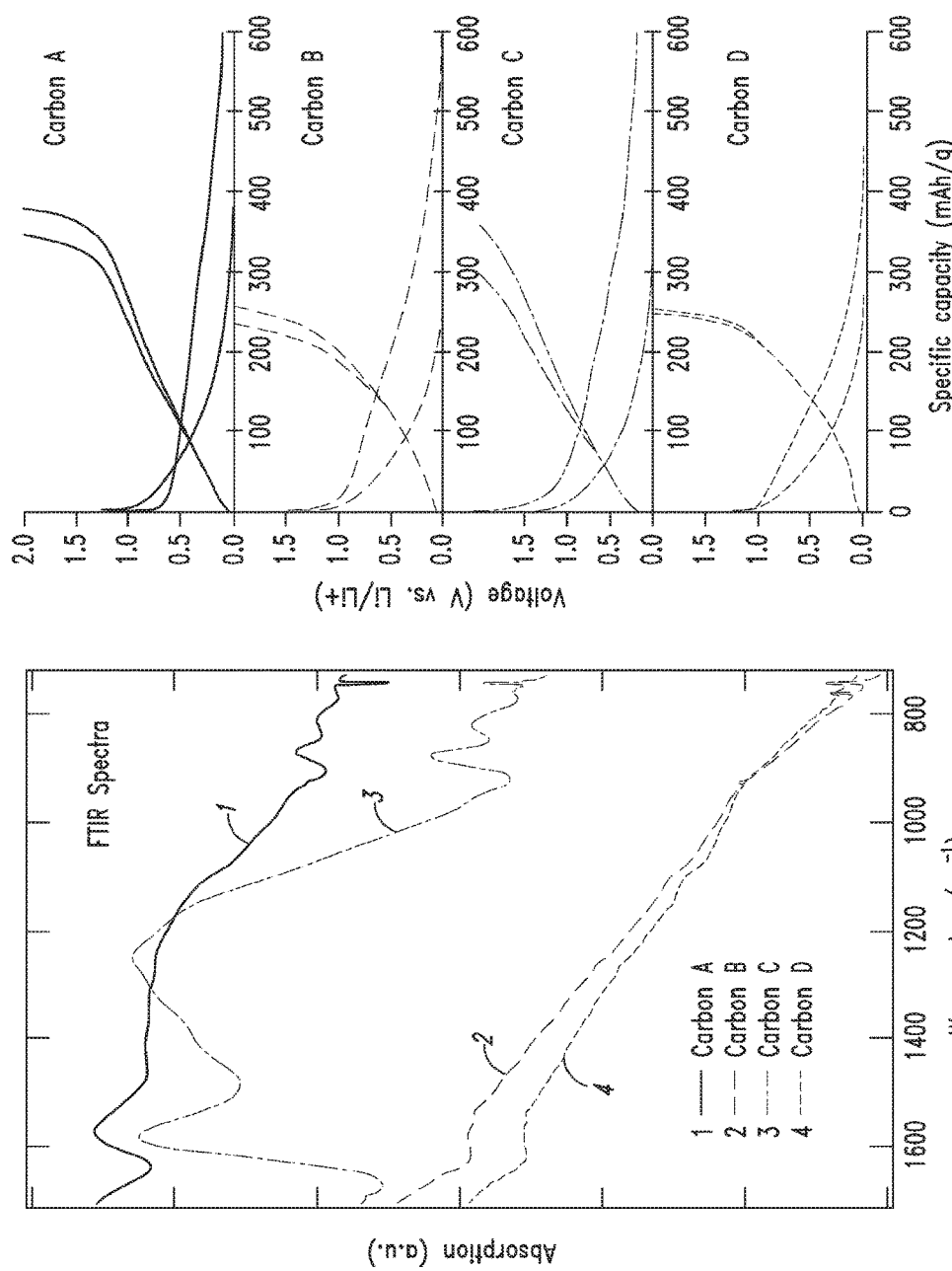
FIG. 8a presents FTIR spectra of exemplary carbon materials.
FIG. 8b shows electrochemical performance of exemplary carbon materials.

As discussed in more detail above, the surface chemistry (e.g., presence of organics on the carbon surface) is a parameter that is adjusted to optimize the carbon materials for use in the lithium-based energy storage devices. Infra-red spectroscopy (FTIR) can be used as a metric to determine both surface and bulk structures of the carbon materials when in the presence of organics. FIG. 8a depicts FTIR spectra of certain exemplary carbons of the present disclosure. In one embodiment, the FTIR is featureless and indicates a carbon structure void of organics (e.g., carbons B and D). In another embodiment, the FTIR depicts large hills and valleys relating to a high level of organic content (e.g., carbons A and C).

As shown in FIG. 8b, presence of organics may have a direct relationship on the electrochemical performance and response of the carbon material when incorporated into an electrode in a lithium bearing device for energy storage. Accordingly, in some embodiments the carbon material comprises organic functionality as determined by FTIR analysis. The samples with flat FTIR signals (no organics) display a low extraction peak in the voltage profile at 0.2 V. Well known to the art, the extract voltage is typical of lithium stripping. The lithium stripping plateau is absent in the two FTIR samples that display organic curves in FTIR.

Figure 23:
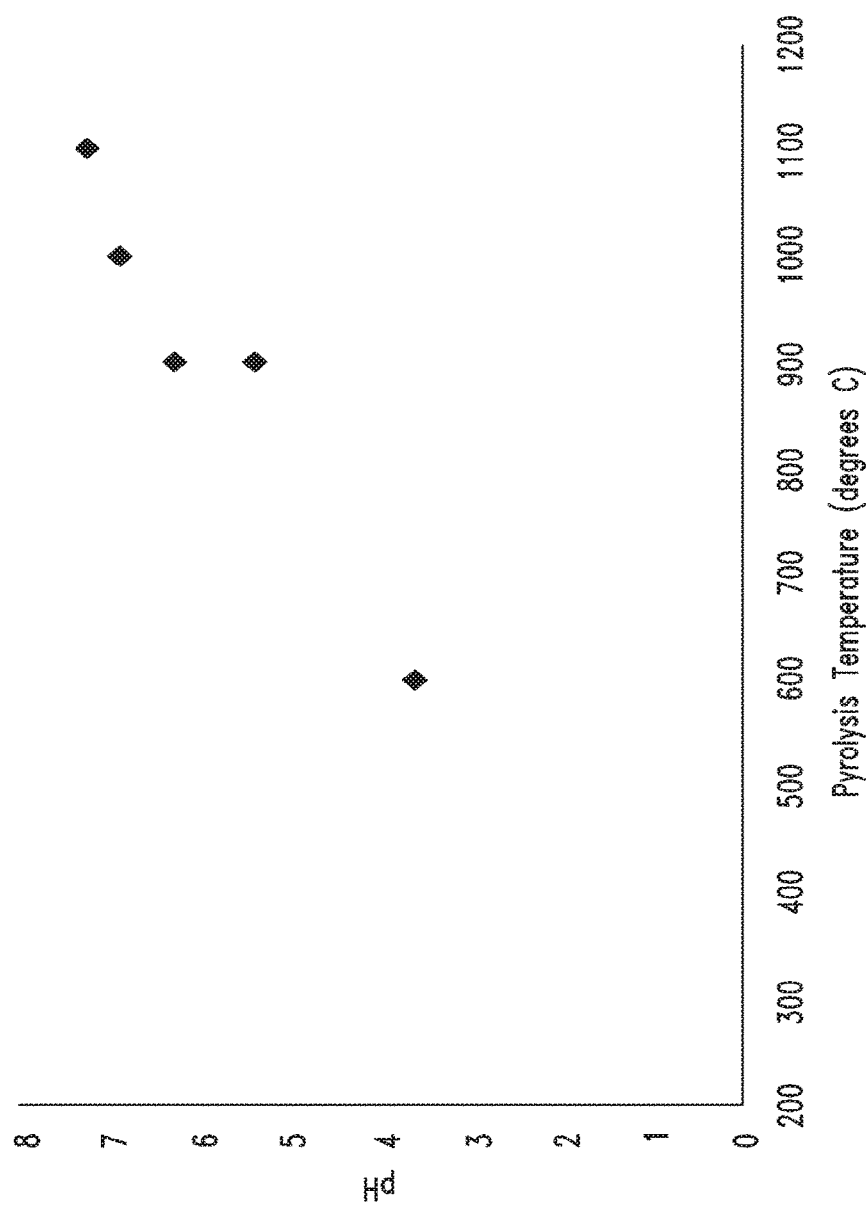

The pH of the carbon can also be controlled through the pyrolysis temperature. FIG. 23 shows pH as the pyrolysis temperature increases. Not being bound by theory, as the temperature of pyrolysis is increased, the surface functionality and the pH of the carbon will rise, becoming more basic. Tailoring the pH can be accomplished post-pyrolysis through heat treatment or an additional pyrolysis step.

Figure 24:
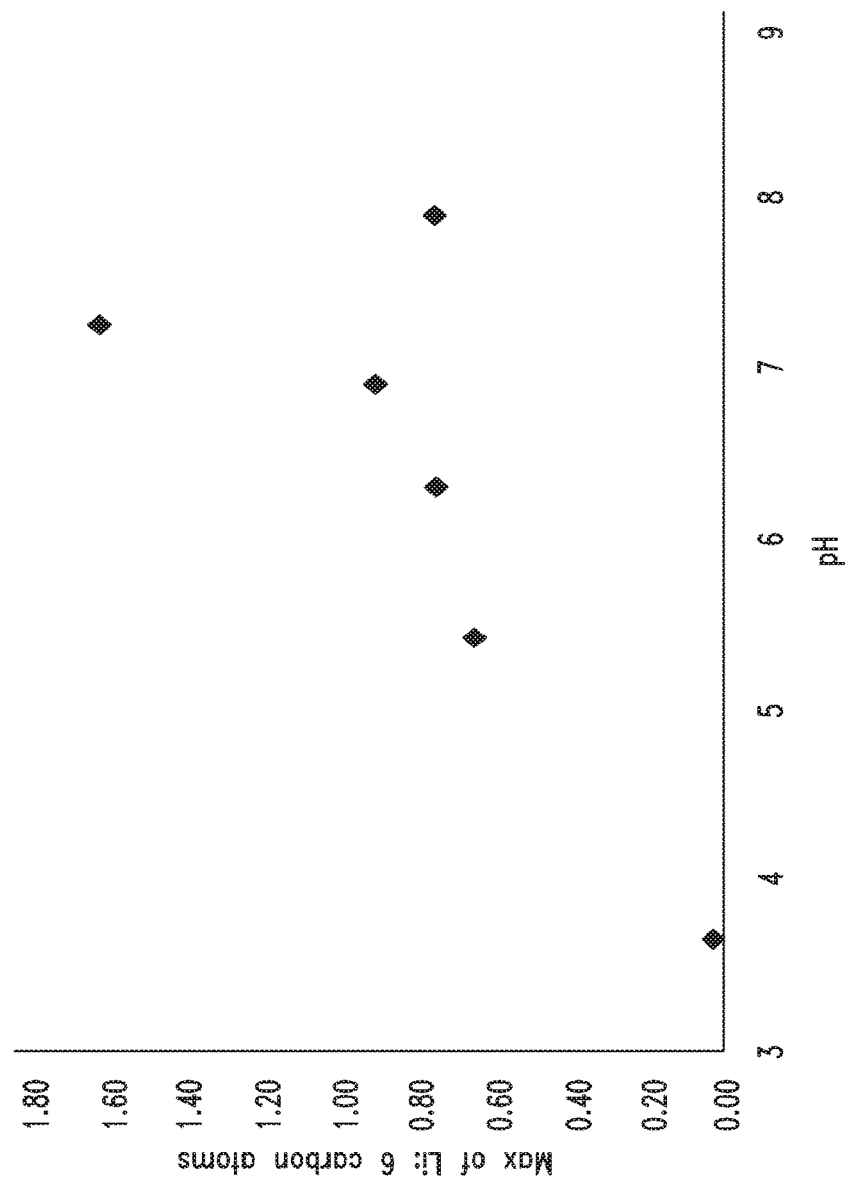
FIG. 24 shows Li:C ratio for an exemplary carbon material as a function of pH from 7 to 7.5.

The material may also be characterized as the Li:C ratio, wherein there is no metallic lithium present. FIG. 24 shows an unexpected result wherein the maximum ratio of Li:C possible without the presence of metallic lithium is greater than 1.6 for a carbon between the pH values of 7 and 7.5.

Figure 11:
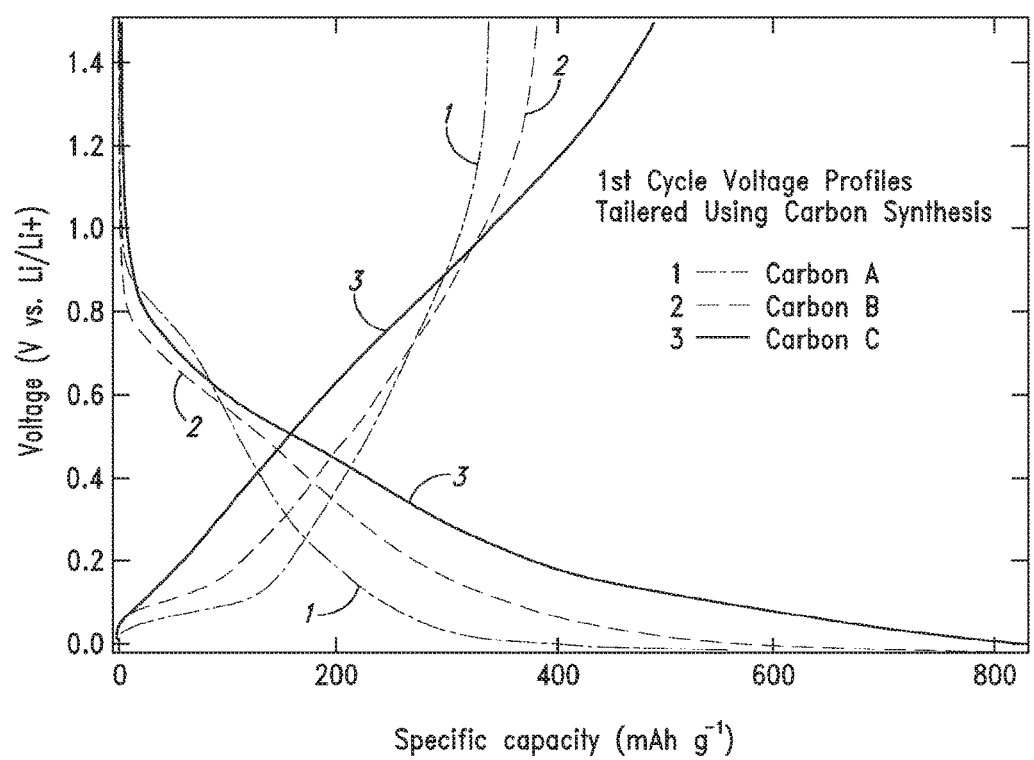
FIG. 11 presents first cycle voltage profiles of exemplary carbon materials.

FIG. 11 shows $1^{st}$ cycle voltage profiles for three exemplary carbons containing between 1.5% and 6% nitrogen, prepared as described above. As the data shows, the total capacity and operating voltage can be tailored to the desired application. Carbon A has been tuned to have lowest gravimetric capacity upon extraction, though it is superior of all of the carbons in energy density due to the plateau close to zero. Carbon B has a smaller plateau but a larger gravimetric capacity than A. Carbon C is advantageous for vehicular applications due to its sloping voltage profile. This sloping profile allows for easy gauging of the state-of-charge (SOC) of the battery, which is difficult with flat plateaus.

Figure 12:
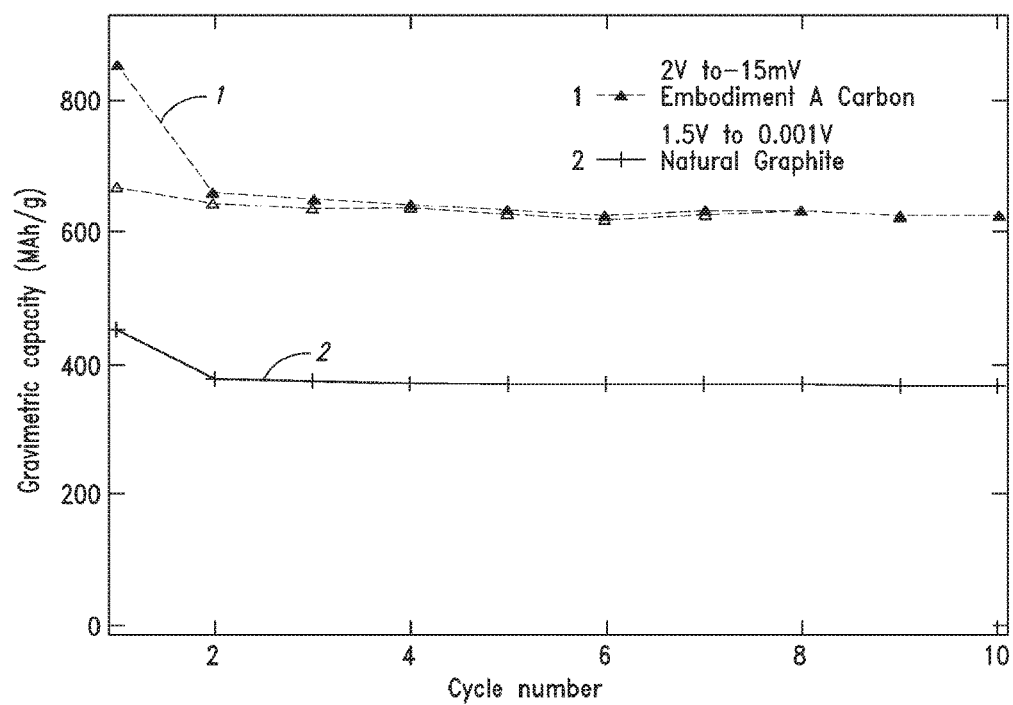
FIG. 12 is a graph showing the electrochemical stability of an exemplary carbon material compared to graphitic carbon.

FIG. 12 shows the gravimetric capacity of an exemplary embodiment compared to the theoretical maximum capacity of traditional commercial graphite versus lithium metal, thus demonstrating that the presently disclosed carbon materials represent an improvement over previously known materials. The solid points represent lithium insertion while the open points represent lithium extraction. The carbon is both ultra-pure with a low percentage of impurities as measured by PUCE and with 1.6% nitrogen content and where the maximum atomic Li:C ratio without the presence of metallic lithium is 1.65:6.

Figure 25:
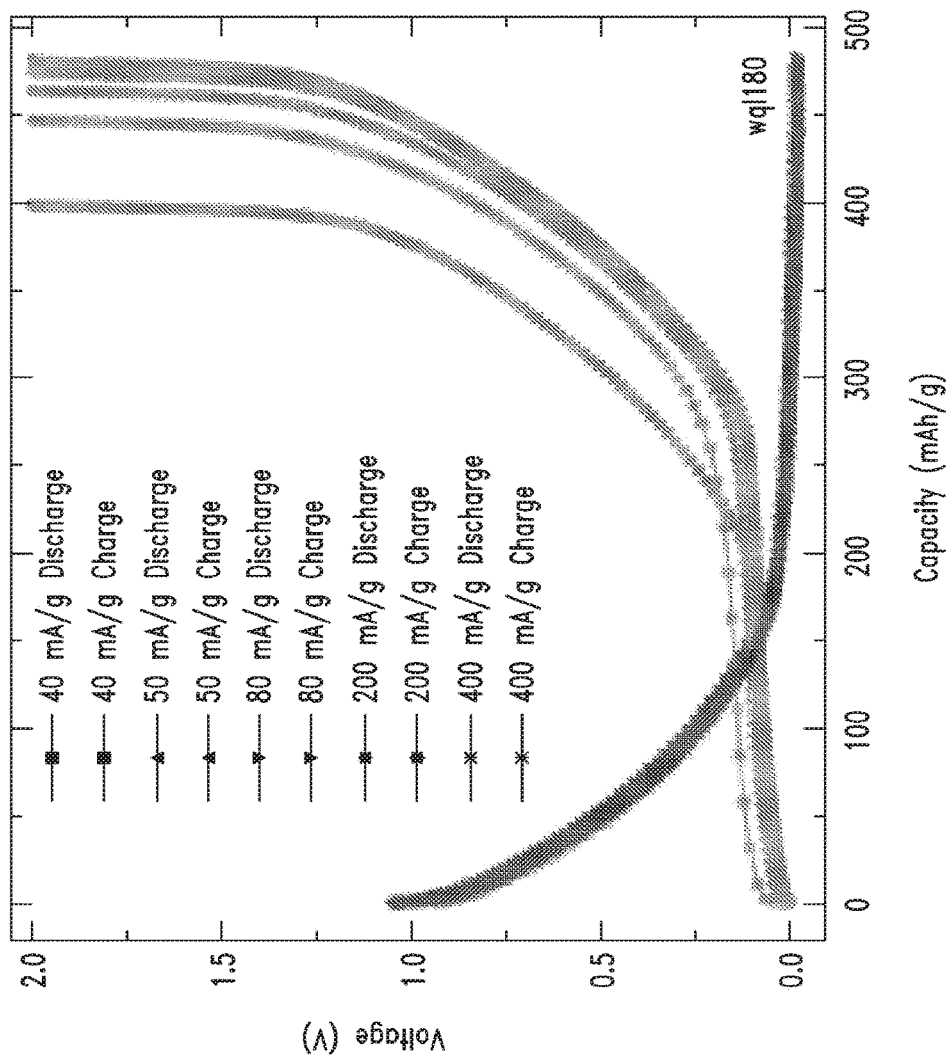
FIG. 25 presents the capacity of an exemplary, ultrapure hard carbon.
Figure 26:
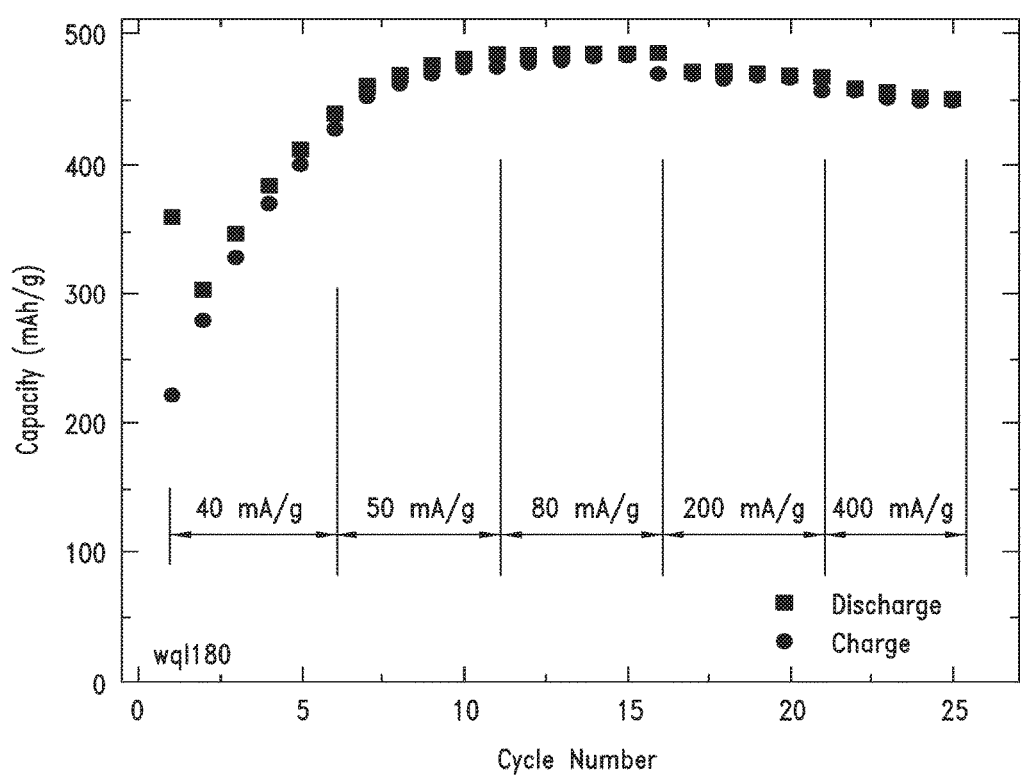
FIG. 26 is another graph showing the capacity of an exemplary, ultrapure hard carbon.

FIGS. 25 and 26 shows the capacity of an exemplary, ultrapure hard carbon as measured by a third party laboratory. The material shows excellent efficiency, capacity and rate capability. The material can be described as having 1.6% nitrogen content and where the maximum atomic Li:C ratio without the presence of metallic lithium is 1.65:6.

Example 8

Incorporation of Electrochemical Modifiers into Carbon Materials

Figure 13:
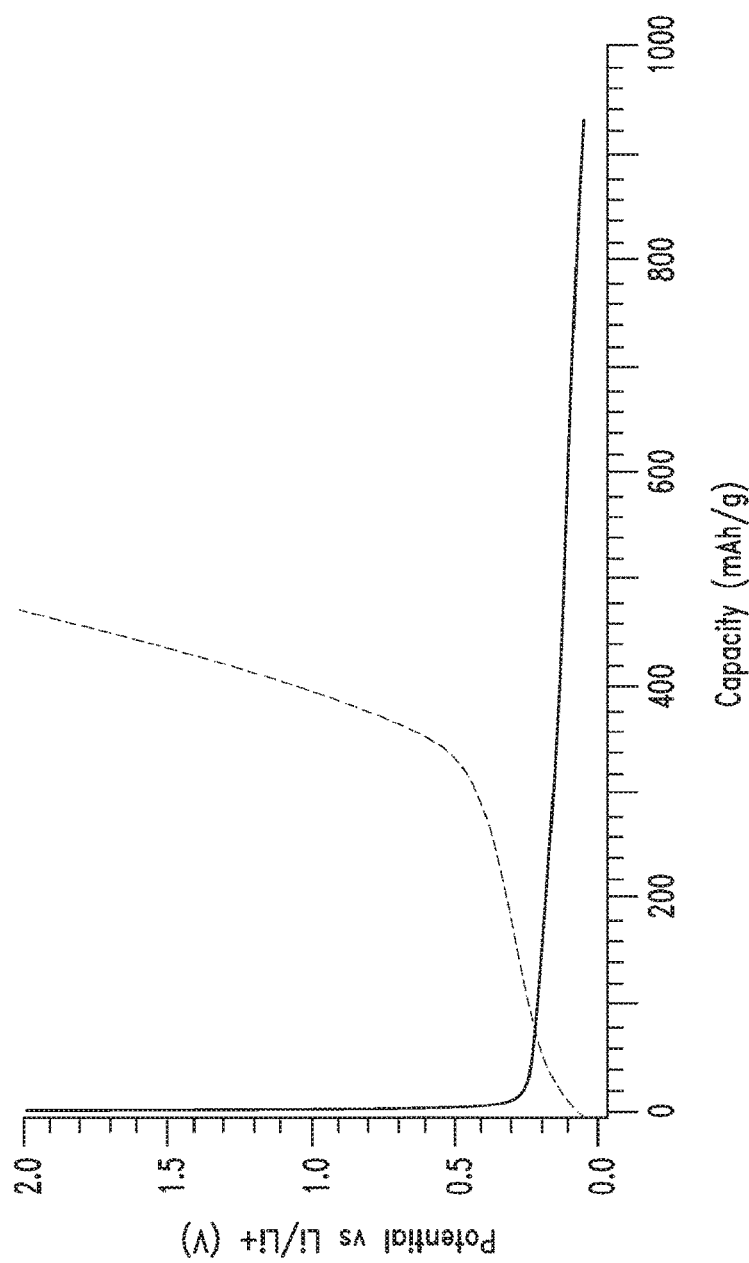
FIG. 13 shows voltage versus specific capacity data for a silicon-carbon composite material.
Figure 14:
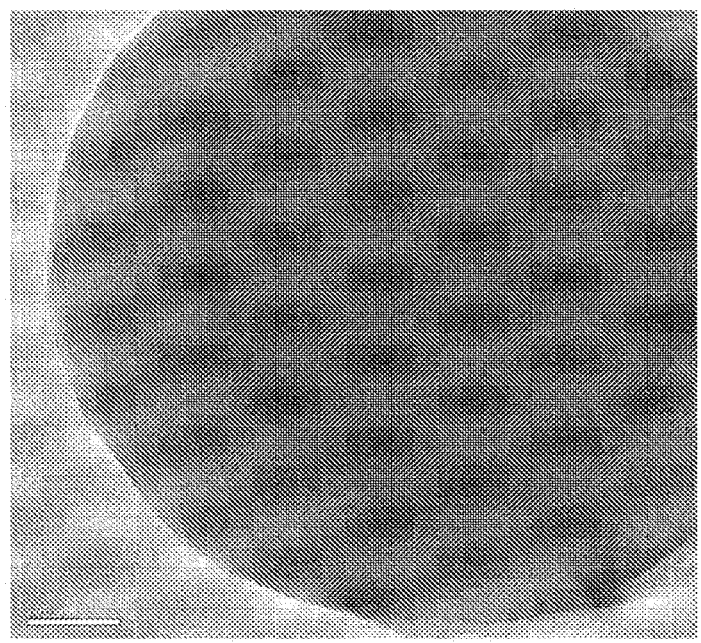
FIG. 14 shows a TEM of a silicon particle embedded into a hard carbon particle

Silicon was incorporated into the carbon structure by mixing silicon powder directly with the gel prior to polymerization. After pyrolysis, the silicon was found to be encased in carbon matrix. The silicon powder may be nano-sized (<1 micron) or micron-sized (between 1 and 100 microns). In an alternative embodiment, the silicon-carbon composite was prepared by mechanically mixing for 10 minutes in a mortar and pestle, 1:1 by weight micronized silicon (−325 mesh) powder and micronized microporous non-activated carbon. For electrochemical testing the silicon-carbon powder was mixed into a slurry with the composition 80:10:10 (silicon-carbon:conductivity enhancer (carbon black):binder (polyvinylidene fluoride)) in n-methyl pyrrolidone solvent then coated onto a copper current collector. Other embodiments may utilize nano (<100 nm) silicon powder. FIG. 13 depicts the voltage vs. specific capacity (mass relative to silicon) for this silicon-carbon composite. FIG. 14 shows a TEM of a silicon particle embedded into a hard carbon particle.

Figure 15:
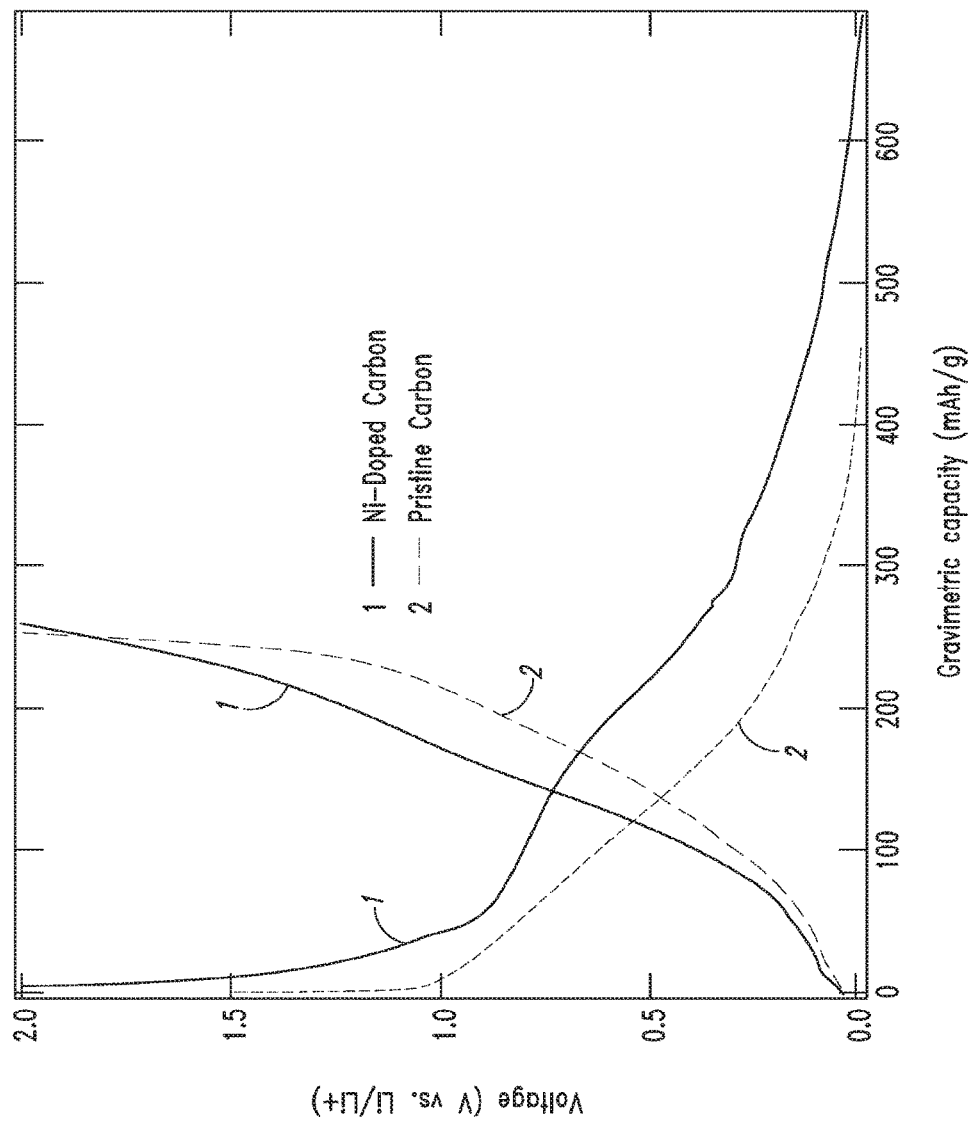
FIG. 15 depicts electrochemical performance of hard carbon materials comprising an electrochemical modifier.

A resorcinol-formaldehyde-iron composite gel was prepared by combining resorcinol, 37 wt % formaldehyde solution, methanol, and iron acetate in the weight ratio 31:46:19:4 until all components were dissolved. The mixture was kept at 45° C. for 24 hours until polymerization was complete. The gel was crushed and pyrolyzed at 650° C. for 1 hr in flowing nitrogen gas. Iron or manganese containing carbon materials are prepared in an analogous manner by use of nickel acetate or manganese acetate, respectively, instead of iron. Different pyrolysis temperatures (e.g., 900° C., 1000° C., etc.) may also be used. Table 6 summarizes physical properties of metal doped carbon composites as determined by BET/porosimetry nitrogen physisorption. FIG. 15 shows the modification to the electrochemical voltage profile with the addition of Ni-doping. Notice that both the shape of the voltage profile and the capacity can be tailored depending on the dopant, the quantity, and the processing conditions.

TABLE 6

Physical properties of Metal-Doped composite based on data obtained by BET/porosimetry nitrogen physisorption.

| BET surface area ($m^2/g$) | Pore Volume ($cm^3/g$) | Average Pore Size (angstroms) |
|---|---|---|
| 439 | 0.323 | 29 |

Example 9

Incorporation of Electrochemical Modifier During Polymerization of Polymer Gel

A resorcinol-formaldehyde gel mixture is prepared in a manner analogous to that described in Example 1. About 20 mL of polymer solution is obtained (prior to placing solution at elevated temperature and generating the polymer gel). To this solution, about 5 mL of a saturated solution containing a salt of an electrochemical modifier is added. The solution is then stored at 45° C. for about 5 h, followed by 24 h at 85° C. to fully induce the formation of a polymer gel containing the electrochemical modifier. This gel is disrupted to create particles, and the particles are frozen in liquid nitrogen.

The resulting wet polymer gel is then pyrolyzed by heating from room temperature to 850° C. under nitrogen gas at a ramp rate of 20° C. per min to obtain a hard carbon containing the electrochemical modifier.

Example 10

Figure 16:
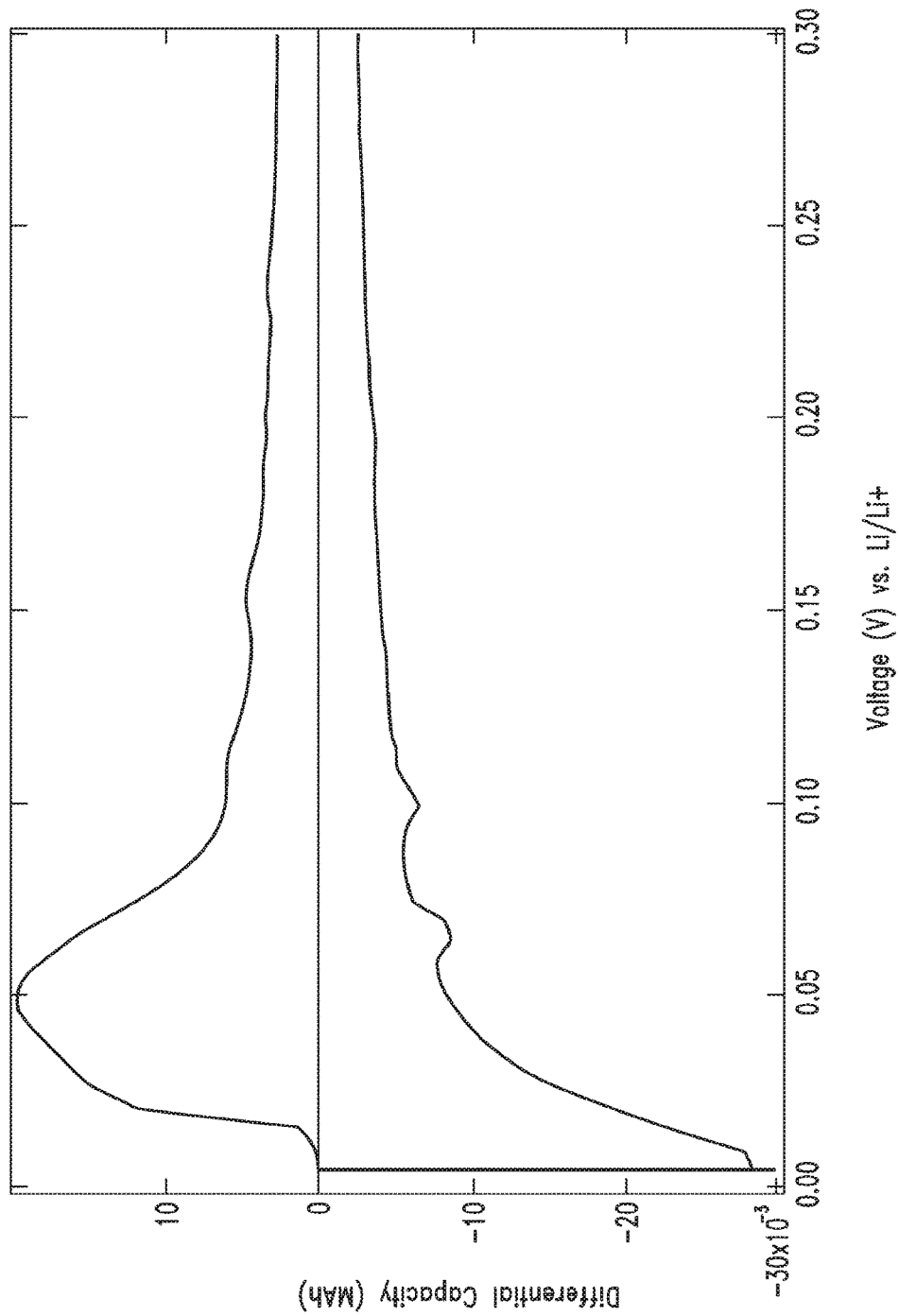
FIG. 16 shows electrochemical performance of hard carbon materials comprising graphite.
Figure 17:
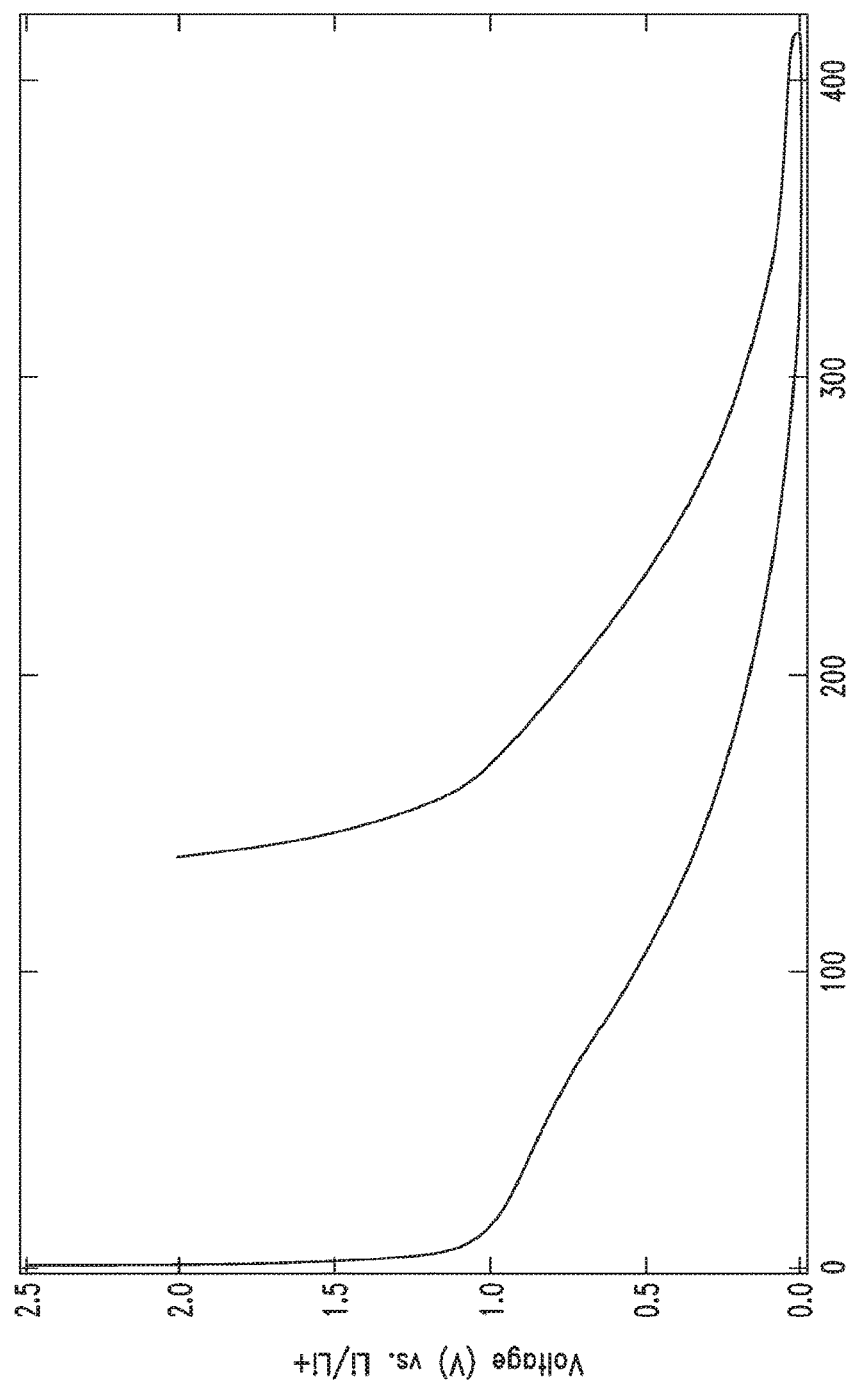
FIG. 17 is a graph showing electrochemical performance of hard carbon materials comprising graphite.

Incorporation of Alternate Phase Carbon During Polymerization of Polymer Gel A resorcinol-formaldehyde gel was prepared as in Example 1 but during the solution phase (before addition of formaldehyde) graphite powder (99:1 w/w resorcinol/graphite) was added while stirring. The solution was continually stirred until gellation occurred at which point the resin was allowed to cure at 85° C. for 24 hours followed by pyrolysis (10° C./min ramp rate) at 1100° C. for 1 hour in flowing nitrogen. The electrochemical performance typical of this material is seen in FIGS. 16 and 17. This material is extremely unique as it shows both hard carbon and graphite phases during lithiation and delithiation.

Example 11

Optimal Voltage Window for Hard Carbon Performance

The material from Example 3 is tested in lithium ion battery half-cells as previously described. The anode electrode of an 88:2:10 composition (hard carbon:conductive additive:PVDF polymer binder) on 18 micron thick copper foil. The laminate thickness is 40 microns after calendaring.

Figure 18:
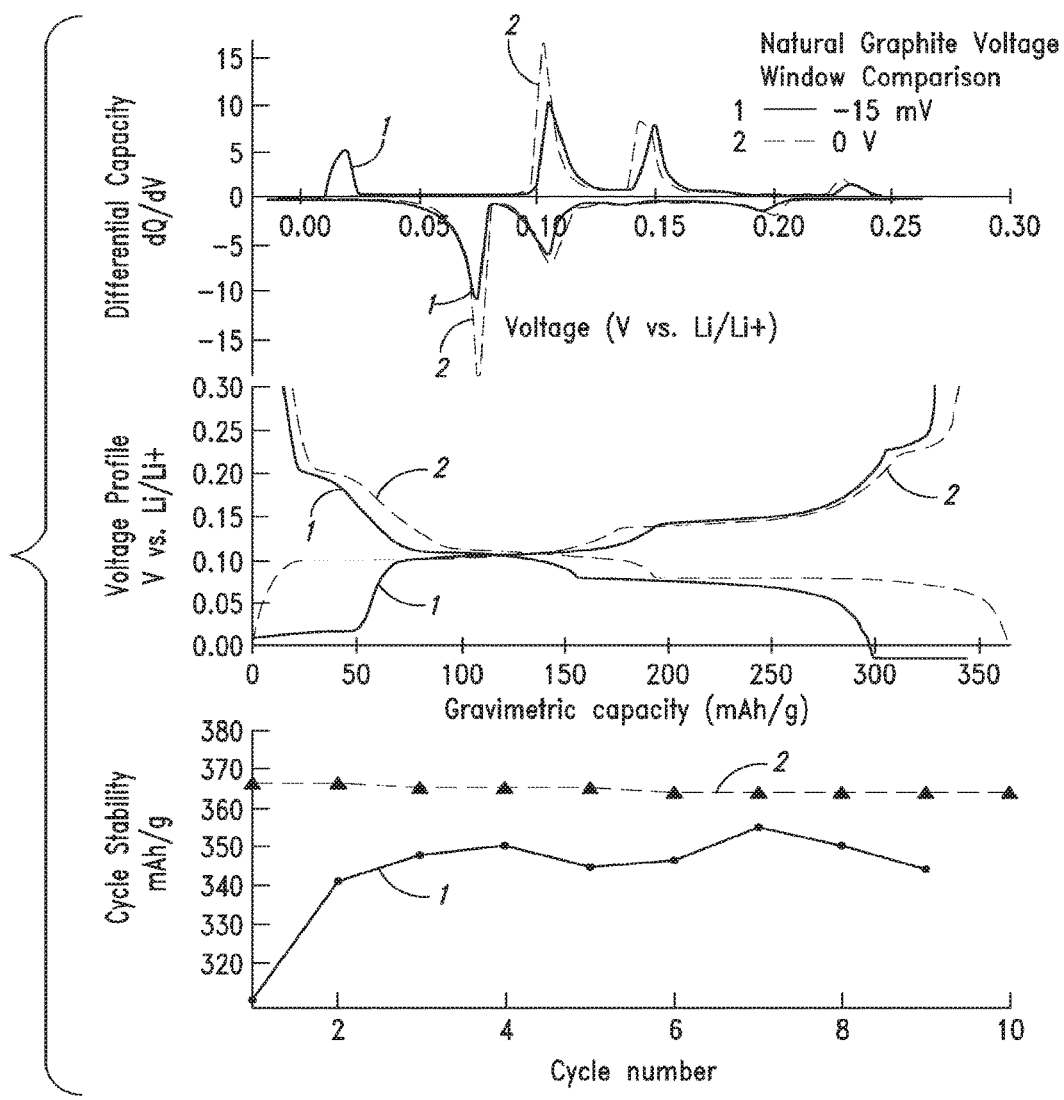
FIG. 18 presents the differential capacity, the voltage profile and the stability of graphitic materials cycled at different voltage profiles.

Cells are tested at 40 mA/g relative to the mass of hard carbon active material using a symmetric charge and discharge galvanostatic profile, with a 2-hour low voltage hold. One voltage window is set between 2.0V and 5 mV versus Li/Li+. A second voltage window is set between 2.0V and −15 mV versus Li/Li+. For comparison, identical cells were assembled using a graphite electrode. FIG. 18 compares the performance of the two cells using different lower voltage cut-offs for graphite. It is well known that graphite performs poorly when cycled below zero volts due to lithium plating and irreversible capacity. Notice that the capacity of graphite with a 0 V cut-off window displays stable cycling. However, when the voltage window is widened to −15 mV, the reversible capacity is actually lower and unstable.

Figure 19:
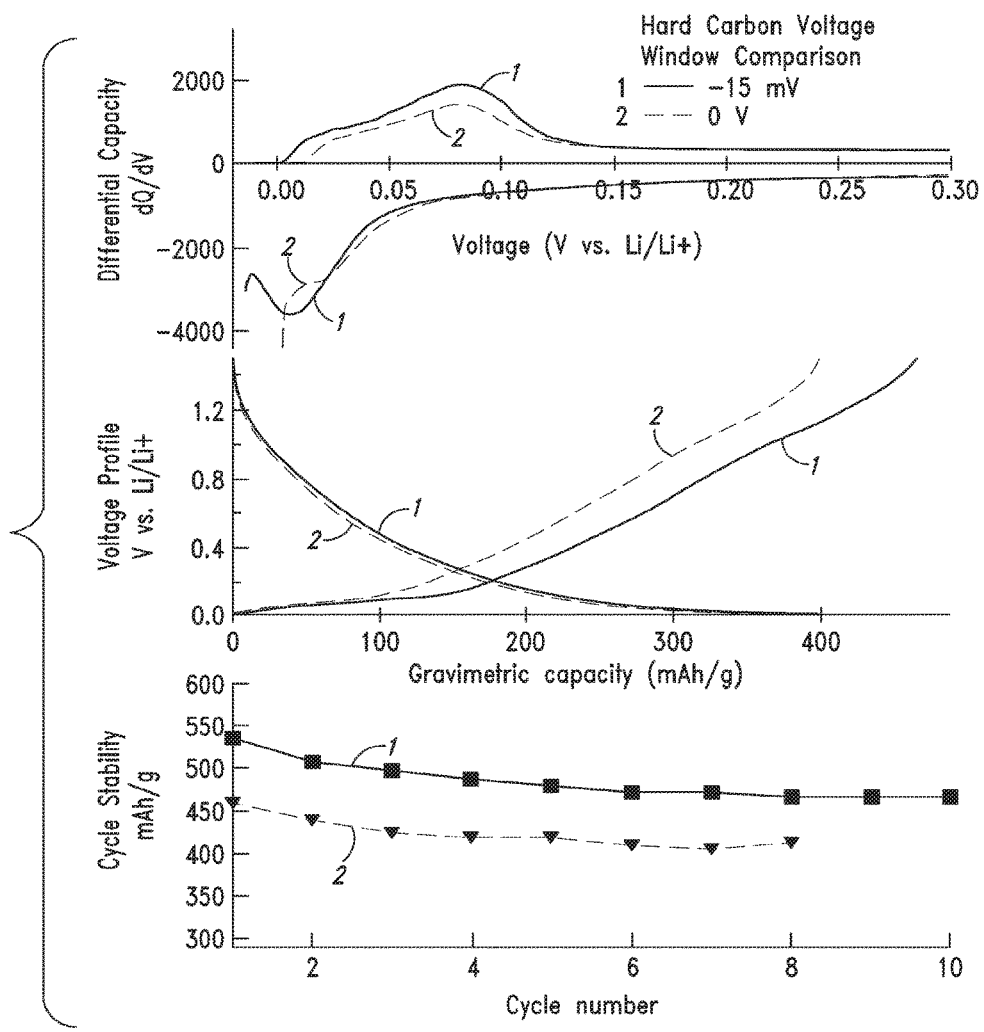
FIG. 19 presents the differential capacity, the voltage profile and the stability of hard carbon materials cycled at different voltage profiles.

FIG. 19 compares the performance of the hard carbon two cells using different lower voltage cut-offs for graphite. Both the differential capacities and the voltage profiles show that the insertion mechanism for lithium is identical for both voltage windows. The cycling stability plot indicates that a negative voltage cut-off provides a 25% increase in capacity with no stability losses. This is drastically different than the graphite, where the capacity was lower and unstable. It is clear that hard carbons do not undergo the same detrimental lithium plating as in graphite. This may be due to the change in overpotential for lithium plating, associated with the insertion of lithium into the pores of the hard carbon anode material.

Example 12

Purity Analysis of Ultrapure Synthetic Carbon

The ultrapure synthetic activated carbon samples were examined for their impurity content via proton induced x-ray emission (PIXE). PIXE is an industry standard, high sensitive and accurate measurement for simultaneous elemental analysis by excitation of the atoms in a sample to produce characteristic X-rays which are detected and their intensities identified and quantitated. PIXE capable of detection of all elements with atomic numbers ranging from 11 to 92 (i.e., from sodium to uranium).

As seen in Table 7, the ultrapure synthetic activated carbons according to the instant disclosure have a lower PIXE impurity content and lower ask content as compared to other known carbon samples.

TABLE 7

Purity Analysis of Ultrapure Synthetic Activated Carbon & Comparison Carbons

| Imp. | Impurity (Imp.) Concentration (PPM) | | | | | | |
|---|---|---|---|---|---|---|---|
| | Sample 1 | Sample 2 | Sample 3 | Sample 4 | Sample 5 | Sample 6 | Sample 7 |
| Na | ND* | ND | ND | ND | ND | 353.100 | ND |
| Mg | ND | ND | ND | ND | ND | 139.000 | ND |
| Al | ND | ND | ND | ND | ND | 63.850 | 38.941 |
| Si | 53.840 | 92.346 | 25.892 | 17.939 | 23.602 | 34.670 | 513.517 |
| P | ND | ND | ND | ND | ND | ND | 59.852 |
| S | ND | ND | ND | ND | ND | 90.110 | 113.504 |
| Cl | ND | ND | ND | ND | ND | 28.230 | 9.126 |
| K | ND | ND | ND | ND | ND | 44.210 | 76.953 |
| Ca | 21.090 | 16.971 | 6.141 | 9.299 | 5.504 | ND | 119.804 |
| Cr | ND | ND | ND | ND | ND | 4.310 | 3.744 |
| Mn | ND | ND | ND | ND | ND | ND | 7.552 |
| Fe | 7.582 | 5.360 | 1.898 | 2.642 | 1.392 | 3.115 | 59.212 |
| Ni | 4.011 | 3.389 | 0.565 | ND | ND | 36.620 | 2.831 |
| Cu | 16.270 | 15.951 | ND | ND | ND | 7.927 | 17.011 |
| Zn | 1.397 | 0.680 | 1.180 | 1.130 | 0.942 | ND | 2.151 |
| Total (% Ash) | 104.190 (0.018) | 134.697 (0.025) | 35.676 (<0.007) | 31.010 (0.006) | 31.44 (0.006) | 805.142 (0.13) | 1024.198 (0.16) |

*ND = not detected by PIXE analysis

Example 13

Incorporation of Silicon Using Polymer Precursors

Silicon-oxide is incorporated into the carbon through the Si-containing precursors added to the gel phase. A stock solution of RF is synthesized in using resorcinol, water and formaldehyde with 35% solids and a ratio of 1:2 R:F. In a separate beaker, a 35% solids tetraethylorthosilane (TEOS)

stock solution is mixed using ethanol as a solvent in a ratio of 1:3 R:TEOS. The TEOS stock solution is slowly added to the RF stock solution and stirred 40° C. until a gel is formed. The sample is sealed and heated at 70° C. After curing, the resulting gel is pyrolyzed at 600° C. for 1 hr under nitrogen flow to yield the resulting $SiO_x/C$ composite. Additionally, the $SiO_x/C$ composite can be further activated to increase porosity and accessibility to the Si. To activate, the $SiO_x/C$ sample was heated to 950° C. at 20° C./min at which point the gas is switched to $CO_2$ and held for 1.5 hours then cooled to room temperature under nitrogen.

Example 14

Incorporation of Silicon Powder to Polymer Gel

Silicon powder can be added prior to polymerization of the resin. The amounts of reagents can be tailored based on the desired ratio of carbon to silicon powder in the final product. An RF resin was synthesized using resorcinol, water, formaldehyde and acetic acid with 35% solids and a ratio of 1:2 R:F and 25:1 R:AA. Once the solids were fully dissolved, silicon powder was slowly added to achieve a 1:1 weight ratio carbon/silicon after pyrolysis. The silicon was further dispersed through high-energy sonication. Finally, the solution was heated to 85° C. until polymerization occurs. The resulting silicon-RF gel was then crushed and pyrolyzed under nitrogen flow at 600° C. to yield Si/C composite. Alternatively, the gel can be freeze dried so as to retain the pore structure to benefit the silicon expansion upon lithiation. The silicon powder can be in a variety of forms including, but not limited to, particles, wires, whiskers and rods. The size can range from 1 nanometer to 1 mm.

Example 15

Encapsulation of Silicon Powder in Polymer Gel by Emulsion/Suspension

Silicon can be incorporated into RF sol through emulsion to fully encapsulate the silicon powder. A 200:1 v/v solution of cyclohexane and SPAN80 surfactant is prepared. The silicon-RF sol was prepared from example 2 through high energy sonication. The solution was added to the surfactant solution and allowed to fully polymerize at 45° C. Once the gel fully polymerized, the gel particles were removed using filter paper and pyrolyzed as in example 2 to yield Si/C composite. Alternatively, the gel precursor can be prepared as a suspension in which the cyclohexane is substituted for mineral oil and no surfactant is added. The mineral oil is heated to 85° C. while stirring then the silicon-sol from example 2 is added and allowed to polymerize (~4 hrs).

Example 16

Surface Passivation of Si—C Nanocomposite

Silicon-C nanocomposite was placed in an alumina crucible and heated in a tube furnace under nitrogen flow to 800° C. The nitrogen flow was diverted through a flask containing liquid cyclohexane. The organic cyclohexane vapor was carried for 1 hour into the hot zone of the furnace and carbonized on the surface of the silicon particles leaving behind a soft carbon coating. Alternatively the organic species used can be any non-oxygen bearing compound (e.g., ethylene, toluene, propane, benzene, etc.). In another embodiment, the peak temperature can be reduced or increased to allow a longer or shorter vapor phase lifetime for the organic species, respectively. In another embodiment, the dwell time at peak temperature can be reduced or increased to yield a thinner or thicker carbon coating, respectively.

Example 17

Si—C Nanocomposite Synthesis by High-Energy Mechanical Grinding

Silicon powder and carbon powder were ground together using a Fritchmill for 15 minutes to yield a Si/C composite. The average particle size of the silicon powder ranges from 10 nm-50 um while the carbon powder particle size ranges from 1 um-50 um. The weight ratios of silicon-carbon range from 1:4-5:1. The silicon can be in a crystalline or amorphous phase while the carbon is in an amorphous phase. Alternatively the resulting Si/C composite can be CVD coated as in example 4 so as to better bind contact between the silicon and carbon.

Example 18

Si—C Nanocomposite Synthesis by Carbothermal Reduction

The SiOx/C composite from Example 1 was heated under nitrogen to 1900° C. and held for 1 hour or until the desired ratio of Si:C is achieved, then cooled to room temperature. Additional carbon can be mechanically mixed prior to reduction. Alternatively, the reaction can be carried out under hydrogen gas or in vacuum so as to better facilitate the reduction process and minimize side reactions.

Example 19

Nanocomposite Synthesis by Calciothermal Reduction

The $SiO_x/C$ composite in Example 1 was added to Ca powder in a molar ratio of 1:1.9 $SiO_x$:Ca and mixed until homogenous. The powder was poured into alumina crucible and place into tube furnace. The crucible was covered, but not sealed from gas, and heated to 720° C. at a ramp of 20° C./min under nitrogen flow and held for 1 hour. The resulting Si/C composite can be further washed with nitric acid to remove excess calcium compounds.

Example 20

Si—C Nanocomposite Synthesis by Magnesiothermal Reduction

The $SiO_x/C$ composite in Example 1 was added to Mg powder in a molar ratio of 1:1.9 $SiO_x$:Mg and mixed until homogenous. The powder was poured into alumina crucible and place into tube furnace. The crucible was covered, but not sealed from gas, and heated to 720° C. at a ramp of 20° C./min under nitrogen flow and held for 1 hour. The resulting Si/C composite can be further washed with nitric acid to remove excess magnesium compounds.

Example 21

Si—C Nanocomposite Synthesis by Electrochemical Reduction

The granular SiOx/C material from Example 1 was placed in a non-reactive metal crucible (e.g., steel, nickel, Inconel).

The container was filled with calcium chloride powder and the entire container was positioned in the center of a vertical tube furnace. An Inconel wire was connected to the metal crucible and extended outside the furnace (anode terminal). A graphite rod (cathode terminal) connected to a steel rod was positioned in contact with the calcium chloride powder in the hot zone of the furnace. The furnace was sealed and continuously purged with nitrogen gas then ramped up to 850° C. and held at which point the calcium chloride became molten. After ~30 minutes at peak temperature a constant voltage of 2.8V was applied to the terminals using a DC power supply. The current was monitored over time and the reaction was complete when the current no longer decreased. After cooling, the resulting Si/C sample was removed from the furnace and rinsed in distilled water to remove calcium compounds. Alternatively, the analogous reaction can be carried out in a room temperature ionic liquid in place of the molten calcium chloride.

Example 22

Monolith Preparation of Polymer Gel with Hardening Agent

Polymer resins were prepared using the following general procedure. A Poly[(phenol glycidyl ether)-(co-formaldehyde)] with 340-570 repeating molecular units was dissolved in acetone (50:50). Phthalic Anhydride (25:75) was added to the solution and shaken until dissolved. 85% (wt/wt) Phosphoric Acid in water was then added to the solution and shaken. The reaction solution was placed at elevated temperature (55° C. for about 12 hr followed by curing at 120° C. for 6 hr) to allow for the resin to crosslink.

Example 23

Monolith Preparation of Polymer Gel without Hardening Agent

Polymer resins were prepared using the following general procedure. A Poly[(phenol glycidyl ether)-(co-formaldehyde)] with 340-570 repeating molecular units was dissolved in acetone (50:50). 85% (wt/wt) Phosphoric Acid in water was then added to the solution and shaken. The reaction solution was placed at elevated temperature (55° C. for about 12 hr followed by curing at 120° C. for 6 hr) to allow for the resin to crosslink.

Example 24

Solvent-Less Preparation of Polymer Gel with Hardening Agent

Polymer resins were prepared using the following general procedure. A Poly[(phenol glycidyl ether)-(co-formaldehyde)] with 340-570 repeating molecular units was heated to elevated temperature (85° C. unless otherwise stated) and mixed continuously. Phthalic Anhydride (25:75) was added to the viscous liquid epoxy and mixed until dissolved. 85% (wt/wt) Phosphoric Acid in water was then added to the liquid solution and mixed until solid. The solid resin product was placed at elevated temperature (120° C. for ≥6 hr) to allow for the resin to crosslink.

Example 25

Solvent-Less Preparation of Polymer Gel without Hardening Agent

Polymer resins were prepared using the following general procedure. A Poly[(phenol glycidyl ether)-(co-formaldehyde)] with 340-570 repeating molecular units was heated to elevated temperature (85° C. unless otherwise stated) and mixed continuously. 85% (wt/wt) Phosphoric Acid in water was then added to the liquid solution and mixed until solid. The solid resin product was placed at elevated temperature (120° C. for ≥6 hr) to allow for the resin to crosslink.

Example 26

Preparation of Polymer Gel with Varying Phosphorus Content

Polymer resins were prepared using the monolith or solvent-less process described above in samples 1-4. 85% (wt/wt) Phosphoric Acid in water (varying amount from 1% to 40% wt/wt) was then added to the liquid solution containing a Poly[(phenol glycidyl ether)-(co-formaldehyde)] and mixed. The solid resin product was placed at elevated temperature (120° C. for ≥6 hr) to allow for the resin to crosslink.

Example 27

Preparation of Polymer Gel with Varying Hardening Agent Content

Polymer resins were prepared using the monolith or solvent-less process described above in samples 1-5. Phthalic Anhydride (varying amount from 0% to 40% wt/wt) was then added to the liquid epoxy solution containing a Poly[(phenol glycidyl ether)-(co-formaldehyde)] and mixed. 85% (wt/wt) Phosphoric Acid in water was then added to the liquid solution and mixed. The solid resin product was placed at elevated temperature (120° C. for ≥6 hr) to allow for the resin to crosslink.

Example 28

Resin Characterization by Fourier Transform Infrared Spectroscopy

Figure 30:
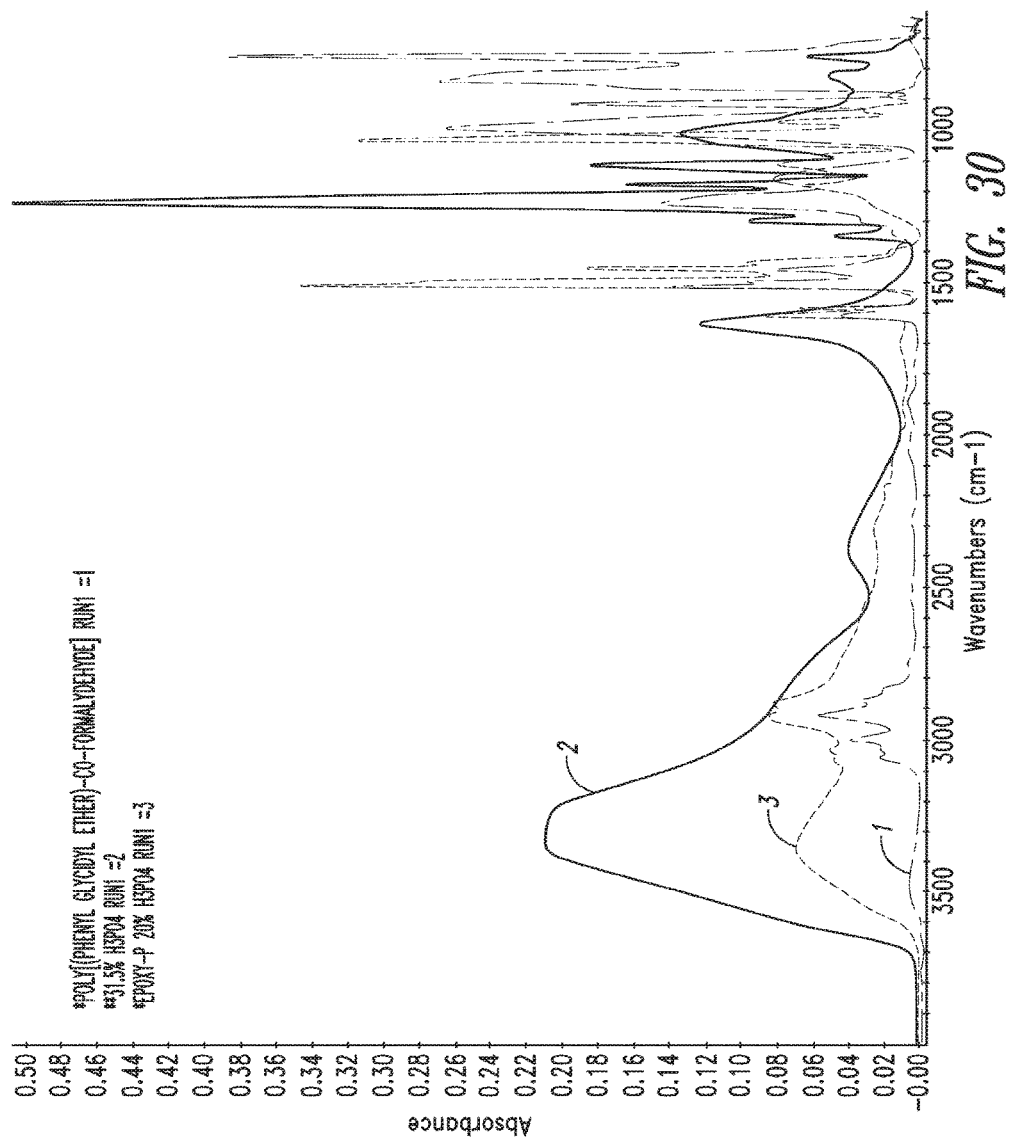
FIG. 30 shows FTIR spectra of neat epoxy resin (1), diluted phosphoric acid (2) and cured epoxy-P resin (3).
Figure 31:
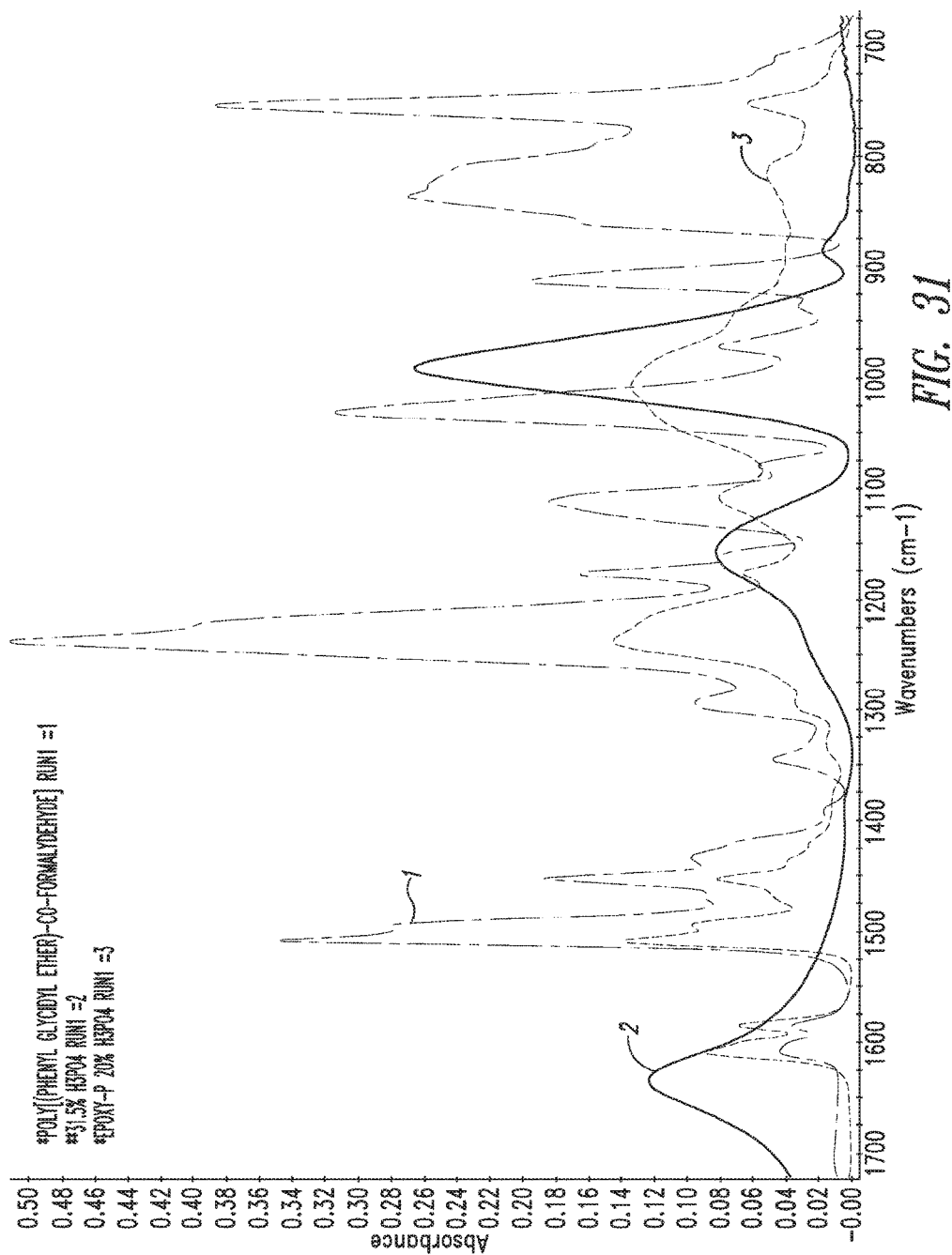
FIG. 31 shows the spectra from FIG. 30, sized to highlight the fingerprint region.
Figure 32:
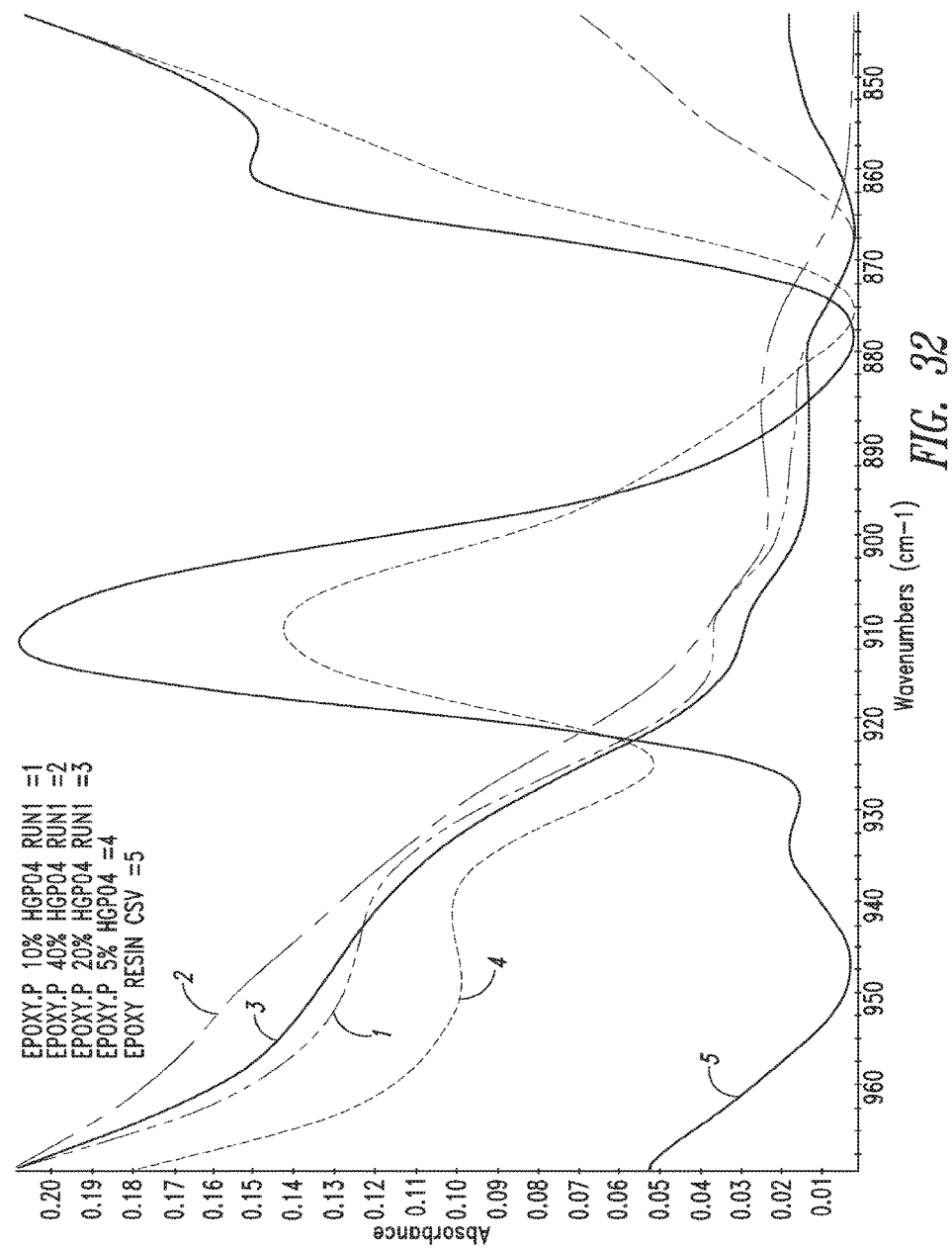
FIG. 32 shows the FTIR spectra of the neat epoxy resin (5), cured epoxy-P resin with 5% acid (4), 10% acid (1), 20% acid (3), and 40% acid (2). The viewing area of the spectra is sized to illustrate the epoxide bending absorbance band at ~910 cm-1.

The raw materials and several iterations of the resin were analyzed with a Thermo Fischer Scientific Nicolet iS10 FTIR spectrometer with an ATR accessory. The FTIR spectra of the neat epoxy resin (~570 MW), phosphoric acid (31.5% conc.), and the epoxy-P resin (20 wt % acid) are shown in FIGS. 30 and 31. Note that the phosphoric acid was diluted from 85 wt % with deionized water for the safety of the instrument. The FTIR spectra show that the cured resin is chemically different than the two reactants. One notable difference between the neat epoxy and the epoxy-P resin is the disappearance of the epoxide bending vibration at ~910 cm$^{-1}$. This observation provides significant evidence of the crosslinking of the epoxy molecules through reaction between the phosphoric acid and the epoxide functional group. FIG. 32 shows the effect of phosphoric acid loading on the epoxide content of the epoxy-P resin. With the addition of ≥10% $H_3PO_4$, the remaining concentration of epoxide groups was below the instrument detection limit.

Example 29

Resin Characterization by TGA

Figure 33:
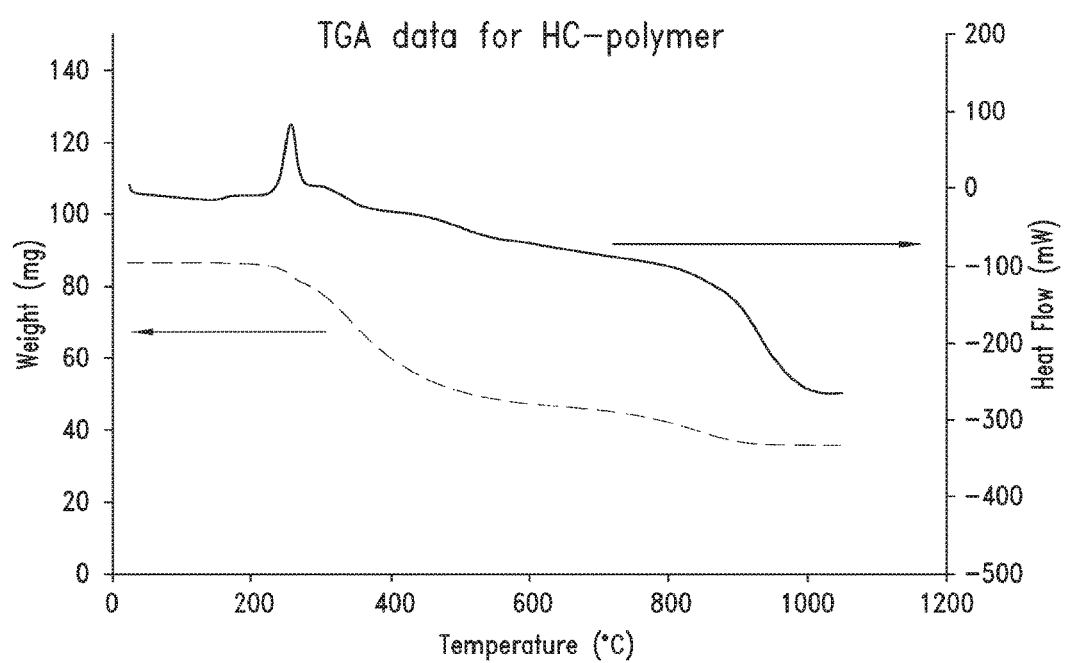
FIG. 33 presents example TGA data for polymer resin comprising phosphoric acid demonstrating an exothermic event at about 250 C.

A sample of novalac epoxy and phosphoric acid was mixed in the melt state in a 3:1 molar ration (epoxy to phosphoric acid). The resin was cured at 120° C. for 12 hour. The TGA test was performed under N2 at 10° C./min ramp rate. The TGA data are depicted in FIG. 33. The exotherm at 250° C. could be explained by a reaction of the phosphoric acid and remaining unreacted epoxy groups that may control resin 3-D structure resulting in a desirable carbon structure and both improved gravimetric capacity and first cycle efficiency vs. the unmodified epoxy resin.

Example 30

Determination of Carbon Phosphorous Content by TXRF

Exemplary carbons produced according to the various examples above were tested for phosphorus content by TXRF spectroscopy. Carbon was synthesized from reins produced using both the solvent process (as in Examples 4, 22, 23, 26, 27) and solvent-less process (as in Examples 4, 24, 25, 26, 27) were analyzed. A Bruker S2 PICOFOX spectrometer was used for the study. Samples were prepared by milling to achieve a D(1.00)<100 μm particle size, then making a suspension consisting of the milled carbon, ethylene glycol, and Ga as an internal standard. Aliquots were placed on optically flat quartz disks and dried, leaving a thin residue for analysis. The results of the analysis, and the amount of phosphoric acid added during resin synthesis, are summarized in the table below Table 4.

TABLE 4

Tunability of Phosphorous Content

| Sample | P Content in HC (%) |
|---|---|
| Carbon 12a | 6.45 |
| Carbon 12b | 5.21 |
| Carbon 12c | 2.9 |
| Carbon 12d | 9.34 |
| Carbon 12e | 4.01 |
| Carbon 12f | 11.67 |
| Carbon 12g | 7.28 |
| Carbon 12h | 4.73 |
| Carbon 12i | 8.29 |
| Carbon 12j | 5.37 |
| Carbon 12k | 12.99 |
| Carbon 12l | 7.16 |

Example 31

Preparation of Hard Carbon from Polymer Gel at Large Scale

A Polymer resin was prepared using the following general procedure. A Poly[(phenol glycidyl ether)-(co-formaldehyde)] with between 300 and 600 repeating molecular units and an 85% phosphoric acid aqueous solution were mixed and cured via an extrusions process.

The cured polymer resin was pyrolyzed in a rotary kiln according to the methods described generally herein.

The hard carbon was the examined for its electrochemical properties generally according to the methods described herein. Electrochemical data is described in Table 5.

TABLE 5

| Sample | 1st Cycle Insertion (mAh/g) | 1st Cycle Extraction (mAh/g) | 1st Cycle Efficiency (%) |
|---|---|---|---|
| Carbon 16a | 761 | 619 | 81.3 |

Example 32

Preparation of Composite Resin with Solvent

A polymer sol was prepared by dissolving polyphenyl-glycidylether-co-formaldehyde (PPGEF) polymer in acetone solvent (1:20 v/v) inside a sealed plastic container. Once the resin was dissolved, silicon powder (1:5 w/w resin to silicon) is added to the solution and dispersed via sonication followed by vortexing (shaking). The dispersed silicon/resin solution was transferred to an open container on a hot plate where it is continuously stirred (300 rpm) and heated (85° C.). At this point, phosphoric acid was added to the solution (equal to 20 wt % of the resin in solution). The solution continues to stir and heat until either solvent loss or polymerization leads to disruption of the stirring process. The silicon-gel is transferred to an oven set to 120° C. and cured for >8 hours.

Example 33

Alternative Preparation of Composite Resin without Solvent

Alternatively, a solventless preparation process can be used analogous to Example 32 without the use of acetone. In this process, PPGEF resin is stirred and heated on a hot plate wherein the silicon powder is added and allowed to disperse within the resin for >1 hour. At this point, phosphoric acid (20 wt % to resin) is added to react with the resin thus causing polymerization of the silicon dispersed gel. This is cured at a temperature of 120° C. for >8 hours.

Example 34

Alternative Solvent-Less Synthesis of Composite Resin

In another solventless embodiment, the resin can be in the form of a solid rather than a liquid in this case 1:1 w/w mixture of Bisphenol A (BPA) and hexamethylentramine (HMT). In this process, BPA/HMT in powder form is mechanically mixed with silicon powder (0.5:0.5:1.8 w/w/w) to form a homogeneous powder mixture. This is cured at 130° C. for 16 hours to produce the silicon-gel composite.

Example 35

Preparation of Composite Resin Using Encapsulation Techniques

In another embodiment, silicon incased in a polymer sol can be prepared. In this process melamine is allowed to dissolve in water through stirring and heating. Once dissolved, a formaldehyde solution is then added and stirred until the solution becomes clear. A suspension of silicon particles in water is then added to the melamine/formaldehyde solution. Next, a solution of TWEEN80 surfactant and water is then added and allowed to stir for 10 minutes.

Finally, 1M HCl is added to catalyze the reaction. The mixture is then cured for 12 hours at 100° C. to produce silicon particles incased in melamine/formaldehyde polymer.

Other embodiments of silicon particles incased in polymer resin can be prepared using a Resorcinol/Formaldehyde polymer. Resorcinol is dissolved in water on a hot plate while stirring. Ammonium acetate and SnCl2 are added to the solution and held for 10 minutes. Glacial acetic acid is then added and the solution is mixed for 12 hours. In a separated vessel, cyclohexane and SPAN80 (5 wt %) are mixed and heated to 80° C. Formaldehyde is added to the resorcinol solution and held for 10 minutes. The Resorcinol/Formaldehyde solution is then added to the stirring and heated cyclohexane solution. The resin is then cured for 4 hours at 80° C. The resulting resin is filtered out and dried in an oven at 100° C. for 12 hours.

Example 36

Preparation of Pyrolyzed Composite Through Thermal Processing

Pyrolysis of silicon-gels is carried out such that resins produced in Examples 32-35 are heated (@10° C./min) in a tube furnace under a flow (300 cc/min) of nitrogen gas to a temperature of 1050° C. where it is held for 1 hour and then ramped down to room temperature.

In variations of the above procedure, the silicon particles employed (for example in Examples 32-35) are sized for the appropriate application. For example the particles can be nano-sized (i.e., nanoparticles) or micron sized, or combinations thereof. For example, in some variations of the above procedures, the silicon particles used range in size from about 10 nm to about 50 nm or from about 50 nm to about 200 nm. In more variations of the above, materials are prepared using silicon particles have a size ranging from about 10 nm to about 200 nm, from about 200 nm to about 500 nm or from about 500 nm to about 1000 nm. Micron sized particles are also used for preparation of the above materials and such particles generally have a size ranging from about 1000 nm to about 1500 nm or from about 1500 nm to about 2000 nm. Other exemplary procedures include use of silicon particles ranging in size from about 2000 nm to about 4000 nm or from about 4000 nm to about 6000 nm.

Example 37

In-Situ Surface Modification During Pyrolysis

Composite-resins produced in Example 32-35 are pyrolyzed in the presence of hydrocarbon vapor. The silicon-gel is heated (@ 10° C./min) in a tube furnace under a flow (300 cc/min) of nitrogen gas to a temperature of 1050° C. where it holds for 1 hour then ramps down to room temperature. During this process the nitrogen flow is first bubbled through a chamber containing liquid xylene. The xylene vapors are then carried into the tube furnace hot zone containing the silicon-gel sample where the xylene vapor then decomposes on the surface of the Si/C material where it chemically deposits (CVD) carbon on the surface. Alternative hydrocarbons can be used including ethylene, cyclohexane, toluene, and propane.

Example 38

Size Reduction of Composite Through Micronization Techniques

Micronization of silicon-carbon or silicone-gel is done such that material produced in examples 32-37 are milled in an automated mortar and pestle (Fritsch Mill) for 20 minutes using 15-20 deca-Newtons of downward force. The resulting material is then removed from the mill and run through a 38 micron sieve.

Other embodiments of micronization techniques can be done by running the materials produced in example 1-7 through a JetMill using 120 PSI of nitrogen or air to force the granular material into the mill. The resulting material is then milled down to micron size and can be measured using a Mastersizer 3000.

Example 39

Figure 27:
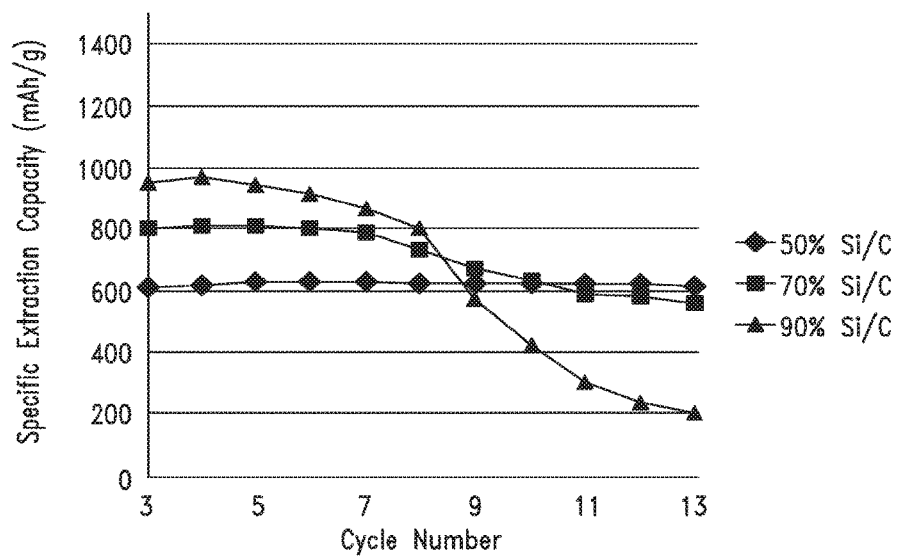
FIG. 27 presents specific extraction capacity data for exemplary carbon-silicon composites.

Electrochemical Performance of Composites Comprising High Electrochemically Modifier Content FIG. 27 shows the electrochemical stability and behavior of an exemplary high electrochemical modifier content composite, cycled between 1 and 50 mV. As the electrochemical modifier content increases, the capacity also increases. The highest capacity is seen for the 90% electrochemical modifier loading while the most stable performance is with the 50% electrochemical modifier loading.

Example 40

Figure 28:
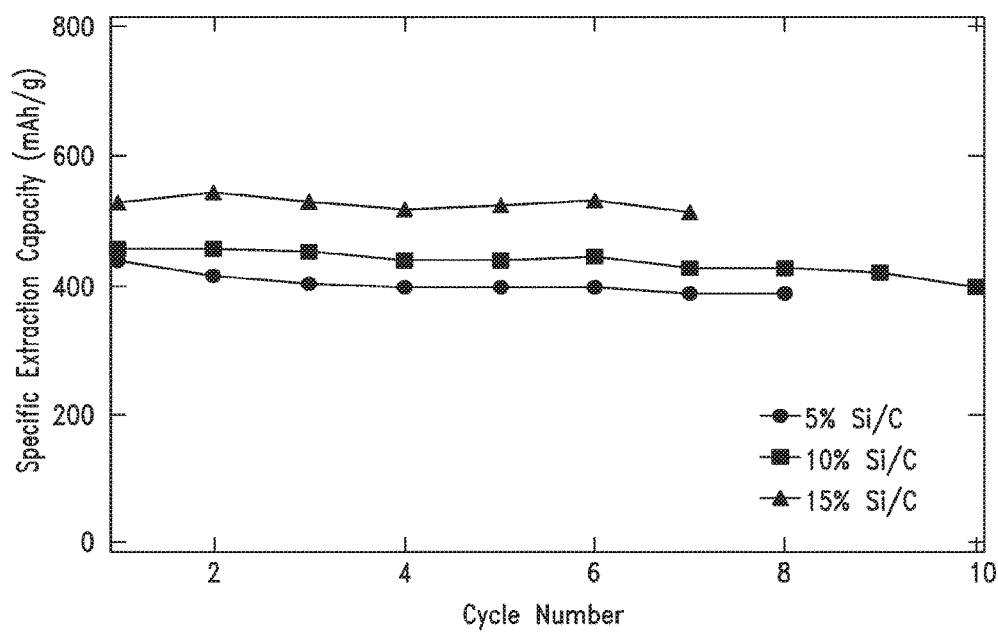
FIG. 28 provides specific extraction capacity data for exemplary carbon-silicon composites.
Figure 29:
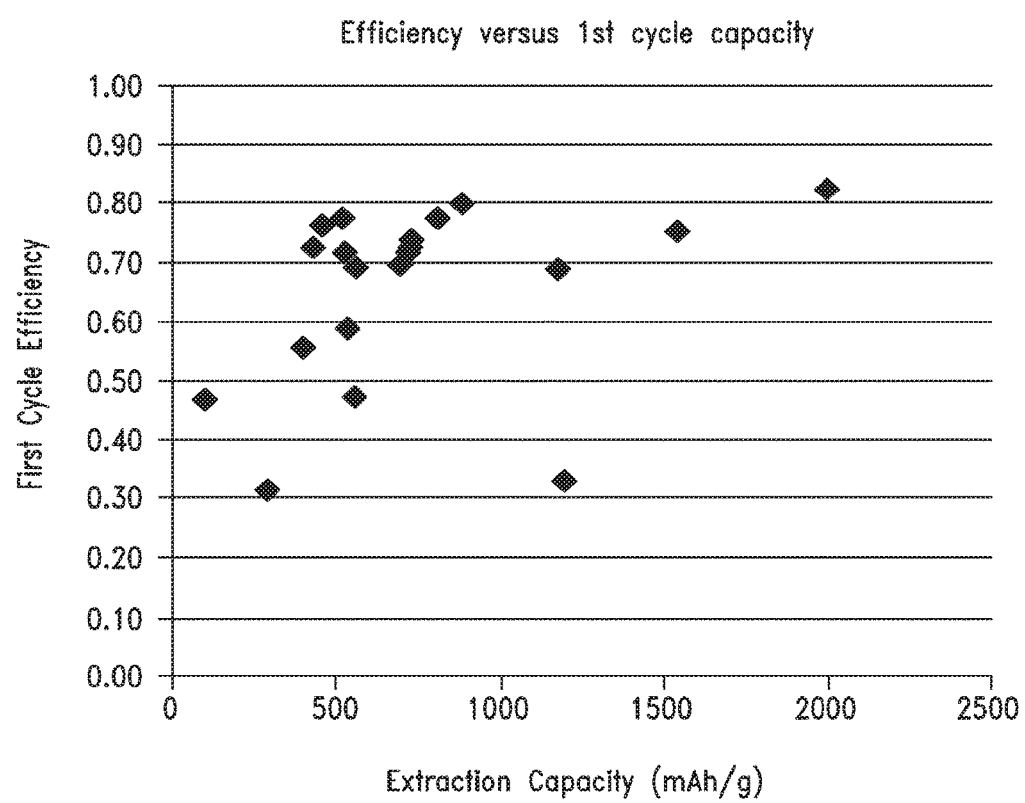
FIG. 29 provides first cycle efficiency data.

Electrochemical Performance of Composites Comprising Low Electrochemically Modifier Content There may be instances wherein a higher capacity is not needed in favor of a slight performance enhancement. FIG. 28 depicts exemplary composites wherein the electrochemical modifier content is low (5-15%) when compared to the carbon. All of these composites display strong stability though a lower capacity when compared to the high electrochemical modifier content composites.

Example 41

Post-Pyrolysis Composite Surface Modifications

Post-carbonization surface treatments of the composite can be carried out on materials produced from examples 36-38. The material is heated (@10° C./min) in a tube furnace under a flow (300 cc/min) of nitrogen gas to a temperature of 1050° C. where it holds for 1 hour then ramps down to room temperature.

Other embodiments of example 10 can be carried out with additional gas during heating. For this process, a material is heated (@ 10° C./min) in a tube furnace under a flow (300 cc/min) of nitrogen gas to a temperature of 1050° C. where it is held for 1 hour then ramps down to room temperature. During this process the nitrogen flow is first bubbled through a chamber containing liquid xylene. The xylene vapors are then carried into the tube furnace hot zone containing the silicon-gel sample where the xylene vapor then decomposes on the surface of the Si/C material where it chemically deposits (CVD) carbon on the surface. Alternative hydrocarbons can be used including methane, ethane, ethylene, cyclohexane, toluene, propane or combinations thereof.

Example 42

Si—C Nanocomposite Synthesis by Silicon Vapor Deposition

The composite can be synthesized via vapor phase chemical reactions. In a typical experiment 0.5 grams of activated carbon is placed in an alumina crucible and positioned in the center (hot zone) of a tube furnace. Upstream of the carbon is another crucible containing 6 grams of zinc metal powder. The furnace is sealed then purged continuously with nitrogen gas at ~300 cc/min flow rate. The temperature is ramped at 20° C./min to a peak temperature of 850° C. At peak temperature the gas flow is diverted through a flask containing silicon tetrachloride liquid. The silicon tetrachloride vapors are carried into the furnace where it reacts in the vapor phase with zinc vapors (produced from the molten zinc metal). The zinc metal chemically reduces the silicon tetrachloride to elemental silicon, which deposits as solid nanoparticles on the surface and pores of the carbon within the hot zone of the furnace. The process is allowed to continue for 1 hour at room temperature before switching the gas flow to pure nitrogen and cooling to room temperature. The resulting Si/C composite is collected in the crucible at the end.

The composite can be using a different silicon precursor vapor and no zinc metal. In a typical experiment 0.5 grams of activated carbon is placed in an alumina crucible then positioned in the center (hot zone) of a tube furnace. The furnace is sealed then purged continuously with nitrogen gas at ~300 cc/min flow rate. The temperature is ramped at 20° C./min to a peak temperature of 550° C. At peak temperature the gas flow is switched to a mixed gas of 5 mol % Silane (SiH4)/argon. This gas mixture enters the hot zone of the furnace and thermally decomposes on the surface and pores of the carbon into elemental silicon nanoparticles. The reaction is allowed to continue for 1 hr before the gas flow is diverted back to pure nitrogen and then cooled to room temperature. The resulting Si/C composite is collected in the crucible at the end.

Example 43

Multi-Allotrope Nanocomposite Synthesis by Through Particle Inclusion in Resin

In a typical synthesis, 4 grams of PPGEF resin is added to a 60 mL PP bottle along with 13 mL of acetone and then completely dissolved. One gram of silicon powder added and dispersed in the epoxy solution. One gram of graphite powder is added to the epoxy/silicon solution. The mixture is sonicated for 10 minutes followed by vortexing for 10 minutes. The mixture is poured into a beaker with a stir bar then placed on a hot plate and heated to 80° C. while stirring (300 rpm). 0.560 mL of 85% w/w phosphoric acid is added and completely dissolved in the acetone mixture. The mixture is continuously stirred and heated until gelation occurs as evidenced by a disruption in the stirring (solidification). The resulting resin is cured at 60° C. for >12 hours then increased to 120° C. for an additional 12 hours. The material can be subsequently pyrolyzed using optimal conditions to give superior performance.

Example 44

Incorporation of Iron Oxide in Composite Resin

In a typical experiment an epoxy-acetone solution is prepared by weighing out 10 grams of PPGEF epoxy resin into a plastic container then 10 mL of acetone is added and mixed to fully dissolve the resin. Next 0.2 grams of iron oxide nanopowder is added to the solution and dispersed via sonication for 1 hr then vortexing for 4 hours. At this point, the suspension is poured into a beaker on a hot plate where it is heated to 80° C. and stirred continuously at 300 rpm. Lastly 0.2 grams of phosphoric acid is added to the solution then allowed to react. When the gelation reaction causes disruption in the stirring the gel is transferred to a convection oven where it is allowed to cure for 12 hours at 120° C.

Example 45

Incorporation of Manganese in Composite Resin

An epoxy-acetone solution is prepared by weighing out 10 grams of PPGEF epoxy resin into a plastic container then 10 mL of acetone is added and mixed to fully dissolve the resin. Next 0.3 grams of manganese acetate is added to the solution and dissolved via sonication for 1 hr then vortexing for 4 hours. At this point, the solution is poured into a beaker on a hot plate where it is heated to 80° C. and stirred continuously at 300 rpm. Lastly 0.2 grams of phosphoric acid is added to the solution then allowed to react. When the gelation reaction causes disruption in the stirring the gel is transferred to a convection oven where it is allowed to cure for 12 hours at 120° C.

Example 45

Metal-Carbon Composite

Metal carbon composite prepared using an incipient wetness technique In a typical synthesis 1 grams of tin chloride is dissolved in 10 mL of acetone. This solution is gradually dripped onto the surface of milled activated carbon until the point of saturation at which point it is dried in a convection oven at 80° C. for 15 minutes. The process is continued until all of the tin chloride solution has been consumed. The final tin chloride/carbon material is heated to 800° C. for 1 hr in a tube furnace under flowing nitrogen to produce the Sn/C composite.

Example 47

Summary of Electrochemical Performance of Composites

TABLE 6

| | | | | | | | | | | |
|---|---|---|---|---|---|---|---|---|---|---|
| Electrochemical Performance of Representative Composites | | | | | | | | | | |
| No. | Ex. No.[1] | % Si | Vol. Cap. (mAh/cc)[2] | ΔQ Full Cell vs. graphite | 1st Cyc. Ins. Q (mAh/g)[3] | 1st Cycle Eff. (%)[4] | 1st Cycle Ext. Q (mAh/g)[5] | 5th Cycle Q Ret.[6] | Spec. Surf. Area $(m^2/g)$[7] | Pore Vol. $(cm^3/g)$[8] |
| 1 | 17, 1, 3, 4, 5, 6, 7, 40 | 5% | 1645 | 18% | 901 | 59% | 531 | 87% | N/A | N/A |
| 2 | 17, 1, 3, 4, 5, 6, 7, 40 | 10% | 1692 | 18% | 915 | 59% | 537 | 83% | N/A | N/A |

TABLE 6-continued

Electrochemical Performance of Representative Composites

| No. | Ex. No.[1] | % Si | Vol. Cap. (mAh/cc)[2] | ΔQ Full Cell vs. graphite | 1st Cyc. Ins. Q (mAh/g)[3] | 1st Cycle Eff. (%)[4] | 1st Cycle Ext. Q (mAh/g)[5] | 5th Cycle Q Ret.[6] | Spec. Surf. Area (m²/g)[7] | Pore Vol. (cm³/g)[8] |
|---|---|---|---|---|---|---|---|---|---|---|
| 3 | 17, 1, 3, 4, 5, 6, 7 | 20% | 1327 | 15% | 717 | 56% | 401 | 80% | N/A | N/A |
| 4 | 17, 1, 3, 4, 5, 6, 7 | 50% | 6651 | 27% | 3595 | 33% | 1193 | 3% | N/A | N/A |
| 5 | 8, 23, 25, 26, 33, 36, 38 | 75% | 2151 | 21% | 1163 | 47% | 552 | 8% | N/A | N/A |
| 6 | 8, 23, 25, 26, 33, 36, 38 | 82% | 376 | −24% | 203 | 47% | 95 | 15% | N/A | N/A |
| 7 | 1, 3, 4, 5, 16, 17, 41 | 66% | 1847 | 20% | 999 | 73% | 725 | 146% | 13 | 0.10 |
| 8 | 1, 3, 4, 5, 16, 17, 41 | 75% | 1838 | 19% | 993 | 69% | 690 | 184% | 12 | 0.09 |
| 9 | 1, 3, 4, 5, 16, 17, 41 | 80% | 1839 | 19% | 994 | 74% | 733 | 155% | 8 | 0.06 |
| 10 | 1, 3, 4, 5, 16, 17, 41 | 83% | 1856 | 19% | 1003 | 72% | 720 | 166% | 12 | 0.09 |
| 11 | 35, 36 | 50% | 3164 | 24% | 1710 | 69% | 1174 | 83% | N/A | N/A |
| 12 | 23, 26, 32, 36, 38, 43 | 30% | 2044 | 20% | 1105 | 80% | 883 | 97% | 25 | 0.05 |
| 13 | 23, 26, 32, 36, 38, 40 | 10% | 1106 | 12% | 598 | 76% | 456 | 96% | 24 | 0.03 |
| 14 | 23, 26, 32, 36, 38, 40 | 15% | 1364 | 15% | 737 | 72% | 527 | 99% | 40 | 0.05 |
| 15 | 23, 26, 32, 36, 38, 40 | 5% | 1111 | 12% | 600 | 72% | 435 | 91% | 29 | 0.04 |
| 16 | 23, 26, 32, 36, 38, 40 | 10% | 1499 | 17% | 810 | 69% | 560 | N/A | 23 | 0.03 |
| 17 | 23, 26, 32, 36, 38, 40 | 15% | 1729 | 19% | 934 | 31% | 293 | 22% | 42 | 0.04 |
| 18 | 23, 26, 32, 36, 38, 40 | 5% | 1245 | 14% | 673 | 77% | 521 | 64% | 13 | 0.01 |
| 19 | 23, 26, 32, 36, 38, 40 | 50% | 3788 | 25% | 2047 | 75% | 1538 | 41% | 35 | 0.04 |
| 20 | 23, 26, 33, 36, 38, 40 | 70% | 1928 | 20% | 1042 | 77% | 806 | 100% | 26 | 0.04 |
| 21 | 23, 26, 33, 36, 38, 40 | 90% | 4466 | 26% | 2414 | 82% | 1988 | 48% | 22 | 0.04 |
| 22 | 23, 36, 38, 44 | 5% | 1065 | 11% | 576 | 80% | 458 | 98% | N/A | N/A |
| 23 | 23, 36, 38, 44 | 50% | 1043 | 11% | 564 | 31% | 174 | 73% | N/A | N/A |
| 24 | 23, 36, 38 | 5% | 1118 | 12% | 604 | 76% | 462 | 97% | N/A | N/A |
| 25 | 23, 36, 38, 45 | 5% | 1145 | 12% | 619 | 61% | 376 | 97% | N/A | N/A |
| 26 | 23, 13, 36, 38 | 5% | 1201 | 14% | 649 | 65% | 420 | 93% | N/A | N/A |
| 27 | 23, 36, 38 | 50% | 1325 | 15% | 716 | 54% | 389 | 61% | N/A | N/A |
| 28 | 23, 36, 38 | 80% | 1677 | 18% | 906 | 51% | 459 | 46% | N/A | N/A |
| 29 | 15, 35, 36 | 50% | 1347 | 15% | 728 | 32% | 231 | 60% | 740 | 0.30 |
| 30 | 42 | 18% | N/A | NA | N/A | N/A | N/A | N/A | N/A | N/A |
| 31 | 41, 46 | 50% | 2379 | 22% | 1286 | 24% | 306 | 56% | 663 | 0.55 |

[1]Refers to example number for preparation of sample.
[2]Volumetric capacity
[3]1st cycle insertion
[4]1st cycle efficiency
[5]1st cycle extraction
[6]5th cycle retention
[7]Specific surface area
[8]Pore volume The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for preparing a silicon-carbon composite, the method comprising contacting an amorphous activated porous carbon material having a total pore volume ranging from 0.6 cc/g to 1.0 cc/g with a gas comprising silane at a temperature of 450° C., thereby depositing elemental silicon in a pore of the porous carbon material to form the silicon-carbon composite.

2. The method of claim 1, wherein the gas comprising silane further comprises nitrogen.

3. The method of claim 1, wherein the amorphous activated porous carbon material is contacted with the gas comprising silane for a period of time ranging from 5 minutes to 5 hours.

4. The method of claim 1, wherein the amorphous activated porous carbon material is contacted with the gas comprising silane in a kiln or fluidized bed.

5. The method of claim 4, wherein the kiln is a rotary kiln.

6. The method of claim 1, wherein the amorphous activated porous carbon material is contacted with the gas comprising silane at a pressure below atmospheric pressure.

7. The method of claim 1, wherein the amorphous activated porous carbon material has a fractional pore surface area of pores at or below 100 nm that comprises at least 50% of the total pore surface area.

8. The method of claim 1, wherein the amorphous activated porous carbon material has a fractional pore surface area of pores at or below 100 nm that comprises at least 90% of the total pore surface area.

9. The method of claim 1, wherein the amorphous activated porous carbon material comprises particles having a median particle diameter ranging from 1 micron to 10 microns.

10. A method for preparing a silicon-carbon composite, the method comprising contacting an amorphous activated porous carbon material having a total pore volume ranging from 0.6 cc/g to 1.0 cc/g with a gas comprising silane at a temperature between 450° C. and 500° C., thereby depositing elemental silicon in a pore of the porous carbon material to form the silicon-carbon composite.

11. The method of claim 10, wherein the gas comprising silane further comprises nitrogen.

12. The method of claim 10, wherein the amorphous activated porous carbon material is contacted with the gas comprising silane for a period of time ranging from 5 minutes to 5 hours.

13. The method of claim 10, wherein the amorphous activated porous carbon material is contacted with the gas comprising silane in a kiln or fluidized bed.

14. The method of claim 13, wherein the kiln is a rotary kiln.

15. The method of claim 10, wherein the amorphous activated porous carbon material is contacted with the gas comprising silane at a pressure below atmospheric pressure.

16. The method of claim 10, wherein the amorphous activated porous carbon material has a fractional pore surface area of pores at or below 100 nm that comprises at least 50% of the total pore surface area.

17. The method of claim 10, wherein the amorphous activated porous carbon material has a fractional pore surface area of pores at or below 100 nm that comprises at least 90% of the total pore surface area.

18. The method of claim 10, wherein the amorphous activated porous carbon material comprises particles having a median particle diameter ranging from 1 micron to 10 microns.

* * * * *